(12) United States Patent
Galitsky

(10) Patent No.: US 11,720,749 B2
(45) Date of Patent: Aug. 8, 2023

(54) CONSTRUCTING CONCLUSIVE ANSWERS FOR AUTONOMOUS AGENTS

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/974,335

(22) Filed: Oct. 26, 2022

(65) Prior Publication Data

US 2023/0057760 A1  Feb. 23, 2023

Related U.S. Application Data

(63) Continuation of application No. 16/654,258, filed on Oct. 16, 2019, now Pat. No. 11,562,135.

(60) Provisional application No. 62/746,261, filed on Oct. 16, 2018.

(51) Int. Cl.
*G06F 40/211* (2020.01)
*G06F 16/22* (2019.01)
*G06F 16/953* (2019.01)
*G06N 20/00* (2019.01)
*G06F 40/279* (2020.01)
*G06N 5/01* (2023.01)

(52) U.S. Cl.
CPC ........ *G06F 40/211* (2020.01); *G06F 16/2246* (2019.01); *G06F 16/953* (2019.01); *G06F 40/279* (2020.01); *G06N 5/01* (2023.01); *G06N 20/00* (2019.01)

(58) Field of Classification Search
CPC ...... G10L 15/1822; G06F 8/31; G06F 40/211; G06N 3/08
See application file for complete search history.

(56) References Cited

U.S. PATENT DOCUMENTS

| 5,495,605 | A | 2/1996 | Cadot |
| 5,694,523 | A | 12/1997 | Wical |
| 5,708,822 | A | 1/1998 | Wical |
| 6,061,675 | A | 5/2000 | Wical |

(Continued)

FOREIGN PATENT DOCUMENTS

WO  2015089822 A1  6/2015

OTHER PUBLICATIONS

U.S. Appl. No. 17/706,155, Non-Final Office Action dated Feb. 2, 2023, 33 pages.

(Continued)

*Primary Examiner* — Anne L Thomas-Homescu
(74) *Attorney, Agent, or Firm* — Kilpatrick Townsend & Stockton LLP

(57) ABSTRACT

Techniques are described herein for enabling autonomous agents to generate conclusive answers. An example of a conclusive answer is text that addresses concerns of a user who is interacting with an autonomous agent. For example, an autonomous agent interacts with a user device, answering user utterances, for example questions or concerns. Based on the interactions, the autonomous agent determines that a conclusive answer is appropriate. The autonomous agent formulates the conclusive answer, which addresses multiple user utterances. The conclusive answer provided to the user device.

20 Claims, 23 Drawing Sheets

(56) References Cited

U.S. PATENT DOCUMENTS

| | | | |
|---|---|---|---|
| 6,181,909 B1 | 1/2001 | Burstein et al. | |
| 6,279,476 B1 | 8/2001 | Ellis | |
| 6,487,545 B1 | 11/2002 | Wical | |
| 6,598,054 B2 | 7/2003 | Schuetze et al. | |
| 6,731,307 B1 | 5/2004 | Strubbe et al. | |
| 6,922,699 B2 | 7/2005 | Schuetze et al. | |
| 6,941,321 B2 | 9/2005 | Schuetze et al. | |
| 7,027,975 B1 | 4/2006 | Pazandak et al. | |
| 7,152,031 B1 | 12/2006 | Jensen et al. | |
| 7,519,529 B1 | 4/2009 | Horvitz | |
| 7,634,462 B2 | 12/2009 | Weyand et al. | |
| 7,752,220 B2 | 7/2010 | Weyand et al. | |
| 7,756,855 B2 | 7/2010 | Ismalon | |
| 7,840,556 B1 | 11/2010 | Dayal et al. | |
| 7,991,841 B2 | 8/2011 | Anderson et al. | |
| 8,108,406 B2 | 1/2012 | Kenedy et al. | |
| 8,166,032 B2 | 4/2012 | Sommer et al. | |
| 8,429,184 B2 | 4/2013 | Ismalon | |
| 8,452,225 B2 | 5/2013 | Burstein et al. | |
| 8,630,972 B2 | 1/2014 | Gamon et al. | |
| 8,903,810 B2 | 12/2014 | Ismalon | |
| 8,935,151 B1 | 1/2015 | Petrov et al. | |
| 9,037,464 B1 | 5/2015 | Mikolov et al. | |
| 9,147,397 B2 | 9/2015 | Thomsen et al. | |
| 9,183,288 B2 | 11/2015 | Murray | |
| 9,240,128 B2 | 1/2016 | Bagchi et al. | |
| 9,292,490 B2 | 3/2016 | Kimelfeld et al. | |
| 9,449,080 B1 | 9/2016 | Zhang | |
| 9,563,693 B2 | 2/2017 | Zhang et al. | |
| 9,830,913 B2 | 11/2017 | Thomsen et al. | |
| 10,120,864 B2 | 11/2018 | Sandor et al. | |
| 10,437,833 B1 | 10/2019 | Nguyen | |
| 10,585,927 B1 | 3/2020 | Liao et al. | |
| 10,592,606 B2 | 3/2020 | Kuo et al. | |
| 10,594,757 B1 | 3/2020 | Shevchenko et al. | |
| 10,839,158 B2 | 11/2020 | Ji et al. | |
| 11,023,774 B2 | 6/2021 | Nefedov | |
| 11,068,479 B2 | 7/2021 | Sidar et al. | |
| 11,321,536 B2 | 5/2022 | Galitsky et al. | |
| 2001/0053968 A1 | 12/2001 | Galitsky et al. | |
| 2002/0046018 A1 | 4/2002 | Marcu et al. | |
| 2004/0044519 A1 | 3/2004 | Polanyi et al. | |
| 2004/0083092 A1* | 4/2004 | Valles | G06F 40/30 704/9 |
| 2004/0148170 A1 | 7/2004 | Acero et al. | |
| 2005/0005266 A1 | 1/2005 | Datig | |
| 2006/0136352 A1 | 6/2006 | Brun et al. | |
| 2007/0073533 A1 | 3/2007 | Thione et al. | |
| 2007/0185859 A1 | 8/2007 | Flowers et al. | |
| 2007/0208732 A1 | 9/2007 | Flowers et al. | |
| 2007/0294229 A1 | 12/2007 | Au | |
| 2008/0091408 A1 | 4/2008 | Roulland et al. | |
| 2008/0114750 A1 | 5/2008 | Saxena et al. | |
| 2008/0172409 A1 | 7/2008 | Botros et al. | |
| 2008/0228467 A1 | 9/2008 | Womack et al. | |
| 2009/0089252 A1 | 4/2009 | Galitsky et al. | |
| 2009/0248399 A1 | 10/2009 | Au | |
| 2009/0282019 A1 | 11/2009 | Galitsky et al. | |
| 2010/0169352 A1 | 7/2010 | Flowers et al. | |
| 2011/0078167 A1 | 3/2011 | Sundaresan et al. | |
| 2011/0270774 A1 | 11/2011 | Varshavsky et al. | |
| 2012/0041950 A1 | 2/2012 | Koll et al. | |
| 2012/0078902 A1 | 3/2012 | Duboue et al. | |
| 2012/0166180 A1 | 6/2012 | Au | |
| 2012/0177296 A1 | 7/2012 | Ren et al. | |
| 2012/0179752 A1 | 7/2012 | Mosley et al. | |
| 2012/0189212 A1 | 7/2012 | Ren et al. | |
| 2012/0240185 A1 | 9/2012 | Kapoor et al. | |
| 2013/0073571 A1 | 3/2013 | Coulet et al. | |
| 2013/0124529 A1 | 5/2013 | Jacob | |
| 2013/0191416 A1 | 7/2013 | Lee et al. | |
| 2013/0268532 A1 | 10/2013 | Doshi | |
| 2014/0040288 A1 | 2/2014 | Galitsky | |
| 2014/0122083 A1 | 5/2014 | Xiaojiang | |
| 2014/0136188 A1 | 5/2014 | Wroczynski et al. | |
| 2014/0229164 A1 | 8/2014 | Martens et al. | |
| 2014/0337257 A1 | 11/2014 | Chatterjee et al. | |
| 2015/0051900 A1 | 2/2015 | Kimelfeld et al. | |
| 2015/0081296 A1 | 3/2015 | Lee et al. | |
| 2015/0112664 A1 | 4/2015 | Srinivasan | |
| 2015/0120299 A1 | 4/2015 | Thomsen et al. | |
| 2015/0161512 A1 | 6/2015 | Byron et al. | |
| 2016/0034457 A1 | 2/2016 | Bradley et al. | |
| 2016/0055240 A1 | 2/2016 | Tur et al. | |
| 2016/0063993 A1 | 3/2016 | Dolan et al. | |
| 2016/0064001 A1 | 3/2016 | Thomsen et al. | |
| 2016/0086601 A1 | 3/2016 | Chotimongkol et al. | |
| 2016/0099892 A1 | 4/2016 | Palakovich et al. | |
| 2016/0148227 A1 | 5/2016 | Choe et al. | |
| 2016/0232152 A1* | 8/2016 | Mahamood | G06F 40/186 |
| 2016/0247068 A1 | 8/2016 | Lin | |
| 2017/0011029 A1 | 1/2017 | Chatterjee et al. | |
| 2017/0034107 A1 | 2/2017 | Krishnaswamy et al. | |
| 2017/0116982 A1 | 4/2017 | Gelfenbeyn et al. | |
| 2017/0161372 A1 | 6/2017 | Fernandez et al. | |
| 2017/0192955 A1 | 7/2017 | Zeichner et al. | |
| 2017/0193397 A1 | 7/2017 | Kottha et al. | |
| 2017/0235830 A1 | 8/2017 | Smith et al. | |
| 2017/0249389 A1 | 8/2017 | Brovinsky et al. | |
| 2018/0025303 A1 | 1/2018 | Janz | |
| 2018/0107457 A1 | 4/2018 | Barad et al. | |
| 2018/0189385 A1 | 7/2018 | Sun et al. | |
| 2018/0232443 A1 | 8/2018 | Delgo et al. | |
| 2018/0336183 A1 | 11/2018 | Lee et al. | |
| 2018/0373701 A1 | 12/2018 | McAteer et al. | |
| 2019/0005027 A1 | 1/2019 | He et al. | |
| 2019/0124023 A1 | 4/2019 | Conroy et al. | |
| 2019/0135304 A1 | 5/2019 | Kim et al. | |
| 2019/0156125 A1 | 5/2019 | Massoudifar et al. | |
| 2019/0163756 A1 | 5/2019 | Bull et al. | |
| 2019/0182342 A1 | 6/2019 | Goenka et al. | |
| 2019/0182382 A1 | 6/2019 | Mazza et al. | |
| 2019/0311036 A1 | 10/2019 | Shanmugam et al. | |
| 2019/0354544 A1 | 11/2019 | Hertz et al. | |
| 2020/0004816 A1 | 1/2020 | Kieser et al. | |
| 2020/0027446 A1 | 1/2020 | Ture et al. | |
| 2020/0065398 A1 | 2/2020 | Shriber et al. | |
| 2020/0082415 A1 | 3/2020 | LaTerza | |
| 2020/0286463 A1 | 9/2020 | Galitsky | |
| 2021/0081607 A1 | 3/2021 | Mitsuda et al. | |
| 2021/0110895 A1 | 4/2021 | Shriberg et al. | |
| 2021/0357585 A1 | 11/2021 | Surdeanu et al. | |
| 2022/0020230 A1 | 1/2022 | Tal et al. | |

OTHER PUBLICATIONS

"2009 Annual Study: Global Cost of a Data Breach", Ponemon Institute, LLC, PGP, Apr. 2010, 36 pages.

"AI Marketing, Chatbots, and Your CMS", Available Online at: https://simplea.com/Articles/AI-Marketing-Chatbots-and-Your-CMS, Accessed from Internet on Nov. 19, 2019, pp. 1-9.

"Data Loss Prevention", Trend Micro, Available Online at: http://www.trendmicro.co.in/cloud-content/us/pdfs/business/datasheets/ds_data-loss-prevention.pdf, 2010, pp. 1-2.

"Data Loss Prevention Products & Services", Symantec, Available Online at: https://www.symantec.com/products/dataloss-prevention, Accessed from Internet on Aug. 30, 2018, 6 pages.

"Exploring Dialog Management for Bots", Chatbots Magazine, Available Online at: https://chatbotsmagazine.com/exploring-dialog management-for-bots-cbb8665a2fd3, Jul. 11, 2016, 7 pages.

"Get Search Results Faster", Google Search Help, Available Online at https://support.google.com/websearch/answer/106230, Accessed from Internet at Nov. 19, 2019, pp. 1-2.

"Global Security Report 2010", Trustwave, Available Online at: https://www.trustwave.com/Resources/Library/Documents/2010-Trustwave-Global-Security-Report/, 2010, 49 pages.

"Ignore, Deny, Downplay: Accounts of Syrians from Douma Have No Place in Western Narrative", Russia Today, Available Online at: https://www.rt.com/news/425438-douma-witnesses-gas-attack-syria/, Apr. 28, 2018, pp. 1-8.

"Language Data", Yahoo Labs, Available Online at: https://webscope.sandbox.yahoo.com/catalog.php?datatype=l&guccounter=1, Accessed Aug. 19, 2019, 5 pages.

(56) References Cited

OTHER PUBLICATIONS

"Malaysia Airlines Flight 17", Wikipedia, Available Online at: https://en.wikipedia.org/wiki/Malaysia_Airlines_Flight_17, Accessed from Internet on: May 3, 2018, pp. 1-38.
"OpenNLP", Available Online at: http://incubator.apache.org/opennlp/documentation/manual/opennlp.htm, 2018, 2 pages.
"Shadow Chairman of Investigative Committee", Crime Russia, Available Online at: https://crimerussia.com/corruption/tenevoy-direktor-skr/, Aug. 25, 2016, 5 pages.
"Suicide Bomber Trial: Emails in Full", British Broadcasting Corporation News, Available Online at: news.bbc.co.uk/1/hi/uk/3825765.stm, Nov. 28, 2005, pp. 1-4.
"Trump Russia Affair: Key Questions Answered", British Broadcasting Corporation News, Available Online at: http://www.bbc.com/news/world-us-canada-42493918, Jul. 13, 2018, pp. 1-21.
"Welcome to Apache Lucene", Apache Lucene 7.5.0 and Apache Solr 7.5.0, Available Online at: www.lucene.apache.org, Jan. 11, 2018, 38 pages.
U.S. Appl. No. 16/145,702, "First Action Interview Pilot Program Pre-Interview Communication", dated Feb. 7, 2019, 6 pages.
U.S. Appl. No. 16/240,232, "Final Office Action", dated Oct. 21, 2021, 13 pages.
U.S. Appl. No. 16/240,232, "Final Office Action", dated Apr. 21, 2022, 15 pages.
U.S. Appl. No. 16/240,232, "Non-Final Office Action", dated Apr. 9, 2021, 13 pages.
U.S. Appl. No. 16/240,232, "Non-Final Office Action", dated Jan. 4, 2022, 15 pages.
U.S. Appl. No. 16/654,258, "Final Office Action", dated May 27, 2022, 29 pages.
U.S. Appl. No. 16/654,258, "Non-Final Office Action", dated Feb. 17, 2022, 33 pages.
U.S. Appl. No. 16/654,258, "Notice of Allowance", dated Sep. 8, 2022, 12 pages.
U.S. Appl. No. 16/789,840, "Corrected Notice of Allowability", dated Apr. 5, 2022, 2 pages.
U.S. Appl. No. 16/789,840, "Non-Final Office Action", dated Oct. 1, 2021, 26 pages.
U.S. Appl. No. 16/789,840, "Notice of Allowance", dated Feb. 7, 2022, 17 pages.
Abbott et al., "Internet Argument Corpus 2.0: An SQL Schema for Dialogic Social Media and the Corpora to Go with it", In Language Resources and Evaluation Conference, 2016, pp. 4445-4452.
Airenti et al., "Conversation and Behavior Games in the Pragmatics of Dialogue", Cognitive Science, vol. 17, No. 2, Apr. 1993, pp. 197-256.
Ajjour et al., "Unit Segmentation of Argumentative Texts", Proceedings of the 4th Workshop on Argument Mining, Sep. 8, 2017, pp. 118-128.
Aker et al., "What Works and What Does Not: Classifier and Feature Analysis for Argument Mining", Proceedings of the 4th Workshop on Argument Mining, Sep. 8, 2017, pp. 91-96.
Aleman-Meza et al., "Context-Aware Semantic Association Ranking", Proceedings of the First International Conference on Semantic Web and Databases, Sep. 7-8, 2003, pp. 24-41.
Allen et al., "Analyzing Intention in Utterances", Artificial Intelligence, vol. 15, No. 3, Dec. 1980, pp. 143-178.
Alsinet et al., "A Logic Programming Framework for Possibilistic Argumentation: Formalization and Logical Properties", Fuzzy Sets and Systems, vol. 159, No. 10, May 16, 2008, pp. 1208-1228.
Altinel et al., "A Corpus-Based Semantic Kernel for Text Classification by Using Meaning Values of Terms", Engineering Applications of Artificial Intelligence, vol. 43, Aug. 2015, pp. 54-66.
An Vo, "FBK-HLT: A New Framework for Semantic Textual Similarity", Proceedings of the 9th International Workshop on Semantic Evaluation (SemEval 2015), Jun. 2015, pp. 102-106.
Antoniou et al., "Representation Results for Defeasible Logic", Association for Computing Machinery Transactions on Computational Logic, vol. 2, No. 2, Apr. 2001, pp. 255-287.
Appel et al., "A Hybrid Approach to the Sentiment Analysis Problem at the Sentence Level", Knowledge-Based Systems, vol. 108, May 20, 2016, 32 pages.
Aurora, "Freudian Metaphor and Surrealist Metalanguage in Michel Leiris' Failles: The Unconscious and the Sea", Litte Realite, vol. 13, 2001, 10 pages.
Banerjee et al., "WikiWrite: Generating Wikipedia Articles Automatically", Proceedings of the Twenty-Fifth International Joint Conference on Artificial Intelligence (IJCAI-16), Jul. 2016, pp. 2740-2746.
Banko et al., "Open Information Extraction from the Web", In Proceedings of the Twentieth International Joint Conference on Artificial Intelligence, Jan. 6-12, 2007, pp. 2670-2676.
Baralis et al., "Generalized Association Rule Mining with Constraints", Information Sciences, vol. 194, Jul. 2012, pp. 68-84.
Bar-Haim et al., "Improving Claim Stance Classification with Lexical Knowledge Expansion and Context Utilization", Proceedings of the 4th Workshop on Argument Mining, Sep. 8, 2017, pp. 32-38.
Bar-Haim et al., "Semantic Inference at the Lexical-Syntactic Level", Proceedings of Association for the Advancement of Artificial Intelligence, Jul. 2007, pp. 871-876.
Baroni et al., "Argumentation Through a Distributed Self-Stabilizing Approach", Journal of Experimental & Theoretical Artificial Intelligence, vol. 14, No. 4, 2002, pp. 273-301.
Baroni et al., "Cleaneval: A Competition for Cleaning Web Pages", Proceedings of the Sixth International Conference on Language Resources and Evaluation, May 2008, pp. 638-643.
Barzilay et al., "Modeling Local Coherence: An Entity-Based Approach", Computational Linguistics, vol. 34, No. 1, Mar. 2008, pp. 1-34.
Bedi et al., "Argumentation-Enabled Interest-Based Personalized Recommender System", Journal of Experimental & Theoretical Artificial Intelligence, vol. 27, No. 2, 2015, pp. 1-45.
Bengio et al., "A Neural Probabilistic Language Model", Journal of Machine Learning Research, vol. 3, Feb. 3, 2003, pp. 1137-1155.
Bentahar et al., "A Taxonomy of Argumentation Models Used for Knowledge Representation", Artificial Intelligence Review, vol. 33, No. 3, Mar. 2010, 49 pages.
Berzlanovich et al., "Coherence Structure and Lexical Cohesion in Expository and Persuasive Texts", Proceedings of the Workshop on Constraints in Discourse III, 2008, 8 pages.
Biran et al., "Identifying Justifications in Written Dialogs by Classifying Text as Argumentative", International Journal of Semantic Computing, vol. 5, No. 4, Dec. 2011, pp. 363-381.
Blaylock, "Managing Communicative Intentions in Dialogue Using a Collaborative Problem-Solving Model", The University of Rochester, Computer Science Department, Technical Report 774, Apr. 2002, 56 pages.
Blaylock et al., "Managing Communicative Intentions with Collaborative Problem Solving", Current and New Directions in Discourse and Dialogue, Chapter—4, 2003, pp. 63-84.
Blei et al., "Latent Dirichlet Allocation", Journal of Machine Learning Research, vol. 3, Jan. 2003, pp. 993-1022.
Boguslavsky et al., "Multilinguality in ETAP-3: Reuse of Lexical Resources", Proceedings of the Workshop on Multilingual Linguistic Ressources, Aug. 28, 2004, 8 pages.
Boltuzic et al., "Back up your Stance: Recognizing Arguments in Online Discussions", Proceedings of the First Workshop on Argumentation Mining, Jun. 26, 2014, pp. 49-58.
Bordini et al., "A Survey of Programming Languages and Platforms for Multi-Agent Systems", Informatica, vol. 30, No. 1, Jan. 2006, pp. 33-44.
Boyer et al., "MJRTY—A Fast Majority Vote Algorithm", Chapter 5, Automated Reasoning, 1991, pp. 105-117.
Britt et al., "Constructing Representations of Arguments", Journal of Memory and Language, vol. 48, No. 4, May 2003, pp. 794-810.
Bron et al., "Algorithm 457: Finding All Cliques of an Undirected Graph", Communications of the ACM, vol. 16, No. 9, Sep. 1973, pp. 575-579.
Brzezinski et al., "Accuracy Updated Ensemble for Data Streams with Concept Drift", International Conference on Hybrid Artificial Intelligence Systems, vol. 6679, May 23-25, 2011, pp. 155-163.

(56) References Cited

OTHER PUBLICATIONS

Bunke, "Graph-Based Tools for Data Mining and Machine Learning", Lecture Notes in Computer Science, vol. 2734, Jan. 2003, pp. 7-19.

Cabrio et al., "Combining Textual Entailment and Argumentation Theory for Supporting Online Debates Interactions", Proceedings of the 50th Annual Meeting of the Association for Computational Linguistics, Jul. 8-14, 2012, pp. 208-212.

Cai et al., "Extracting Content Structure for Web Pages Based on Visual Representation", LNCS, vol. 2642, Springer, Apr. 2003, 12 pages.

Cardie et al., "Guest Editor's Introduction: Machine Learning and Natural Language", Machine Learning, vol. 1, No. 5, Feb. 1999, pp. 1-5.

Carlson et al., "Building a Discourse-Tagged Corpus in the Framework of Rhetorical Structure Theory", Proceedings of the Second SIGdial Workshop on Discourse and Dialogue, vol. 16, Sep. 1-2, 2001, 10 pages.

Carlson et al., "Discourse Tagging Reference Manual", Available Online at https://www.isi.edu/~marcu/discourse/tagging-ref-manual.pdf, Sep. 11, 2001, pp. 1-87.

Carreras et al., "Introduction to the CoNLL—2004 Shared Task: Semantic Role Labeling", Proceedings of the Eighth Conference on Computational Natural Language Learning, Association for Computational Linguistics, May 6-7, 2004, pp. 89-97.

Carreyrou, "Hot Startup Theranos Has Struggled With Its Blood-Test Technology", Available Online at: https://www.wsj.com/articles/theranos-has-struggled-with-blood-tests-1444881901, Oct. 16, 2015, 6 pages.

Carstens et al., "Using Argumentation to Improve Classification in Natural Language Problems", Association for Computing Machinery Transactions on Internet Technology, vol. 17, No. 3, Jul. 2017, 23 pages.

Castellucci et al., "Context-Aware Models for Twitter Sentiment Analysis", Emerging Topics at the First Italian Conference on Computational Linguistics, vol. 1, No. 1, Dec. 2015, pp. 75-89.

Chakrabarti et al., "Graph Mining: Laws, Generators, and Algorithms", ACM Computing Surveys, vol. 38, No. 1, Mar. 2006, pp. 69-123.

Chali et al., "Complex Question Answering: Unsupervised Learning Approaches and Experiments", Journal of Artificial Intelligence Research, vol. 35, May 2009, pp. 1-47.

Charolles, "Cohesion, Coherence Et Pertinence De Discours", Travauxde Linguistique, vol. 29, 1995, pp. 125-151.

Chen, "Understanding Mental States in Natural Language", Proceedings of the 8th International Conference on Computational Semantics, Jan. 2009, pp. 61-72.

Chesnevar et al., "Empowering Recommendation Technologies Through Argumentation", Argumentation in Artificial Intelligence, May 2009, pp. 403-422.

Cohen, "Enron Email Dataset", Available Online at: https://www.cs.cmu.edu/~enron/, Jul. 10, 2016, 1 page.

Cohen et al., "Intention is Choice with Commitment", Artificial Intelligence, vol. 42, Nos. 2-3, Mar. 1990, pp. 213-261.

Collins et al., "Convolution Kernels for Natural Language", NIPS'01 Proceedings of the 14th International Conference on Neural Information Processing Systems: Natural and Synthetic, 2002, 8 pages.

Cox et al., "Metareasoning: A Manifesto", Association for the Advancement of Artificial Intelligence, 2007, 4 pages.

Cox et al., "Vicarious Learning from Dialogue and Discourse: A Controlled Comparison", Instructional Science, vol. 27, Nov. 1999, pp. 431-458.

Craig et al., "Overhearing Dialogues and Monologues in Virtual Tutoring Sessions: Effects on Questioning and Vicarious Learning", International Journal of Artificial Intelligence in Education, vol. 11, Jan. 2000, pp. 242-253.

Cristea et al., "Veins Theory: A Model of Global Discourse Cohesion and Coherence", In C. Boitet & P. Whitelock (Eds.), 17th International Conference on Computational Linguistics, Aug. 1998, pp. 281-285.

Croft et al., "Search Engines—Information Retrieval in Practice", Pearson Education, 2010, 542 pages.

Cumby et al., "On Kernel Methods for Relational Learning", Proceedings of the Twentieth International Conference on Machine Learning, Aug. 2003, pp. 107-114.

Cuzzocrea, "Intelligent Knowledge-Based Models and Methodologies for Complex Information Systems", Information Sciences, vol. 194, Jul. 1, 2012, pp. 1-3.

Damer, "Attacking Faulty Reasoning: A Practical Guide to Fallacy-Free Reasoning", Wadsworth Cengage Learning, 2009, 257 pages.

Das et al., "Frame-Semantic Parsing", Computational Linguistics, vol. 40, No. 1, Mar. 2014, pp. 9-56.

De Boni, "Using Logical Relevance for Question Answering", Journal of Applied Logic, vol. 5, No. 1, Mar. 2007, pp. 92-103.

De Mori et al., "Spoken Language Understanding", Institute of Electrical and Electronics Engineers Signal Processing Magazine, vol. 25, No. 3, May 2008, pp. 50-58.

De Salvo Braz et al., "An Inference Model for Semantic Entailment in Natural Language", AAAI'05 Proceedings of the 20th National Conference on Artificial Intelligence, vol. 3, Jul. 9-13, 2005, pp. 1043-1049.

Devillez, "Writing: Step by Step", Kendall Hunt, 2003.

Dijkstra, "Programming Considered as a Human Activity", Proceedings IFIP Congress, 1965, 7 pages.

Ding et al., "Swoogle: A Search and Metadata Engine for the Semantic Web", CIKM '04 Proceedings of the Thirteenth ACM International Conference on Information and Knowledge Management, Nov. 8-13, 2004, pp. 652-659.

Ebrahim, "NLP Tutorial Using Python NLTK (Simple Examples)", Dzone, Sep. 24, 2017, pp. 1-10.

Eckle-Kohler et al., "On the Role of Discourse Markers for Discriminating Claims and Premises in Argumentative Discourse", Proceedings of the 2015 Conference on Empirical Methods in Natural Language Processing, Sep. 17-21, 2015, pp. 2236-2242.

Egg et al., "Underspecified Discourse Representation", Constraints in Discourse, 2008, pp. 117-138.

Endres-Niggemeyer et al., "Summarizing Text for Intelligent Communication", Dagstuhl Seminar Report 79, 1995, 36 pages.

Erenel et al., "Nonlinear Transformation of Term Frequencies for Term Weighting in Text Categorization", Engineering Applications of Artificial Intelligence, vol. 25, No. 7, Oct. 2012, pp. 1505-1514.

Feng et al., "A Linear-Time Bottom-Up Discourse Parser with Constraints and Post-Editing", Proceedings of the 52nd Annual Meeting of the Association for Computational Linguistics, Jun. 23-25, 2014, pp. 511-521.

Feng et al., "Classifying Arguments by Scheme", Proceedings of the 49th Annual Meeting of the Association for Computational Linguistics, vol. 1, Jun. 19-24, 2011, pp. 987-996.

Feng et al., "Distributional Footprints of Deceptive Product Reviews", Proceedings of the Sixth International Association for the Advancement of Artificial Intelligence Conference on Weblogs and Social Media, The Association for the Advancement of Artificial Intelligence Press, Jan. 2012, pp. 98-105.

Feng, "RST-Style Discourse Parsing and Its Applications in Discourse Analysis", University of Toronto, Jun. 2015, 89 pages.

Feng et al., "Syntactic Stylometry for Deception Detection", In Association for Computational Linguistics 12, Proceedings of the 50th Annual Meeting of the Association for Computational Linguistics, Jul. 8-14, 2012, pp. 171-175.

Feng et al., "Text-Level Discourse Parsing with Rich Linguistic Features", Proceedings of the 50th Annual Meeting of the Association for Computational Linguistics, vol. 1, Jul. 8-14, 2012, pp. 60-68.

Feng et al., "The Impact of Deep Hierarchical Discourse Structures in the Evaluation of Text Coherence", Proceedings of COLING 2014, the 25th International Conference on Computational Linguistics, Aug. 2014, 10 pages.

Ferraiolo et al., "Role-Based Access Controls", Proceedings of the 15th NIST-NSA National Computer Security Conference, Oct. 13-16, 1992, 11 pages.

(56) References Cited

OTHER PUBLICATIONS

Ferretti et al., "A Possibilistic Defeasible Logic Programming Approach to Argumentation-Based Decision-Making", Journal of Experimental & Theoretical Artificial Intelligence, vol. 26, No. 4, Jun. 10, 2014, pp. 519-550.

Ferretti et al., "An Application of Defeasible Logic Programming to Decision Making in a Robotic Environment", International Conference on Logic Programming and Nonmonotonic Reasoning, vol. 4483, May 2007, pp. 297-302.

Finn, "A Question Writing Algorithm", Journal of Reading Behavior, VII, vol. 4, 1975, pp. 341-367.

Florou et al., "Argument Extraction for Supporting Public Policy Formulation", Proceedings of the 7th Workshop on Language Technology for Cultural Heritage, Social Sciences, and Humanities, Aug. 8, 2013, pp. 49-54.

Folino et al., "Special Section: Bio-Inspired Algorithms for Distributed Systems", Future Generation Computer Systems, vol. 26, No. 6, Mar. 2010, pp. 835-837.

Foltz et al., "The Measurement of Textual Coherence with Latent Semantic Analysis", Discourse Processes, vol. 25, Nos. 2-3, 1998, 31 pages.

Fornaciari et al., "Identifying Fake Amazon Reviews as Learning from Crowds", Proceedings of the 14th Conference of the European Chapter of the Association for Computational Linguistics, Apr. 26-30, 2014, pp. 279-287.

Fox, "Discourse Structure and Anaphora: Written and Conversational English", Cambridge University Press, 1987, 19 pages.

Freeley et al., "Argumentation and Debate", Critical Thinking for Reasoned Decision Making, Eleventh Edition, vol. 27, No. 3, Jun. 10, 1991, pp. 137-152.

Galitsky et al., "A Novel Approach for Classifying Customer Complaints Through Graphs Similarities in Argumentative Dialogues", Decision Support Systems, vol. 46, No. 3, Feb. 2009, pp. 717-729.

Galitsky, "A Tool for Efficient Content Compilation", Proceedings of COLING 2016, the 26th International Conference on Computational Linguistics: System Demonstrations, Dec. 11-17, 2016, pp. 198-202.

Galitsky et al., "A Web Mining Tool for Assistance with Creative Writing", European Conference on Information Retrieval, vol. 7814, Mar. 2013, pp. 828-831.

Galitsky et al., "Assessing Plausibility of Explanation and Meta-Explanation in Inter-Human Conflicts", Engineering Applications of Artificial Intelligence, vol. 24, No. 8, Dec. 2011, pp. 1472-1486.

Galitsky et al., "Chatbot with a Discourse Structure-Driven Dialogue Management", Proceedings of the Software Demonstrations of the 15th Conference of the European Chapter of the Association for Computational Linguistics, Apr. 3-7, 2017, pp. 87-90.

Galitsky et al., "Concept-Based Learning of Human Behavior for Customer Relationship Management", Information Sciences, vol. 181, No. 10, May 15, 2011, pp. 2016-2035.

Galitsky et al., "Discovering Common Outcomes of Agents' Communicative Actions in Various Domains", Knowledge-Based Systems, vol. 24, No. 2, Mar. 2011, pp. 210-229.

Galitsky, "Finding a Lattice of Needles in a Haystack: Forming a Query from a Set of Items of Interest", FCA4AI'15 Proceedings of the 4th International Conference, vol. 1430, Jan. 2015, 8 pages.

Galitsky et al., "Improving Text Retrieval Efficiency with Pattern Structures on Parse Thickets", Formal Concept Analysis Meets Information Retrieval, ECIR, 2013, 16 pages.

Galitsky et al., "Improving Trust in Automation of Social Promotion", Association for the Advancement of Artificial Intelligence, Jan. 2014, pp. 28-35.

Galitsky et al., "Inferring the Semantic Properties of Sentences by Mining Syntactic Parse Trees", Data & Knowledge Engineering, vol. 81-82, Nov.-Dec. 2012, 44 pages.

Galitsky et al., "Learning Communicative Actions of Conflicting Human Agents", Journal of Experimental & Theoretical Artificial Intelligence, vol. 20, No. 4, Dec. 2008, pp. 277-317.

Galitsky, "Learning Noisy Discourse Trees", Computational Linguistics and Intellectual Technologies, Proceedings of the International Conference "Dialogue 2017". Available Online at: http://www.dialog-21.ru/media/3911/galitskyb.pdf, May 31-Jun. 3, 2017, 14 pages.

Galitsky, "Learning Parse Structure of Paragraphs and its Applications in Search", Engineering Applications of Artificial Intelligence, vol. 32, Jun. 2014, pp. 1-25.

Galitsky, "Machine Learning of Syntactic Parse Trees for Search and Classification of Text", Engineering Applications of Artificial Intelligence, vol. 26, No. 3, Mar. 2013, pp. 1072-1091.

Galitsky, "Matching Parse Thickets for Open Domain Question Answering", Data & Knowledge Engineering, vol. 107, Jan. 2017, pp. 24-50.

Galitsky et al., "Matching Sets of Parse Trees for Answering Multi-Sentence Questions", Proceedings of Recent Advances in Natural Language Processing, Sep. 7-13, 2013, pp. 285-293.

Galitsky, "Natural Language Question Answering System: Technique of Semantic Headers", Advanced Knowledge International, vol. 2, Apr. 2003, 333 pages.

Galitsky et al., "Parse Thicket Representations for Answering Multi-Sentence Search", International Conference on Conceptual Structures, vol. 7735, Jan. 2013, 13 pages.

Galitsky et al., "Rhetoric Map of an Answer to Compound Queries", Proceedings of the 53rd Annual Meeting of the 20 Association for Computational Linguistics and the 7th International Joint Conference of Natural Language Processing, vol. 2, Jul. 26-31, 2015, pp. 681-686.

Galitsky et al., "Text Classification into Abstract Classes Based on Discourse Structure", Proceedings of Recent Advances in Natural Language Processing, Sep. 7-9, 2015, pp. 200-207.

Galitsky et al., "Text Integrity Assessment: Sentiment Profile vs Rhetoric Structure", CICLing, Springer International Publishing, Apr. 2015, pp. 126-139.

Galitsky, "Transfer Learning of Syntactic Structures for Building Taxonomies for Search Engines", Engineering Applications of Artificial Intelligence, vol. 26, No. 10, Nov. 2013, 32 pages.

Galitsky, "Using Extended Tree Kernels to Recognize Metalanguage in Text", Studies in Computational Intelligence, Feb. 2017, 25 pages.

Galitsky et al., "Using Generalization of Syntactic Parse Trees for Taxonomy Capture on the Web", Proceedings of the 19th International Conference on Conceptual Structures, ICCS, Jul. 25, 2011, pp. 104-117.

Ganter et al., "Pattern Structures and Their Projections", International Conference on Conceptual Structures, Jul. 30-Aug. 3, 2001, 16 pages.

Garcia et al., "Defeasible Logic Programming: An Argumentative Approach", Theory and Practice of Logic Programming, vol. 4, No. 2, Jan. 2004, pp. 95-138.

Gartner, "Gartner Says 25 Percent of Customer Service Operations Will Use Virtual Customer Assistants by 2020", Newsroom, Available Online at https://www.gartner.com/newsroom/id/3858564, Feb. 19, 2018, pp. 1-3.

Ghosh et al., "Analyzing Argumentative Discourse Units in Online Interactions", Proceedings of the First Workshop on Argumentation Mining, Jun. 26, 2014, pp. 39-48.

Gildea, "Loosely Tree-Based Alignment for Machine Translation", Proceedings of the 41st Annual Meeting of the Association for Computational Linguistics, vol. 1, Jul. 2003, pp. 80-87.

Go et al., "Twitter Sentiment Classification Using Distant Supervision", Technical Report, Jan. 2009, 6 pages.

Golightly et al., "Writing and Reading in the Disciplines", Pearson Custom Publishing, 2000,.

Gomez et al., "CICBUAPnlp: Graph-Based Approach for Answer Selection in Community Question Answering Task", Proceedings of the 9th International Workshop on Semantic Evaluation (SemEval 2015), Jun. 4-5, 2015, pp. 18-22.

Gomez et al., "Reasoning with Inconsistent Ontologies through Argumentation", Applied Artificial Intelligence, vol. 24, No. 1-2, Feb. 2010, pp. 102-148.

(56) References Cited

OTHER PUBLICATIONS

Goutsos, "Modeling Discourse Topic: Sequential Relations and Strategies in Expository Text", Text, vol. 16, No. 4, Dec. 1, 1996, pp. 501-533.

Grefenstette et al., "Multi-Step Regression Learning for Compositional Distributional Semantics", Proceedings of the 10th International Conference on Computational Semantics, Jan. 30, 2013, 11 pages.

Grefenstette , "Towards a Formal Distributional Semantics: Simulating Logical Calculi with Tensors", University of Oxford, Apr. 28, 2013, 10 pages.

Grosz et al., "Attention, Intentions, and the Structure of Discourse", Computational Linguistics, vol. 12, No. 3, Jul.-Sep. 1986, pp. 175-204.

Grosz et al., "Discourse Analysis, in Understanding Spoken Language", Elsevier North-Holland, 1978, 36 pages.

Hai et al., "Deceptive Review Spam Detection via Exploiting Task Relatedness and Unlabeled Data", Proceedings of the 2016 Conference on Empirical Methods in Natural Language Processing, Nov. 1-5, 2016, pp. 1817-1826.

Hall et al., "The Weka Data Mining Software: An Update", Special Interest Group on Knowledge Discovery and Data Mining, Explorations Newsletter, vol. 11, No. 1, Available Online at: http://dx.doi.org/10.1145/1656274.1656278, Jun. 2009, pp. 10-18.

Halliday et al., "Cohesion in English", vol. 14, No. 1, 1980, pp. 47-50.

Hart et al., "Text Classification for Data Loss Prevention", Proceedings of the 11th International Conference on Privacy Enhancing Technologies, Jul. 27-29, 2011, 21 pages.

Haussler, "Convolution Kernels on Discrete Structures UCSC-CRL-99-10", University of California, Santa Barbara Technical Report, Jul. 8, 1999, 38 pages.

Hendrikx et al., "Procedural Content Generation for Games: A Survey", ACM Transactions on Multimedia Computing, Communications and Applications, vol. 9, No. 1, Feb. 2013, pp. 1:1-1:22.

Hernault et al., "A Sequential Model for Discourse Segmentation", International Conference on Intelligent Text Processing and Computational Linguistics, CICLing 2010: Computational Linguistics and Intelligent Text Processing, Mar. 21-27, 2010, pp. 315-326.

Hobbs, "Coherence and Coreference", Cognitive Science, vol. 3, No. 1, Jan.-Mar. 1979, pp. 67-90.

Hogenboom et al., "Polarity Classification Using Structure-Based Vector Representations of Text", Decision Support Systems, vol. 74, Issue C, Jun. 1, 2015, 18 pages.

Hogenboom et al., "Using Rhetorical Structure in Sentiment Analysis", Communications of the ACM, vol. 58, No. 7, Jul. 2015, pp. 69-77.

Houngbo et al., "An Automated Method to Build A Corpus of Rhetorically-Classified Sentences in Biomedical Texts", Proceedings of the First Workshop on Argumentation Mining, Association for Computational Linguistics, Jun. 26, 2014, pp. 19-23.

Ilvovsky , "Going Beyond Sentences When Applying Tree Kernels", Proceedings of the Student Research Workshop, vol. 20, No. 4, Jun. 22-27, 2014, pp. 56-63.

Iosif et al., "Unsupervised Semantic Similarity Computation Between Terms Using Web Documents", Institute of Electrical and Electronics Engineers Transactions on Knowledge and Data Engineering, vol. 22, No. 11, Nov. 2010, pp. 1637-1647.

Iruskieta et al., "A Qualitative Comparison Method for Rhetorical Structures: Identifying Different Discourse Structures in Multilingual Corpora", Lang Resources & Evaluation, vol. 49, No. 2, May 28, 2014, 47 pages.

Jaccard, "The Distribution of the Flora in the Alpine Zone", New Phytologist, vol. 11, No. 2, Feb. 1912, 15 pages.

Jansen et al., "Discourse Complements Lexical Semantics for Non-Factoid Answer Reranking", Proceedings of the 52nd Annual Meeting of the Association for Computational Linguistics, vol. 1, Jun. 23-25, 2014, pp. 977-986.

Janusz et al., "Unsupervised Similarity Learning from Textual Data", Fundamenta Informaticae, vol. 119, Aug. 2012, pp. 319-336.

Ji et al., "Neural Discourse Structure for Text Categorization", Proceedings of the 55th Annual Meeting of the Association for Computational Linguistics, vol. 1, Jul. 30-Aug. 4, 2017, pp. 996-1005.

Jindal et al., "Opinion Spam and Analysis", Proceeding WSDM '08 Proceedings of the 2008 International Conference on Web Search and Data Mining, Feb. 11, 2008, pp. 219-229.

Joachims et al., "Cutting-Plane Training of Structural SVMs", Machine Learning, vol. 77, No. 1, May 9, 2009, pp. 27-59.

John et al., "Estimating Continuous Distributions in Bayesian Classifiers", Proceedings of the Eleventh Conference on Uncertainty in Artificial Intelligence, Aug. 18, 1995, 8 pages.

Johnson et al., "Procedural Generation of Linguistics, Dialects, Naming Conventions and Spoken Sentences", Proceedings of 1st International Joint Conference of DiGRA and FDG, 2016, pp. 1-9.

Jorgensen et al., "Challenges of Studying and Processing Dialects in Social Media", Proceedings of the ACL 2015 Workshop on Noisy User-Generated Text, Jul. 1, 2015, pp. 9-18.

Joty et al., "A Novel Discriminative Framework for Sentence-Level Discourse Analysis", Proceedings of the Joint Conference on Empirical Methods in Natural Language Processing and Computational Natural Language Learning, Jul. 12-14, 2012, pp. 904-915.

Joty et al., "CODRA: A Novel Discriminative Framework for Rhetorical Analysis", Computational Linguistics, vol. 41, No. 3, Sep. 1, 2015, pp. 385-435.

Joty et al., "Combining Intra- and Multi-Sentential Rhetorical Parsing for Document-Level Discourse Analysis", 51st Annual Meeting of the Association for Computational Linguistics, vol. 1, Aug. 9, 2013, pp. 486-496.

Joty et al., "Discriminative Reranking of Discourse Parses Using Tree Kernels", Proceedings of the 2014 Conference on Empirical Methods in Natural Language Processing, Oct. 25-29, 2014, pp. 2049-2060.

Jurafsky et al., "Speech and Language Processing: An Introduction to Natural Language Processing, Computational Linguistics, and Speech Recognition", Pearson, Prentice Hall, Jan. 26, 2000, pp. 719-761.

Kapoor et al., "Algorithms for Enumerating All Spanning Trees of Undirected and Weighted Graph", SIAM Journal on Computing, vol. 24, No. 2, Society for Industrial and Applied Mathematics, Apr. 1995, pp. 247-265.

Kate et al., "Learning to Transform Natural to Formal Languages", Conference: Proceedings, The Twentieth National Conference on Artificial Intelligence and the Seventeenth Innovative Applications of Artificial Intelligence Conference, Jul. 2005, 7 pages.

Keltner et al., "Understanding Emotions", Third Edition, Wiley & Co., Feb. 1996, 521 pages.

Khan et al., "SWIMS: Semi-Supervised Subjective Feature Weighting and Intelligent Model Selection for Sentiment Analysis", Knowledge-Based Systems, vol. 100, May 15, 2016, pp. 97-111.

Kim et al., "Medevi: Retrieving Textual Evidence of Relations Between Biomedical Concepts from Medline", Bioinformatics, vol. 24, No. 11, Jun. 1, 2008, pp. 1410-1412.

Kipper et al., "A Large-Scale Classification of English Verbs", Language Resources and Evaluation Journal, vol. 42, Dec. 2008, pp. 21-40.

Kipper et al., "VerbNet Overview, Extensions, Mappings and Applications", Proceedings of Human Language Technologies, Annual Conference of the North American Chapter of the Association for Computational Linguistics, Companion, Volume: Tutorial Abstracts, Jun. 2009, pp. 13-14.

Kirschner et al., "Linking the Thoughts: Analysis of Argumentation Structures in Scientific Publications", Proceedings of the 2nd Workshop on Argumentation Mining, Jun. 4, 2015, pp. 1-11.

Klenner, "A Model for Multi-Perspective Opinion Inferences", Proceedings of IJCAI Workshop Natural Language Meets Journalism, Jul. 9, 2016, pp. 6-11.

Kohavi, "A Study of Cross-Validation and Bootstrap for Accuracy Estimation and Model Selection", Proceedings of the 14th International Joint Conference on Artificial Intelligence, vol. 2, Aug. 20, 1995, 7 pages.

Kong, "Are Simple Business Request Letters Really Simple? A Comparison of Chinese and English Business Request Letters",

(56) References Cited

OTHER PUBLICATIONS

Text—Interdisciplinary Journal for the Study of Discourse, vol. 18, No. 1, Jan. 1, 1998, pp. 103-141.
Kong et al., "Improve Tree Kernel-Based Event Pronoun Resolution with Competitive Information", Proceedings of the Twenty-Second International Joint Conference on Artificial Intelligence, vol. 3, Jul. 16-22, 2011, pp. 1814-1819.
Kontos et al., "Question Answering and Rhetoric Analysis of Biomedical Texts in the Aroma System", National and Kapodistrian University of Athens, Unpublished Manuscript, 2006, 6 pages.
Krippendorff, "Reliability in Content Analysis: Some Common Misconceptions and Recommendations", Human Communication Research, vol. 30, No. 3, Jul. 2004, 15 pages.
Kuncheva, "Classifier Ensembles for Changing Environments", Proceedings 5th Int. Workshop on Multiple Classifier Systems, Springer-Verlag, LNCS, vol. 3077, Jun. 2004, pp. 1-15.
Kwon et al., "Identifying and Classifying Subjective Claims", The Proceedings of the 8th Annual International Digital Government Research Conference, May 20-23, 2007, pp. 76-81.
Lawrence et al., "Combining Argument Mining Techniques", Working Notes of the 2nd Argumentation Mining Workshop, Jun. 4, 2015, pp. 127-136.
Lawrence et al., "Mining Argumentative Structure from Natural Language Text Using Automatically Generated Premise-Conclusion Topic Models", Proceedings of the 4th Workshop on Argument Mining, Sep. 8, 2017, pp. 39-48.
Lee et al., "Deterministic Coreference Resolution Based on Entity-Centric, Precision-Ranked Rules", Computational Linguistics, vol. 39, No. 4, 2013, pp. 885-916.
Lee, "Genres, Registers, Text Types, Domain, and Styles: Clarifying the Concepts and Navigating a Path Through the BNC Jungle", Language Learning & Technology, vol. 5, No. 3, Sep. 2001, pp. 37-72.
Leouski et al., "An Evaluation of Techniques for Clustering Search Results", Available Online at http://citeseerx.ist.psu.edu/viewdoc/download?doi=10.1.1.34.5627&rep=rep1&type=pdf, 1996, pp. 1-19.
Levenshtein et al., "Binary Codes Capable of Correcting Deletions, Insertions, and Reversals", Cybernetics and Control Theory, vol. 10, No. 8, Feb. 1966, pp. 707-710.
Levinson, "Presumptive Meanings: The Theory of Generalized Conversational Implicature", Cambridge, MA: The Massachusetts Institute of Technology Press, Jan. 2000, pp. 1-10.
Li et al., "Adversarial Learning for Neural Dialogue Generation", Empirical Methods in Natural Language Processing, Sep. 7-11, 2017, pp. 2157-2169.
Li et al., "DailyDialog: A Manually Labelled Multi-Turn Dialogue Dataset", Proceedings of the Eighth International Joint Conference on Natural Language Processing, Long Papers, vol. 1, Dec. 1, 2017, pp. 986-995.
Li et al., "Deep Reinforcement Learning for Dialogue Generation", Empirical Methods in Natural Language Processing, Available Online at: https://www.aclweb.org/anthology/D16-1127, Nov. 2016, pp. 1192-1202.
Li et al., "Recursive Deep Models for Discourse Parsing", Conference: Proceedings of the 2014 Conference on Empirical Methods in Natural Language Processing, Jan. 2014, 10 pages.
Liapis et al., "Sentient Sketchbook: Computer-Aided Game Level Authoring", In Proceedings of Association for Computing Machinery Conference on Foundations of Digital Games, May 2013, pp. 213-220.
Lin et al., "A PDTB-Styled End-to-End Discourse Parser", Natural Language Engineering, vol. 20, No. 2, Apr. 2014, pp. 151-184.
Lin et al., "DIRT—Discovery of Inference Rules from Text", Proceedings of the Seventh ACM SIGKDD International Conference on Knowledge Discovery and Data Mining, Aug. 26-29, 2001, pp. 323-328.
Lin et al., "Recognizing Implicit Discourse Relations in the Penn Discourse Treebank", Conference: Proceedings of the 2009 Conference on Empirical Methods in Natural Language Processing, vol. 1, Aug. 6-7, 2009, pp. 343-351.
Lippi et al., "Argumentation Mining: State of the Art and Emerging Trends", ACM Transactions on Internet Technology, vol. 16, No. 2, Article 10, Mar. 2016, pp. 1-25.
Lippi et al., "MARGOT: A Web Server for Argumentation Mining", Expert Systems with Applications, vol. 65, Dec. 2016, pp. 292-303.
Litman et al., "A Plan Recognition Model for Subdialogues in Conversations", Cognitive Science, vol. 11, No. 2, Apr. 1987, pp. 163-200.
Lowe et al., "On the Evaluation of Dialogue Systems with Next Utterance Classification", Proceedings of the 17th Annual Meeting of the Special Interest Group on Discourse and Dialogue, Sep. 13-15, 2016, pp. 264-269.
Luan et al., "LSTM based Conversation Models", arXiv:1603.09457v1, Mar. 31, 2016, 5 pages.
Macewan, "The Essentials of Argumentation", D. C. Heath, 1898, 474 pages.
Makhalova et al., "News Clustering Approach Based on Discourse Text Structure", Proceedings of the First Workshop on Computing News Storylines, Jul. 2015, pp. 16-20.
Makhalova et al., "Pattern Structures for News Clustering", Proceedings of the 4th International Conference on What can FCA do for Artificial Intelligence, vol. 1430, Jul. 2015, pp. 35-42.
Mann, "Discourse Structures forText Generation", Proceedings of the 10th International Conference on Computational Linguistics and 22nd Annual Meeting on Association for Computational Linguistics, Jul. 2-6, 1984, pp. 367-375.
Mann et al., "Rhetorical Structure Theory and Text Analysis", University of Southern California, Nov. 1989, 66 pages.
Mann et al., "Rhetorical Structure Theory: Towards a Functional Theory of Text Organization", Text-Interdisciplinary Journal for the Study of Discourse, vol. 8, No. 3, Jan. 1988, pp. 243-281.
Manning et al., "An Introduction to Information Retrieval", Cambridge University Press, vol. 39, 2008, 581 pages.
Marcu, "From Discourse Structures to Text Summaries", Proceedings of the ACL Workshop on Intelligent Scalable Text Summarization, 1997, pp. 82-88.
Markle-Huss et al., "Improving Sentiment Analysis with Document-Level Semantic Relationships from Rhetoric Discourse Structures", 50th Hawaii International Conference on System Sciences, Jan. 2017, pp. 1142-1151.
Mavridis et al., "Semantic Analysis of Web Documents for the Generation of Optimal Content", Engineering Applications of Artificial Intelligence, vol. 35, Oct. 2014, pp. 114-130.
Mcnamara et al., "Are Good Texts Always Better? Interactions of Text Coherence, Background Knowledge, and Levels of Understanding in Learning from Text", Cognition and Instruction, vol. 14, No. 1, Mar. 1996, pp. 1-43.
Mercier et al., "Why Do Humans Reason? Arguments for an Argumentative Theory", Behavioral and Brain Sciences, vol. 34, No. 2, Apr. 2011, pp. 57-111.
Mikolov et al., "Distributed Representations of Words and Phrases and Their Compositionality", Advances in Neural Information Processing Systems, vol. 26, Oct. 16, 2013, pp. 1-9.
Mitchell et al., "Composition in Distributional Models of Semantics", Cognitive Science, vol. 34, No. 8, Mar. 25, 2010, pp. 1388-1429.
Mitkov et al., "A Computer-Aided Environment for Generating Multiple-Choice Test Items", Natural Language Engineering, vol. 12, No. 2, Jun. 2006, pp. 177-194.
Mitocariu et al., "Comparing Discourse Tree Structures", Computational Linguistics and Intelligent Text Processing 14th International Conference, vol. 7816, Mar. 24-30, 2013, 11 pages.
Mochales et al., "Argumentation Mining", Artificial Intelligence and Law, vol. 19, No. 1, Apr. 11, 2011, pp. 1-22.
Moens et al., "Argumentation Mining: Where are We Now, Where Do We Want to Be and How Do We Get There?", FIRE '12 & '13: Post-Proceedings of the 4th and 5th Workshops of the Forum for Information Retrieval Evaluation, No. 2, Dec. 2013, pp. 1-6.
Moens et al., "Automatic Detection of Arguments in Legal Texts", Proceedings of the 11th International Conference on Artificial Intelligence and Law, ICAIL 2007, Jun. 4-8, 2007, pp. 225-230.

(56) References Cited

OTHER PUBLICATIONS

Moldovan et al., "COGEX: A Logic Prover for Question Answering", Proceedings of HLT-NAACL, Main Papers, May-Jun. 2003, pp. 87-93.
Moreda et al., "Corpus-Based Semantic Role Approach in Information Retrieval", Data & Knowledge Engineering, vol. 61, No. 3, Jun. 2007, pp. 467-483.
Moschitti, "Efficient Convolution Kernels for Dependency and Constituent Syntactic Trees", European Conference on Machine Learning, Sep. 2006, pp. 318-329.
Moschitti, "Kernel Methods, Syntax and Semantics for Relational Text Categorization", In proceeding of ACM 17th Conference on Information and Knowledge Management, Oct. 26-30, 2008, pp. 253-262.
Mozina et al., "Argument Based Machine Learning from Examples and Text", First Asian Conference on Intelligent Information and Database Systems, Apr. 2009, pp. 18-23.
Mukherjee et al., "Fake Review Detection: Classification and Analysis of Real and Pseudo Reviews", Technical Report, Department of Computer Science, 2013, 11 pages.
Mukherjee et al., "What Yelp Fake Review Filter Might Be Doing?", Proceedings of the Seventh International Association for the Advancement of Artificial Intelligence Conference on Weblogs and Social Media, Jan. 2013, pp. 409-418.
Nagarajan et al., "Pivotal Sentiment Tree Classifier", International Journal of Scientific & Technology Research, vol. 3, No. 11, Nov. 15, 2014, pp. 290-295.
Oraby et al., "And That's a Fact: Distinguishing Factual and Emotional Argumentation in Online Dialogue", Proceedings of the 2nd Workshop on Argumentation Mining, Jun. 4, 2015, pp. 116-126.
O'Reilly et al., "Reversing the Reverse Cohesion Effect: Good Texts Can Be Better for Strategic, High-Knowledge Readers", Discourse Processes, vol. 43, No. 2, Dec. 5, 2007, pp. 121-152.
Ott et al., "Finding Deceptive Opinion Spam by Any Stretch of the Imagination", Proceedings of the 49th Annual Meeting of the Association for Computational Linguistics, vol. 1, Jun. 19-24, 2011, pp. 309-319.
Ott et al., "Negative Deceptive Opinion Spam", Proceedings of the Conference of the North American Chapter of the Association for Computational Linguistics, Jun. 9-14, 2013, pp. 497-501.
Pak et al., "Twitter as a Corpus for Sentiment Analysis and Opinion Mining", Proceedings of the International Conference on Language Resources and Evaluation, May 17-23, 2010, pp. 1320-1326.
Palmer, "SemLink: Linking PropBank, VerbNet and FrameNet", Proceedings of the Generative Lexicon Conference, GL 2009, Sep. 17, 2009, 54 pages.
Pasternack et al., "Extracting Article Text from the Web with Maximum Subsequence Segmentation", Proceedings of the 18th International Conference on World Wide Web, Apr. 20-24, 2009, pp. 971-980.
PCT/US2018/031890, "International Search Report and Written Opinion", dated Aug. 17, 2018, 12 pages.
PCT/US2018/053392, "International Search Report and Written Opinion", dated Dec. 17, 2018, 11 pages.
Peldszus et al., "From Argument Diagrams to Argumentation Mining in Texts: A Survey", International Journal of Cognitive Informatics and Natural Intelligence, vol. 7, No. 1, Jan. 1, 2013, pp. 1-31.
Pelsmaekers et al., "Rhetorical Relations and Subordination in L2 Writing", Linguistic Choice Across Genres Variation in Spoken and Written English, Jul. 15, 1998, pp. 191-213.
Pendyala et al., "Towards a Truthful World Wide Web from a Humanitarian Perspective", Institute of Electrical and Electronics Engineers 2015 Global Humanitarian Technology Conference, Oct. 8-11, 2015, 7 pages.
Perrin et al., "An Information-Theoretic Based Model for Large-Scale Contextual Text Processing", Information Sciences, vol. 116, Nos. 2-4, Jan. 1999, pp. 229-252.
Persing et al., "Modeling Argument Strength in Student Essays", Proceedings of the 53rd Annual Meeting of the Association for Computational Linguistics and the 7th International Joint Conference on Natural Language Processing, Jul. 26-31, 2015, pp. 543-552.
Piwek et al., "T2D: Generating Dialogues Between Virtual Agents Automatically from Text", Intelligent Virtual Agents, LNAI, vol. 4722, Sep. 2007, pp. 161-174.
Plotkin, "A Note on Inductive Generalization", Machine Intelligence 5, Chapter 8, 1970, pp. 153-163.
Ponti, "Machine Learning Techniques Applied to Dependency Parsing", Available Online at: https://vision.unipv.it/AI/AIRG/MachineLearningTechniquesAppliedToDependencyParsingRevised.pdf, Oct. 2015, 45 pages.
Poon et al., "Unsupervised Semantic Parsing", Proceedings of the 2009 Conference on Empirical Methods in Natural Language Processing, Aug. 2009, pp. 1-10.
Popescu et al., "Logic-Based Rhetorical Structuring for Natural Language Generation in Human-Computer Dialogue", Proceedings of the 10th International Conference on Text, Speech and Dialogue, Sep. 3-7, 2007, pp. 309-317.
Popescu-Belis, "Dialogue Acts: One or More Dimensions?", ISSCO Working Paper No. 62, University of Geneva, Nov. 2005, pp. 1-46.
Prasad et al., "The Penn Discourse TreeBank 2.0", Proceedings of the Sixth International Conference on Language Resources and Evaluation, 2008, 8 pages.
Radev et al., "Centroid-Based Summarization of Multiple Documents: Sentence Extraction, Utility-Based Evaluation, 60 and User Studies", Proceedings of the 2000 NAACL-ANLP Workshop on Automatic Summarization—vol. 4, Available Online at: https://doi.org/10.3115/1117575.1117578, Dec. 2000, 10 pages.
Radford et al., "Learning to Generate Reviews and Discovering Sentiment", Available Online at: https://arxiv.org/pdf/1704.01444.pdf, Apr. 2017, 9 pages.
Rahwan et al., "An Argumentation-Based Approach for Practical Reasoning", Proceedings of the Fifth International Joint Conference on Autonomous Agents and Multiagent Systems, May 8-12, 2006, pp. 347-354.
Rayana et al., "Collective Opinion Spam Detection: Bridging Review Networks and Metadata", Proceedings of the 21st Association for Computing Machinery Special Interest Group on Knowledge Discovery and Data Mining International Conference on Knowledge Discovery and Data Mining, Aug. 11-14, 2015, 10 pages.
Recasens et al., "The Life and Death of Discourse Entities: Identifying Singleton Mentions", Proceedings of Conference of the North American Chapter of the Association for Computational Linguistics: Human Language Technologies, Jun. 9-14, 2013, pp. 627-633.
Redeker, "Coherence and Structure in Text and Discourse", In: William Black & Harry Bunt (eds.), Abduction, Belief and Context in Dialogue. Studies in Computational Pragmatics, Jan. 2000, pp. 1-28.
Redey, "Conformal Text Representation", Engineering Applications of Artificial Intelligence, vol. 6, No. 1, Feb. 1993, pp. 65-71.
Reed et al., "Language Resources for Studying Argument", In Proceedings of the Sixth International Conference on Language Resources and Evaluation (LREC'08), Marrakech, Morocco. European Language Resources Association, May 2010, pp. 2613-2618.
Reichman, "Getting Computers to Talk Like You and Me", Discourse Context, Focus and Semantics (An ATN Model), Massachusetts Institute of Technology Press, Jul. 1985, 17 pages.
Ricoeur, "The Rule of Metaphor: The Creation of Meaning in Language", University of Toronto Press, 1975, pp. 65-100.
Robinson, "A Machine-Oriented Logic Based on the Resolution Principle", Journal of the Association for Computing Machinery, vol. 12, No. 1, Jan. 1965, pp. 23-41.
Rosenthal et al., "SemEval—2014 Task 9: Sentiment Analysis in Twitter", Proceedings of the 8th International Workshop on Semantic Evaluation (SemEval 2014), Aug. 23-24, 2014, pp. 73-80.
Rubiolo et al., "Knowledge Discovery Through Ontology Matching: An Approach Based on an Artificial Neural Network Model", Information Sciences, vol. 194, Jul. 2012, pp. 107-119.
Russell et al., "Principles of Metareasoning", Artificial Intelligence, vol. 49, No. (1-3), May 1991, pp. 400-411.

(56) References Cited

OTHER PUBLICATIONS

Sagui et al., "Modeling News Trust: A Defeasible Logic Programming Approach", Inteligencia Artificial, vol. 12, No. 40, Nov. 2008, pp. 63-72.
Salton et al., "On the Specification of Term Values in Automatic Indexing", Journal of Documentation, vol. 29, No. 4, Apr. 1, 1973, 35 pages.
Salton et al., "Term Weighting Approaches in Automatic Text Retrieval", Information Processing & Management, vol. 24, No. 5, Nov. 1987, 22 pages.
Santhosh et al., "Discourse Based Advancement on Question Answering System", International Journal on Soft Computing, Artificial Intelligence and Applications, vol. 1, No. 2, Oct. 2012, pp. 1-12.
Sardianos et al., "Argument Extraction from News", Proceedings of the 2nd Workshop on Argumentation Mining, Jun. 4, 2015, pp. 56-66.
Sauper et al., "Automatically Generating Wikipedia Articles: A Structure-Aware Approach", Proceedings of the 47th Annual Meeting of the Association for Computational Linguistics and the 4th International Joint Conference on Natural Language Processing of the Asian Federation of Natural Language Processing, Aug. 2-7, 2009, pp. 208-216.
Scheffler et al., "Mapping PDTB-Style Connective Annotation to RST-Style Discourse Annotation", Proceedings of the 13th Conference on Natural Language Processing, 2016, pp. 242-247.
Schnedecker, "Les Chaines De Reference Dans Les Portraits Journalistiques : Elements De Description", Travaux de Linguistique, Jan. 2005, pp. 85-133.
Schnedecker, "Noms Propres et Chaines De Reference", Recherches Linguistiques, 1997, 3 pages.
Scholman et al., "A Step-Wise Approach to Discourse Annotation: Towards a Reliable Categorization of Coherence 64 Relations", Categories of Coherence Relations in Discourse Annotation, Dialogue & Discourse, vol. 7, No. 2, Feb. 2016, 28 pages.
Scholman et al., "Examples and Specifications That Prove a Point: Identifying Elaborative and Argumentative Discourse Relations", Dialogue & Discourse, vol. 8, No. 2, Jul. 2017, pp. 56-83.
Searle, "Speech Acts: An Essay in the Philosophy of Language", Cambridge University Press, Jan. 1969, pp. 22-53.
Serban et al., "A Survey of Available Corpora for Building Data-Driven Dialogue Systems", Available online at https://arxiv.org/pdf/1512.05742.pdf, Mar. 21, 2017, 56 pages.
Severyn et al., "Fast Support Vector Machines for Convolution Tree Kernels", Data Mining Knowledge Discovery, vol. 25, No. 2, Sep. 2012, 33 pages.
Sjoera , "The Linguistics Behind Chat Bots", iCapps, Available Online at: http://www.icapps.com/the-linguistics-behind-chatbots/, Feb. 22, 2017, 9 pages.
Socher et al., "Learning Continuous Phrase Representations and Syntactic Parsing with Recursive Neural Networks", Proceedings of the NIPS Deep Learning and Unsupervised Feature Learning Workshop, Jan. 2010, pp. 1-9.
Socher et al., "Recursive Deep Models for Semantic Compositionality Over a Sentiment Treebank", Proceedings of the 2013 Conference on Empirical Methods in Natural Language Processing, Oct. 2013, pp. 1631-1642.
Sperber et al., "Relevance: Communication and Cognition", Blackwell, Oxford and Harvard University Press, 1986, 331 pages.
Stab et al., "Identifying Argumentative Discourse Structures in Persuasive Essays", Proceedings of the 2014 Conference on Empirical Methods in Natural Language Processing (EMNLP), Oct. 1, 2014, pp. 46-56.
Stab et al., "Recognizing Insufficiently Supported Arguments in Argumentative Essays", Proceedings of the 15th Conference of the European Chapter of the Association for Computational Linguistics (EACL 2017), vol. 1, Apr. 3-7, 2017, pp. 980-990.
Stab et al., "Recognizing the Absence of Opposing Arguments in Persuasive Essays", Proceedings of the 3rd Workshop on Argument Mining, Aug. 7-12, 2016, pp. 113-118.
Stevenson et al., "A Semantic Approach to IE Pattern Induction", Proceedings of the 43rd Annual Meeting on Association for Computational Linguistics, Jun. 2005, pp. 379-386.
Sun et al., "Exploiting Product Related Review Features for Fake Review Detection", Mathematical Problems in Engineering, vol. 2016, No. 1, Aug. 4, 2016, 8 pages.
Sun et al., "Exploring Syntactic Structural Features for Sub-Tree Alignment Using Bilingual Tree Kernels", Proceedings of the 48th Annual Meeting of the Association for Computational Linguistics, Jul. 2010, pp. 306-315.
Sun et al., "Tree Sequence Kernel for Natural Language", Proceedings of the Twenty-Fifth Association for the Advancement of Artificial Intelligence Conference on Artificial Intelligence, Aug. 2011, 6 pages.
Surdeanu et al., "Two Practical Rhetorical Structure Theory Parsers", Proceedings of the Conference of the North American Chapter of the Association for Computational Linguistics—Human Language Technologies, Jun. 5, 2015, pp. 1-5.
Suykens et al., "Advances in Learning Theory: Methods, Models and Applications", IOS Press, NATO Science Series, III: Computer and Systems Sciences, vol. 190, May 2006, 440 pages.
Taboada et al., "Rhetorical Structure Theory: Looking Back and Moving Ahead", Discourse Studies, vol. 8, No. 3, Jan. 24, 2006, pp. 423-459.
Taboada, "The Genre Structure of Bulletin Board Messages", Text Technology, vol. 13, No. 2, Nov. 2, 2004, pp. 55-82.
Tang et al., "Coooolll: A Deep Learning System for Twitter Sentiment Classification", Proceedings of the 8th International Workshop on Semantic Evaluation (SemEval 2014), Aug. 23-24, 2014, pp. 208-212.
Theranos, "Wall Street Journal: Letter to the Editor", Theranos Works to Realize Access to Preventive Care, Available Online at: https://theranos.com/news/posts/wall-street-journal-letter-to-the-editor, Dec. 22, 2015, 4 pages.
Thompson et al., "Learning to Parse NL Database Queries Into Logical Form", Proceedings of the ICML-97 Workshop on Automata Induction, Grammatical Inference, and Language Aquicision, Jul. 1997, 9 pages.
Tneogi, "Conversational Interfaces Need a Different Content Management System", Chatbot Magazine, Available Online at https://chatbotsmagazine.com/conversational-interfaces-need-a-different-content-management-system-b105bb6f716, Mar. 26, 2017, pp. 1-3.
Todirascu et al., "Coherence and Cohesion for the Assessment of Text Readability", Proceedings of NLPCS 2013, Oct. 2013, pp. 11-19.
Torrance et al., "Rhetorical Structure Analysis as a Method for Understanding Writing Processes", Presented at the Multidisciplinary Approaches to Discourse (MAD) Workshop, Information Technology Research Institute Technical Report Series, Aug. 2001, 9 pages.
Traum et al., "Conversation Acts in Task-Oriented Spoken Dialogue", University of Rochester Computer Science, Computational Intelligence, vol. 8, No. 3, Jun. 1992, 31 pages.
Traum et al., "Discourse Obligations in Dialogue Processing", Proceedings of the 32nd Annual Meeting on Association for Computational Linguistics, Jun. 27-30, 1994, pp. 1-8.
Trstenjak et al., "KNN with TF-IDF Based Framework for Text Categorization", Procedia Engineering, vol. 69, 24th Danube Adria Association For Automation And Manufacturing International Symposium on Intelligent Manufacturing and Automation, 2014, pp. 1356-1364.
Tsui, "English Conversation", Describing English Language, Oxford University Press, 1994, 37 pages.
Tunkelang, "Search Results Clustering", Available Online at: https://queryunderstanding.com/search-results-clustering-b2fa64c6c809, Apr. 16, 2018, pp. 1-3.
Uliyar, "A Primer: Oracle Intelligent Bots", Powered by Artificial Intelligence, White Paper, Sep. 2017, pp. 1-28.
Van Der Wees et al., "Five Shades of Noise: Analyzing Machine Translation Errors in User-Generated Text", Proceedings of the ACL 2015 Workshop on Noisy User-generated Text, Jul. 31, 2015, pp. 28-37.

(56) References Cited

OTHER PUBLICATIONS

Van Dijk, "Explorations in the Semantics and Pragmatics of Discourse", Text and Context, Longman Linguistics Library, 1977, 274 pages.
Van Durme et al., "Towards Light Semantic Processing for Question Answering", Proceedings of the HLT-NAACL 2003 Workshop on Text meaning, vol. 9, May 2003, pp. 54-61.
Van Eemeren et al., "Fundamentals of Argumentation Theory: A Handbook of Historical Backgrounds and Contemporary Developments", Routledge, Taylor & Francis Group, Mar. 1, 1996, 440 pages.
Vapnik, "The Nature of Statistical Learning Theory", Springer Science, 1995, 201 pages.
Virtanen, "Analysing Argumentative Strategies: A Reply to a Complaint", Anglicana Turkuensia, vol. 14, 1995, pp. 539-547.
Wade, "5 Ways Chatbots Are Revolutionizing Knowledge Management", Available Online at: https://blog.getbizzy.io/5-ways-chatbots-are-revolutionizing-knowledge-management-bdf925db66e9, Feb. 12, 2018, pp. 1-8.
Walker et al., "Quantitative and Qualitative Evaluation of Darpa Communicator Spoken Dialogue Systems", Proceedings of the 39th Annual Meeting of the Association for Computational Linguistics, Jul. 6-11, 2001, 8 pages.
Walton, "Argumentation Schemes for Presumptive Reasoning", Lawrence Erlbaum Associates, Publishers, 1996, 39 pages.
Wang et al., "Kernel Based Discourse Relation Recognition with Temporal Ordering Information", Proceedings of the 48th Annual Meeting of the Association for Computational Linguistics, Jul. 11-16, 2010, pp. 710-719.
Wang et al., "Using Learning Analytics to Understand the Design of an Intelligent Language Tutor-Chatbot Lucy", International Journal of Advanced Computer Science and Applications, vol. 4, No. 11, Nov. 2013, pp. 124-131.
Webber et al., "Discourse Structure and Language Technology", Natural Language Engineering, vol. 18, No. 4, Oct. 2012, pp. 437-490.
Wei et al., "Is This Post Persuasive? Ranking Argumentative Comments in Online Forum", Proceedings of the 54th Annual Meeting of the Association for Computational Linguistics, Aug. 7-12, 2016, pp. 195-200.
Wenyin et al., "A Short Text Modeling Method Combining Semantic and Statistical Information", Information Sciences, vol. 180, No. 20, Oct. 15, 2010, pp. 4031-4041.
Wilks, "Machine Conversations", The Springer International Series in Engineering and Computer Science, vol. 511, 1999, 38 pages.
Wu et al., "Enhancing Text Representation for Classification Tasks with Semantic Graph Structures", International Journal of Innovative Computing, Information and Control, vol. 7, No. 5, May 2011, pp. 2689-2698.
Wuchner et al., "Data Loss Prevention Based on Data-Driven Usage Control", Proceedings of the Institute of Electrical and Electronics Engineers 23rd International Symposium on Software Reliability Engineering, Nov. 27-30, 2012, 10 pages.
Yang et al., "Extract Conceptual Graphs from Plain Texts in Patent Claims", Engineering Applications of Artificial Intelligence, vol. 25, No. 4, Jun. 2012, pp. 874-887.
Yao et al., "Online Deception Detection Refueled by Real World Data Collection", Proceedings of Recent Advances in Natural Language Processing, Jul. 28, 2017, 10 pages.
Yessenalina et al., "Compositional Matrix-Space Models for Sentiment Analysis", Proceedings of the 2011 Conference on Empirical Methods in Natural Language Processing, Jul. 27-31, 2011, pp. 172-182.
Zanzotto et al., "Estimating Linear Models for Compositional Distributional Semantics", Proceedings of the 23rd International Conference on Computational Linguistics (COLING 2010), Aug. 23-27, 2010, pp. 1263-1271.
Zarrella et al., "MITRE: Seven Systems for Semantic Similarity in Tweets", Proceedings of the 9th International Workshop on Semantic Evaluation (SemEval 2015), Jun. 4-5, 2015, pp. 12-17.
Zeilenga, "Lightweight Directory Access Protocol (LDAP) Read Entry Controls", Standards Track, Network Working Group, IETF, RFC 4527, Jun. 2006, 8 pages.
Zhang et al., "Exploring Syntactic Structured Features Over Parse Trees for Relation Extraction Using Kernel Methods", Information Processing & Management, vol. 44, No. 2, Mar. 2008, pp. 687-701.
Zhang et al., "Question Classification Using Support Vector Machines", Proceedings of the 26th Annual International ACM SIGIR Conference on Research and Development in Information Retrieval, Jul. 28-Aug. 1, 2003, pp. 26-32.
Zhang et al., "Semantic Role Labeling Using a Grammar-Driven Convolution Tree Kernel", Institute of Electrical and Electronics Engineers, Transactions on Audio Speech and Language Processing, vol. 16, No. 7, Sep. 2008 , pp. 1315-1329.
Zhao et al., "Facilitating Discourse Analysis with Interactive Visualization", Institute of Electrical and Electronics Engineers Transactions on Visualization and Computer Graphics, vol. 18, No. 12, Dec. 2012, 10 pages.

\* cited by examiner

CONSTRUCTING CONCLUSIVE ANSWERS FOR AUTONOMOUS AGENTS

CROSS-REFERENCES TO RELATED APPLICATIONS

This application is a continuation of U.S. application Ser. No. 16/654,258, filed Oct. 16, 2019, which claims priority to U.S. Provisional Application No. 62/746,261, filed Oct. 16, 2018, both of which are incorporated by reference in their entirety.

TECHNICAL FIELD

This disclosure is generally concerned with linguistics. More specifically, within an interactive session between an autonomous agent and a user, certain embodiments formulate and provide a conclusive answer.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use autonomous agents to answer questions, facilitate discussion, manage dialogues, and provide social promotion is increasingly popular.

Following an interactive session with an autonomous agent, a comprehensive, conclusive answer of the session may be desired. But existing solutions are unable to create such an answer. In contrast, these solutions are only able to provide a short reply of text that is derived from a traditional search index. These texts fail to be comprehensive.

As such, solutions are needed that can automatically generate a comprehensive answer for use in a session with an autonomous agent.

SUMMARY

Techniques are described herein for enabling autonomous agents to generate conclusive answers. An example of a conclusive answer is text that addresses concerns of a user who is interacting with an autonomous agent. For example, an autonomous agent interacts with a user device, answering user utterances, for example questions or concerns. Based on the interactions, the autonomous agent determines that a conclusive answer is appropriate. The autonomous agent formulates the conclusive answer, which addresses multiple user utterances. The conclusive answer provided to the user device.

In an example, a method of computationally fortifying an answer using syntactic parse trees is provided. The method includes accessing a seed sentence including a first set of text fragments. The method further includes syntactically parsing the seed sentence to generate a first syntactic parse tree. The method further includes obtaining a search result by providing, to a search engine, at least one of the first set of text fragments, wherein the search result includes a second text fragment. The method further includes syntactically parsing the search result to generate a second syntactic parse tree. The method further includes calculating, a relevancy metric for the search result by computing a maximum common subgraph between the first syntactic parse tree and the second syntactic parse tree. The method further includes identifying the search result as an additional fragment based on a determination that the relevancy metric is greater than a first threshold. The method further includes constructing a paragraph from the additional fragment. The method further includes providing the paragraph to a user device.

In another example, a method of computationally fortifying an answer using syntactic parse trees is provided. The method includes accessing a first seed sentence including text fragments and a second seed sentence including text fragments. The method includes generating, from the first seed sentence, a first syntactic parse tree. The method includes generating, from the second seed sentence, a second syntactic parse tree. The method includes identifying, from the first syntactic parse tree, a first entity. The method includes identifying, from the second syntactic parse tree, the first entity and a second entity. The method includes obtaining search results by providing the second entity to a search engine. The method includes generating, from the search result, a second syntactic parse tree. The method includes calculating a relevancy metric for the search result by computing a maximum common subgraph between the second syntactic parse tree and the second syntactic parse tree. The method includes identifying the search result as an additional fragment based on (i) a determination that the relevancy metric is greater than a first threshold. The method includes constructing a paragraph from fragments of the first seed sentence, fragments of the second seed sentence and additional fragment. The method includes providing the paragraph to a user device.

In yet another example, a system includes a computer-readable medium storing non-transitory computer-executable program instructions; and a processing device communicatively coupled to the computer-readable medium for executing the non-transitory computer-executable program instructions. Executing the non-transitory computer-executable program instructions configures the processing device to perform operations. The operations include accessing a seed sentence including a first set of text fragments. The operations include syntactically parsing the seed sentence to generate a first syntactic parse tree. The operations include obtaining a search result by providing at least one of the first set of text fragments to a search engine, wherein the search result includes a second text fragment. The operations include syntactically parsing the search result to generate a second syntactic parse tree. The operations include calculating, a relevancy metric for the search result by computing a maximum common subgraph between the first syntactic parse tree and the second syntactic parse tree. The operations include identifying the search result as an additional fragment based on a determination that the relevancy metric is greater than a first threshold. The operations include constructing a paragraph from the additional fragment; and providing the paragraph to a user device.

DETAILED DESCRIPTION

Figure 1:
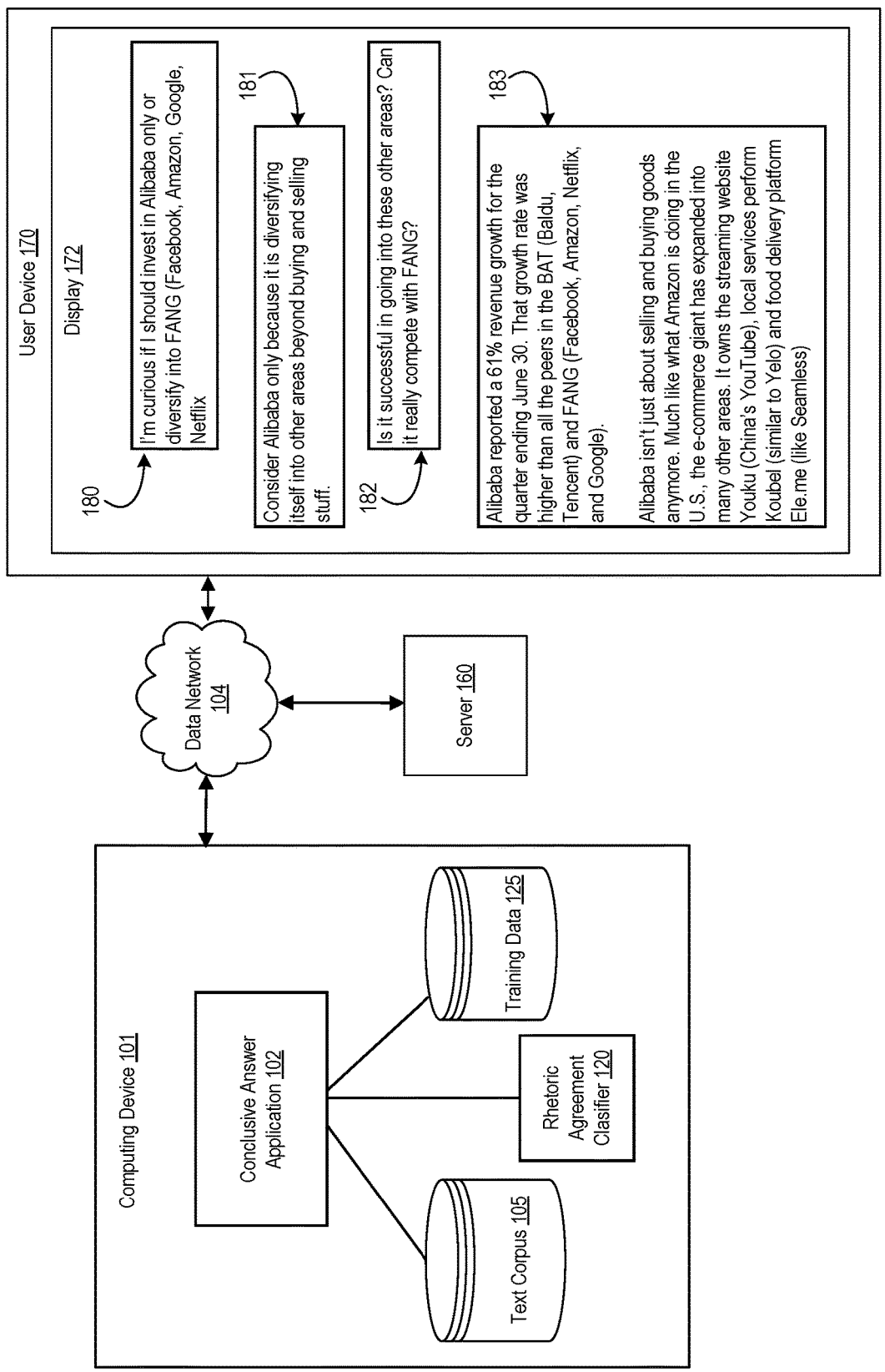
FIG. 1 shows an exemplary conclusive answer generating environment, in accordance with an aspect of the present disclosure.

Aspects disclosed herein provide technical improvements to the area of computer-implemented linguistics, autonomous agents (chatbots), identifying a need for and generating conclusive answers. A conclusive answer is text that addresses concerns of a user who is interacting with an autonomous agent. In an example, a user device is interacting with an autonomous agent in an interactive session. During the session, the user identifies one or more issues. The autonomous agent determines that a conclusive answer should be provided. The agent determines components to be included in the conclusive answer, identifies and formats text that addresses is responsive to the necessary components, and generates the conclusive answer. The conclusive answer can in turn be provided to a display such as a display of a mobile device.

Generating a conclusive answer can involve determining a suitable structure of the conclusive answer and creating the conclusive answer based on the determined structure. The structure of the conclusive answer can involve identifying one or more entities present in an initial user utterance and/or subsequent user utterances. More specifically, certain aspects obtain content from a text corpus, verify that the obtained text is relevant, and verify that the obtained text is appropriate (e.g., in style).

Different technical approaches can be used. For example, machine learning, keyword-based approaches, and/or search engineering techniques can be used. Additionally or alternatively, some aspects represent rhetorical relationships between one or more sentences in communicative discourse trees. "Communicative discourse trees" or "CDTs" include discourse trees that are supplemented with communicative actions. Communicative discourse trees combine rhetoric information with communicative actions. A communicative action is a cooperative action undertaken by individuals based on mutual deliberation and argumentation. By incorporating labels that identify communicative actions, learning of communicative discourse trees can occur over a richer features set than simply rhetoric relations and syntax of elementary discourse units (EDUs). With such a feature set, additional techniques such as classification can be used to determine a level of rhetoric agreement between questions and answers or request-response pairs, thereby enabling improved automated agents. Representing text as communicative discourse trees can facilitate different analysis such as detection of argumentation and verification that two sentences are of a similar style.

Technical advantages of some aspects include improved autonomous agents and improved search engine performance over traditional statistical-based approaches. As discussed, existing solutions are unable to create conclusive answer. Instead, such solutions provide short replies by text indexed by a traditional search index. Statistical learning and especially deep learning-based agents attempt to use learning to tailor answers to a user session, but only brief texts can be obtained as a result. These texts can be meaningful but fail to be comprehensive.

Certain Definitions

As used herein, an "entity" has an independent and distinct existence. Examples includes objects, places, and persons. An entity can also be a subject or topic such as "electric cars" or "brakes."

As used herein, a named entity is an entity that is identified by a name. Examples of named entities are "France," "John Doe," and "Russell Square" are named entities As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

Turning now to the Figures, FIG. 1 shows an exemplary conclusive answer generating environment, in accordance with an aspect of the present disclosure. FIG. 1 depicts computing device 101, data network 104, server 160, and user device 170. In the example depicted by FIG. 1, user device 170 interacts with computing device 101 over data network 104. As depicted by FIG. 1, a user requested a recommendation about investment, received it and expressed her doubts. The chatbot provides the comprehensive conclusive answer entitled 'Why a 61% revenue growth is not enough for Alibaba' with detailed information on competitiveness including the charts.

User device 170 can be any mobile device such as a mobile phone, smart phone, tablet, laptop, smart watch, and the like. User device 170 communicates via data network 104 to server 160 and/or computing device 101. Data network 104 can be any public or private network, wired or wireless network, Wide Area Network, Local Area Network, or the Internet.

In an example, user device 170 can provide questions, e.g., questions 180 and 180, which can be from a user, to computing device 101. Computing device 101 can determine a suitable answer, e.g., answer 181 which is responsive to question 180, or conclusive answer 183, and provide the answer to user device 170. In particular, computing device 101 can determine that a conclusive answer is appropriate, generate the conclusive answer, and transmit the conclusive answer to user device 170.

As depicted, user device 170 includes a display 172. The display 172 depicts a chat history, or an interactive session with the autonomous agent implemented by computing device 101. As can be seen, a user initially asks a question 180, which reads "I'm curious if I should invest in Alibaba only or diversify into FANG (Facebook, Amazon, Google, Netflix." In response, computing device 101 determines a suitable answer 181, which reads "Consider Alibaba only because it is diversifying itself into other areas beyond buying and selling stuff." Computing device 101 then receives user question 182, which reads "Is it successful in going into these other areas? Can it really compete with FANG?" In response, computing device 101 generates conclusive answer 183, which reads "Alibaba reported a 61% revenue growth for the quarter ending June 30. That growth rate was higher than all the peers in the BAT (Baldu, Tencent) and FANG (Facebook, Amazon, Netflix, and Google). . . . Alibaba isn't just about selling and buying goods anymore. Much like what Amazon is doing in the U.S., the e-commerce giant has expanded into many other areas. It owns the streaming website Youku (China's YouTube), local services perform Koubel (similar to Yelo) and food delivery platform Ele.me (like Seamless)." As can be seen, conclusive answer 183 addresses both question 180 and question 182, because conclusive answer 183 addresses a main entity in question 180 "Alibaba" and a specific request about Alibaba's success as present in question 182.

Computing device 101 implements an autonomous agent via conclusive answer application 102, text corpus 105, rhetoric agreement classifier 120, and training data 125. Conclusive answer application 102 can implement any of the functionality described herein, including analyzing text and questions, determining answers, and determining conclusive answers. Text corpus 105 includes text such as electronic documents, webpages, customer support conversation logs, internal issue resolution logs, or other correspondence. Conclusive answer application 102 can index the content of text corpus 105 for quicker access. Rhetoric agreement classifier 120 can include one or more machine learning models that are trained to perform one or more different actions. For example, rhetoric agreement classifier 120 can determine a level of rhetoric agreement and/or style between a question and a candidate answer. In this manner, conclusive answer application 102 can provide the most suitable answer to the mobile device 160.

Server 160 can be a public or private internet server, such as a public database of user questions and answers. Server 160 can implement any of the functionality described herein, including the functionality associated with computing device 101. In some cases, server 160 can complement the functionality of computing device 101, for example, by providing additional databases, corpuses of text, etc. Examples of additional functionality that can be performed by computing device 101 and/or server 160 are discussed with respect to FIGS. 15, 16, 19, and 20. For example, computing device 101 can perform process 1600 described with respect to FIG. 16 to determine whether a conclusive answer is necessary. If a conclusive answer is necessary, then computing device 101 can perform process 2000 described with respect to FIG. 20.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
|---|---|---|
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |

-continued

| Relation Name | Nucleus | Satellite |
|---|---|---|
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
|---|---|---|
| Contrast | One alternate | The other alternate |
| Joint | (unconstrained) | (unconstrained) |
| List | An item | A next item |
| Sequence | An item | A next item |

Figure 2:
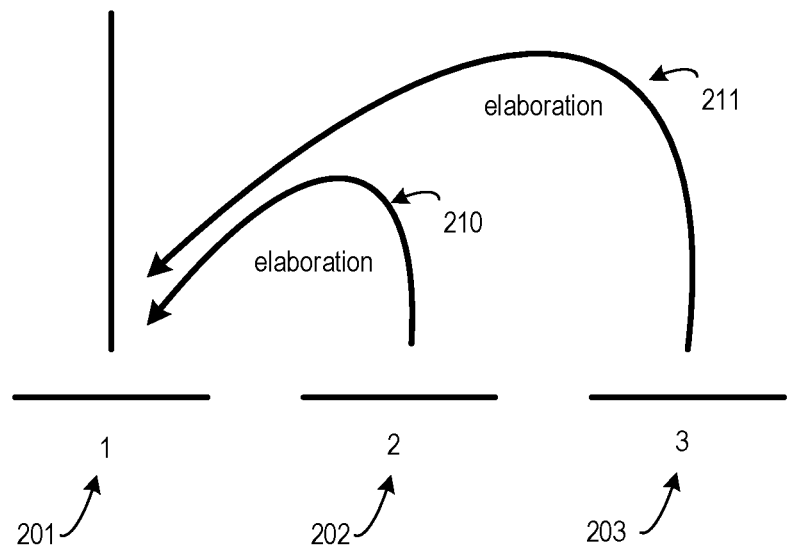
FIG. 2 depicts an example of a discourse tree in accordance with an aspect.
Figure 3:
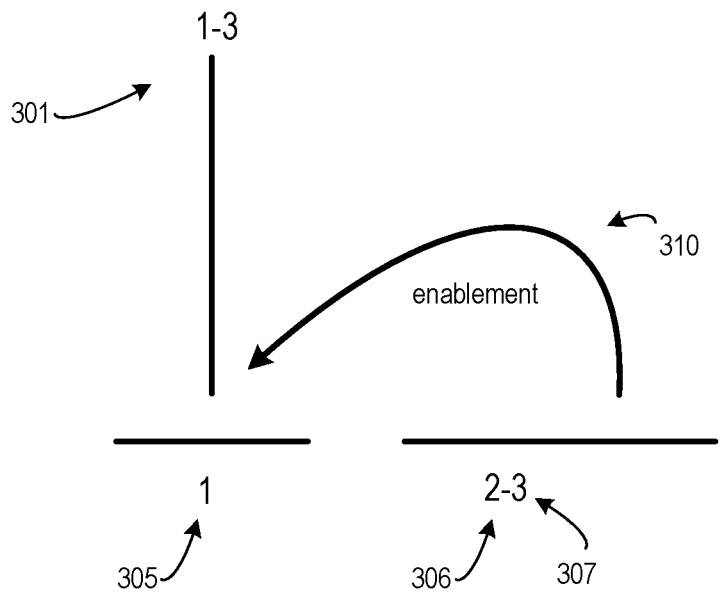
FIG. 3 depicts a further example of a discourse tree in accordance with an aspect.
Figure 3:
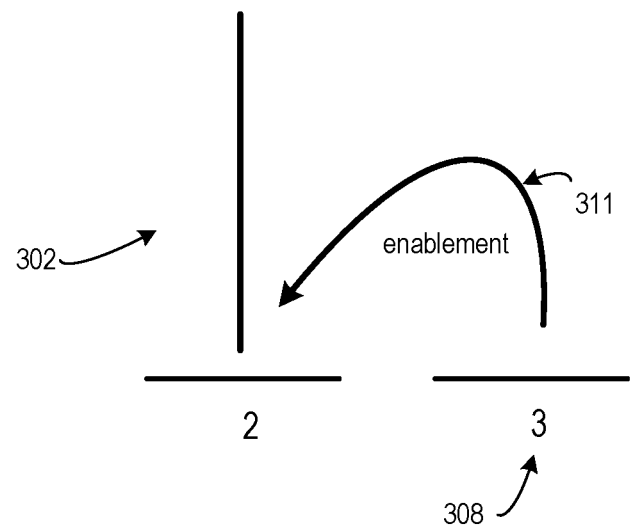

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hi. will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
 (a) Unit size may vary, depending on the goals of the analysis
 (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
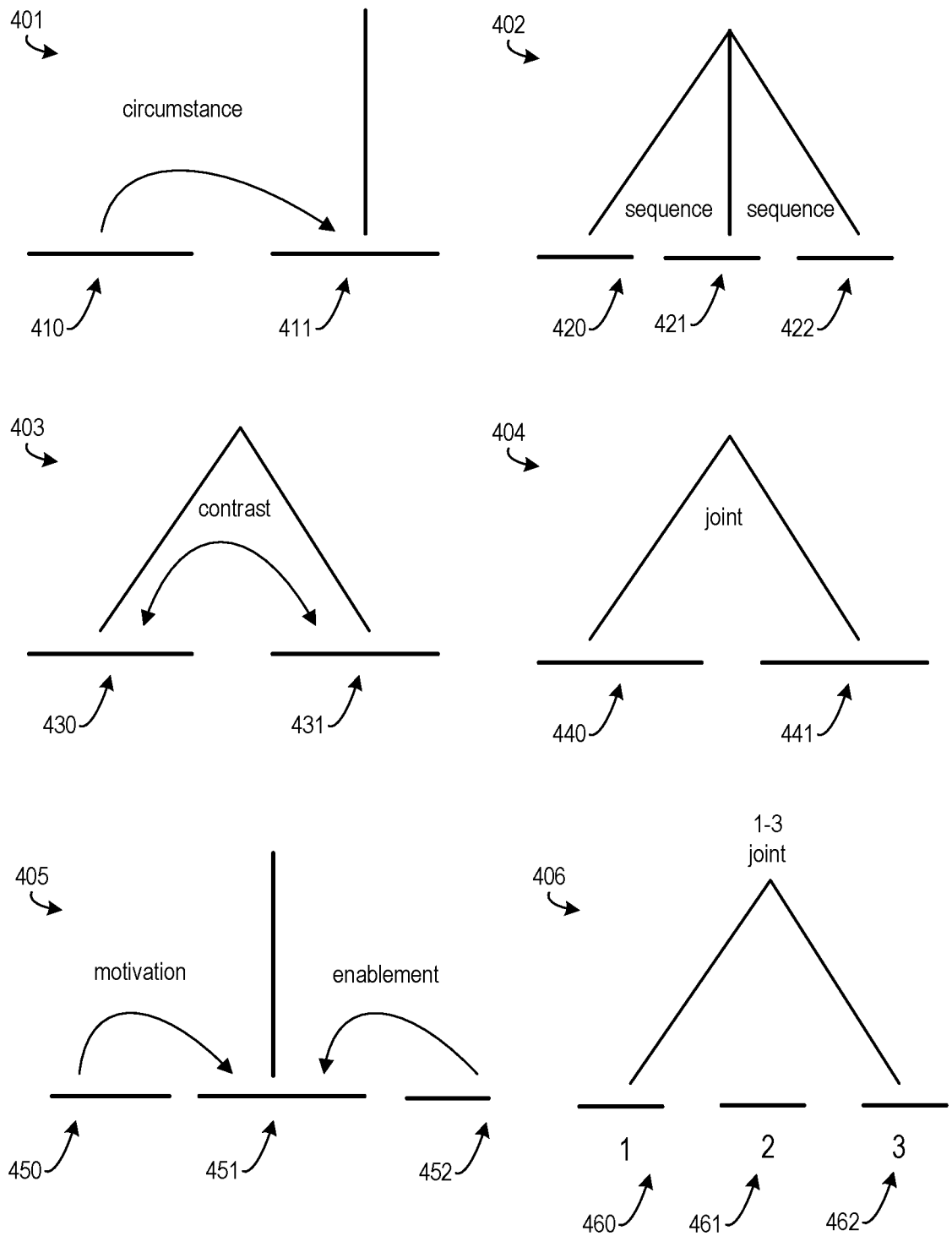
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
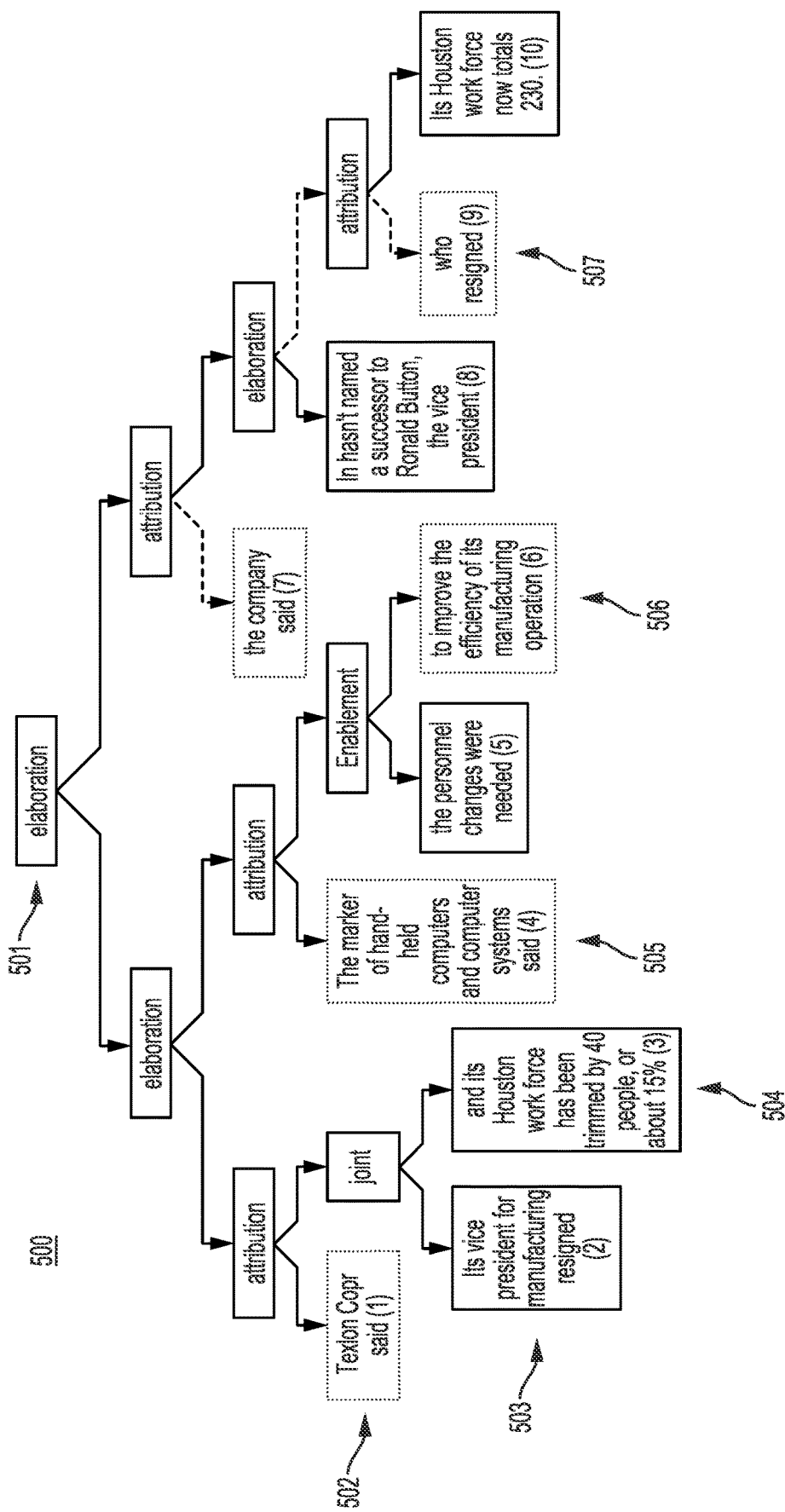
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra-and multi-sentential rhetorical parsing for document-level discourse analysis. In ACL (1), pages 486-496.

Figure 6:
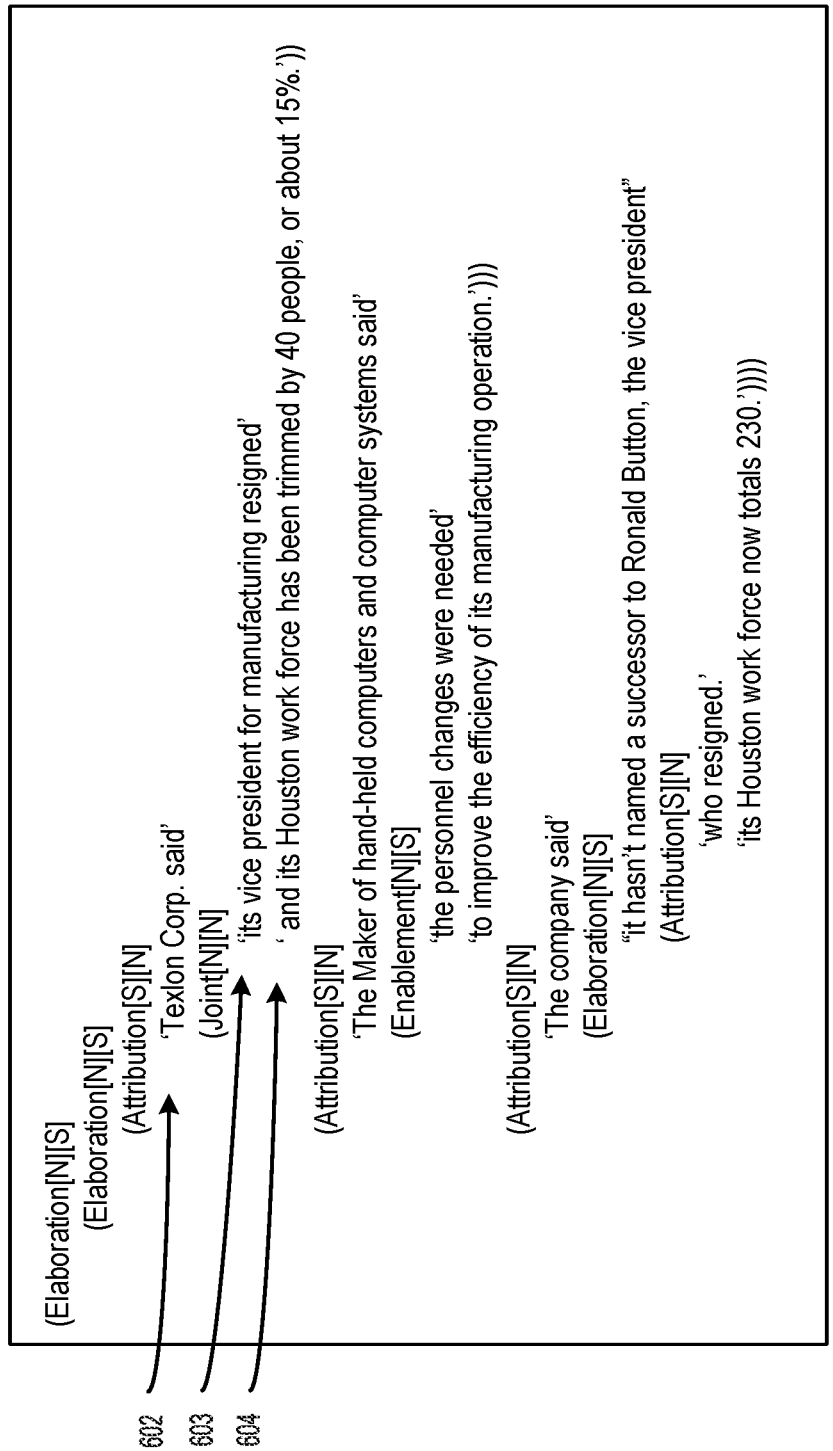
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
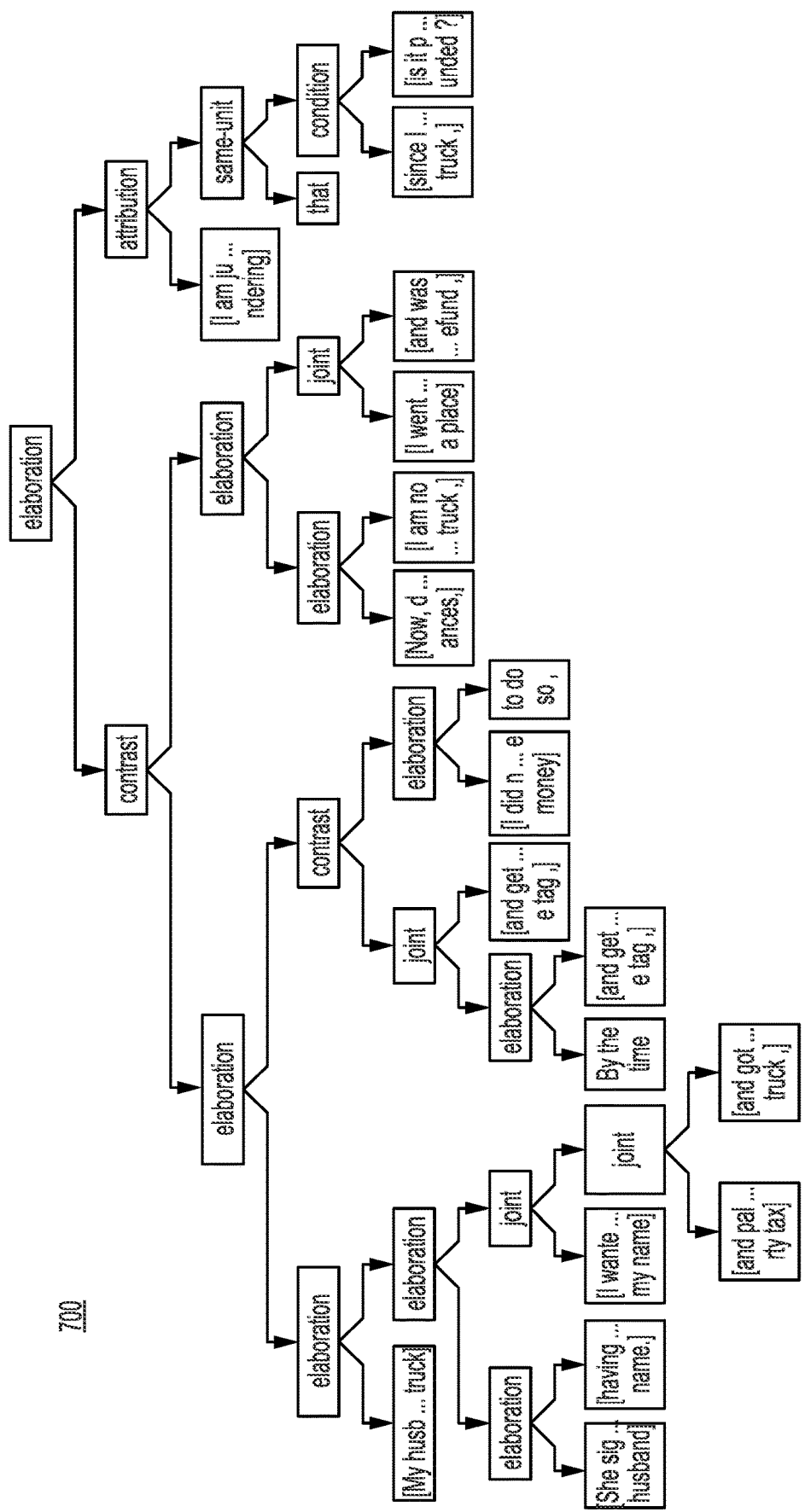
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with [0104] "By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
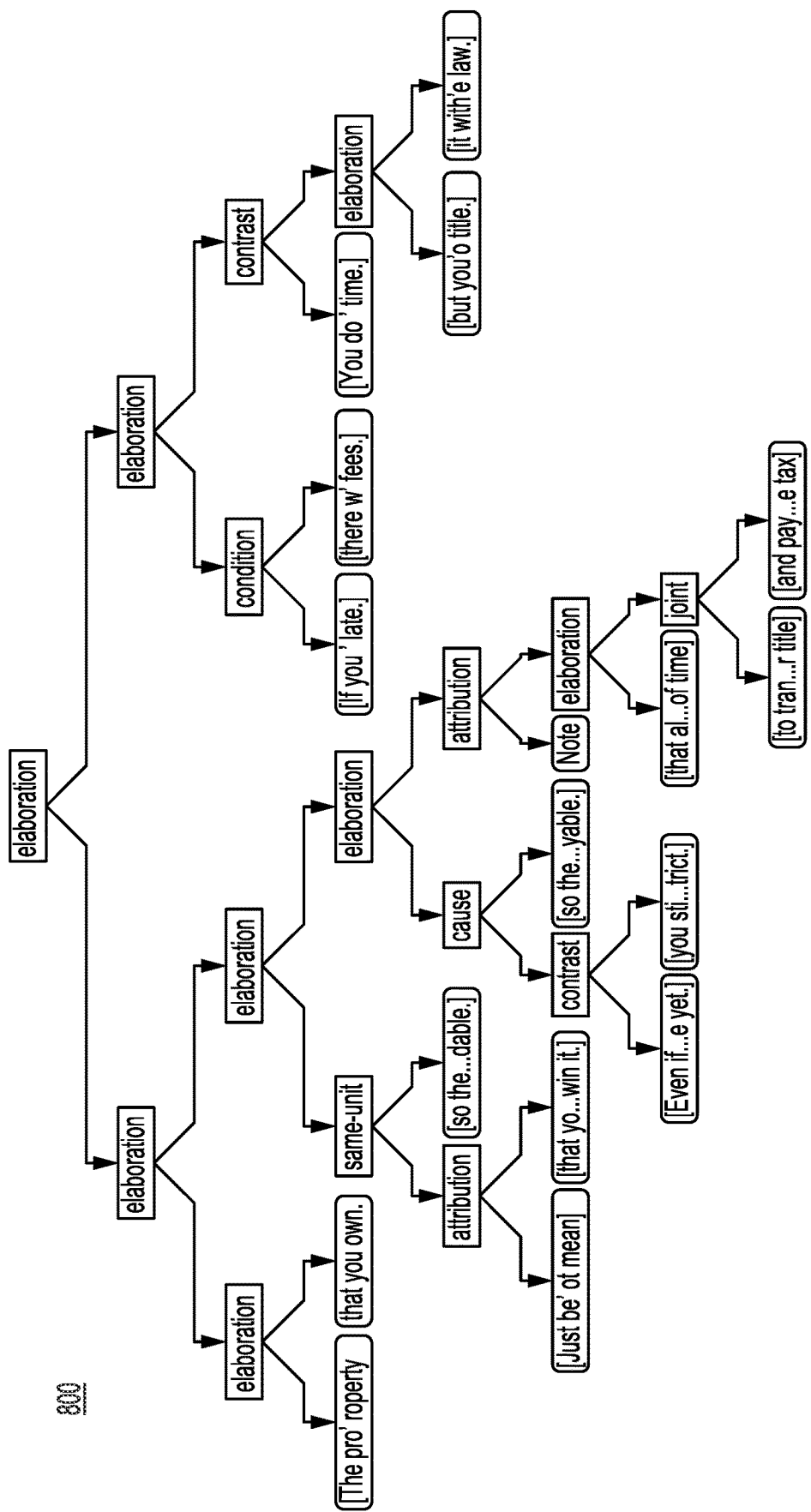
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
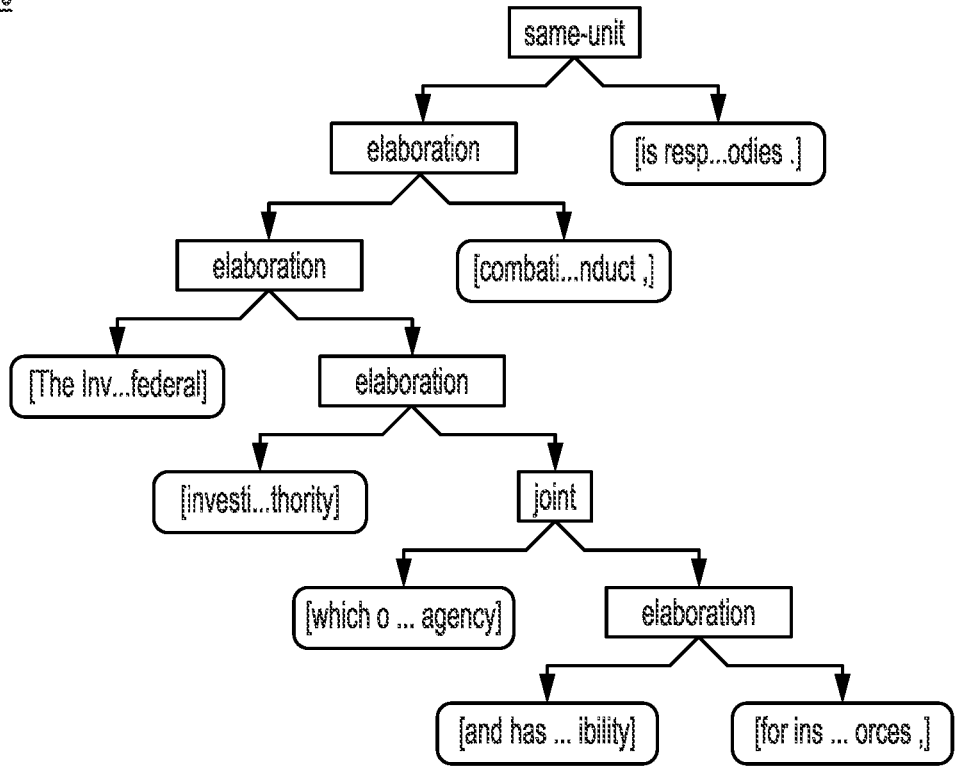
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
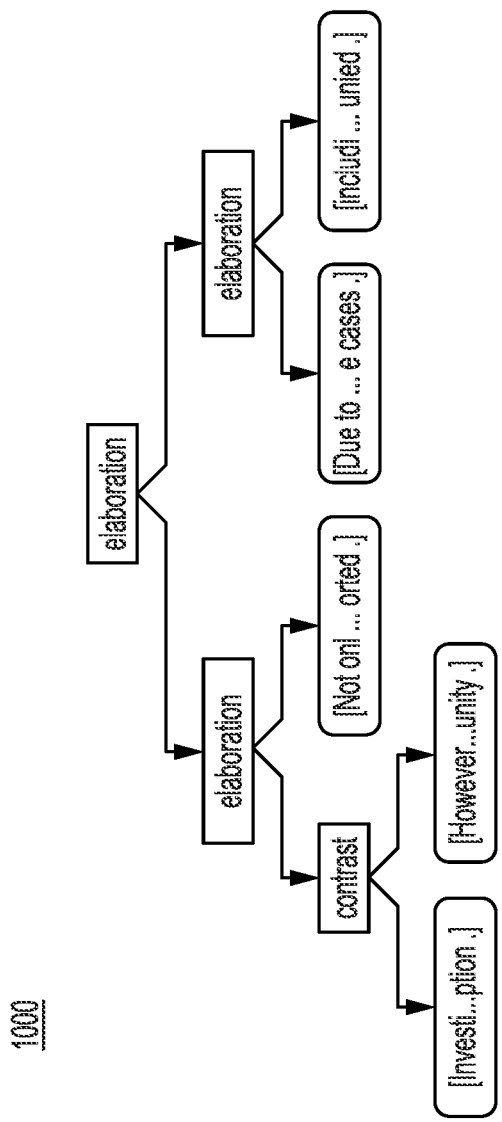
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Rhetoric classification application 102 can determine whether a given answer or response, such as an answer obtained from answer database 105 or a public database, is responsive to a given question, or request. More specifically, rhetoric classification application 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Rhetoric classification application 102 can determine similarity between question-answer pairs using different methods. For example, rhetoric classification application 102 can determine level of similarity between an individual question and an individual answer. Alternatively, rhetoric classification application 102 can determine a measure of similarity between a first pair including a question and an answer, and a second pair including a question and answer.

For example, rhetoric classification application 102 uses rhetoric agreement classifier 120 trained to predict matching or non-matching answers. Rhetoric classification application 102 can process two pairs at a time, for example <q1, a1> and <q2, a2>. Rhetoric classification application 102 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, rhetoric classification application 102 uses training data 125 to train rhetoric agreement classifier 120. In this manner, rhetoric agreement classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, rhetoric classification application 102 provides a training pair to rhetoric agreement classifier 120 and receives, from the model, a level of complementarity. Rhetoric classification application 102 calculates a loss function by determining a difference between the determined level of complementarity and an expected level of complementarity for the particular training pair. Based on the loss function, rhetoric classification application 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Rhetoric classification application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 2015, 681-

686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
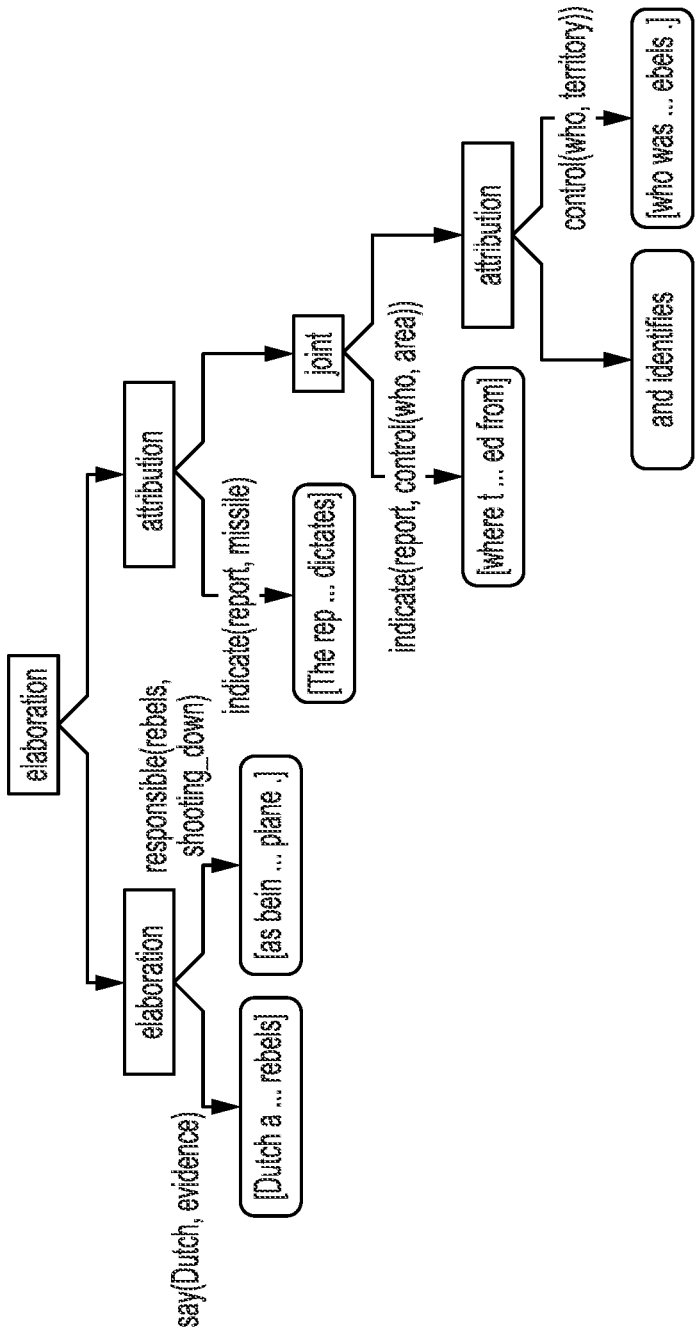
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of Ml-117 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible(rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
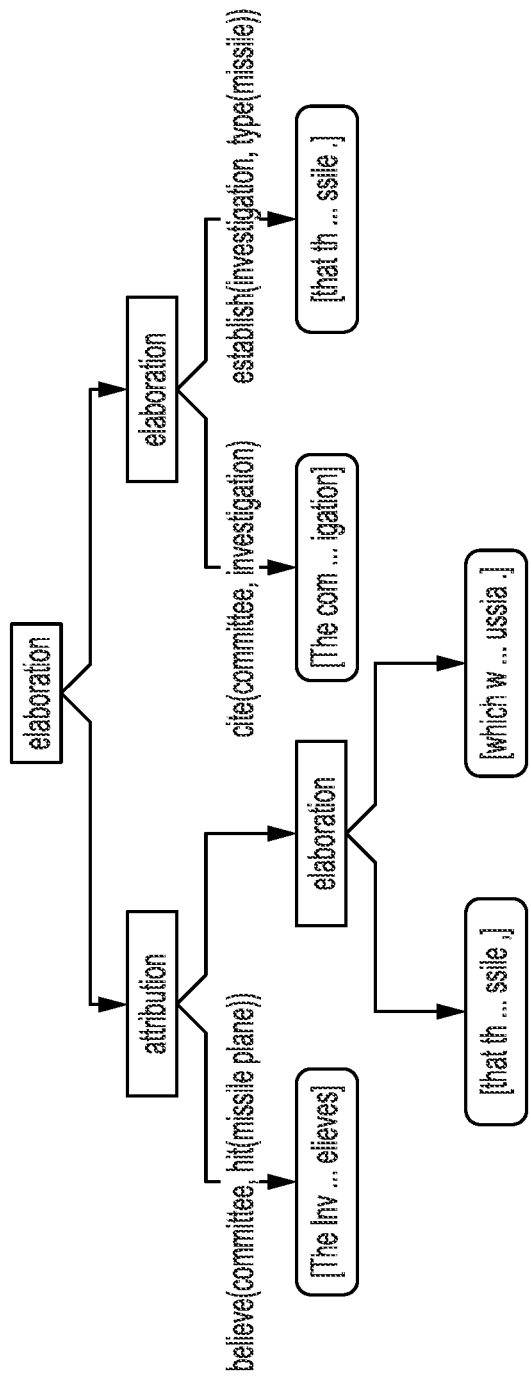
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
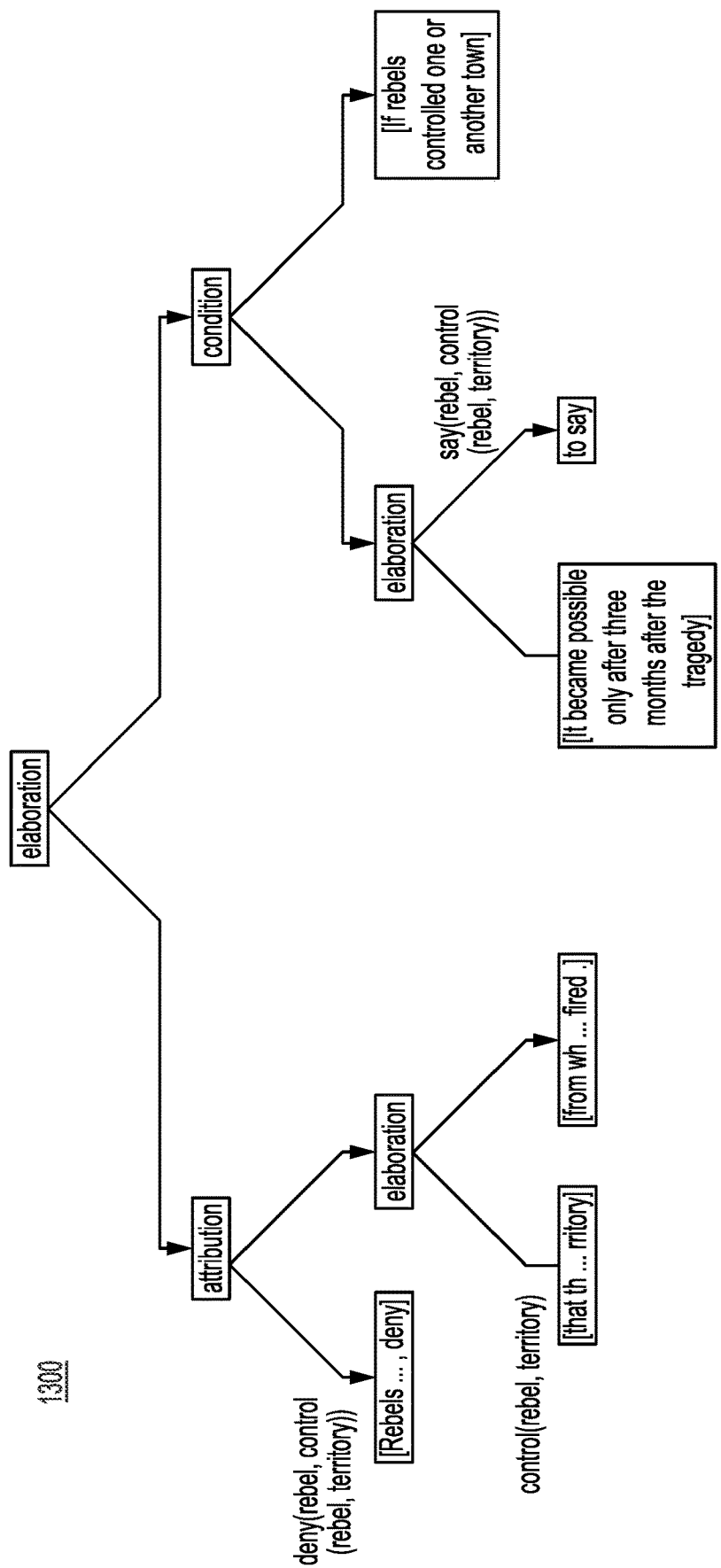
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer):. cause(Stimulus, E), emotional_state(result(E), Emotion, Experiencer).

NP.cause V NP. Example "The teacher's dolls amused the children." syntax Stimulus <+genitive>('s) V Experiencer. amuse(Stimulus, E, Emotion, Experiencer):. cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E),emotional_state(result(E), Emotion, Experiencer), Pred(result (E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer).
Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.
Representing Request-Response Pairs Representing request-response pairs facilitates classification based operations based on a pair. In an example, request-response pairs can be represented as parse thickets.

A parse thicket is a representation of parse trees for two or more sentences with discourse-level relationships between words and parts of the sentence in one graph. See Galitsky 2015. Topical similarity between question and answer can expressed as common sub-graphs of parse thickets. The higher the number of common graph nodes, the higher the similarity.

Figure 14:
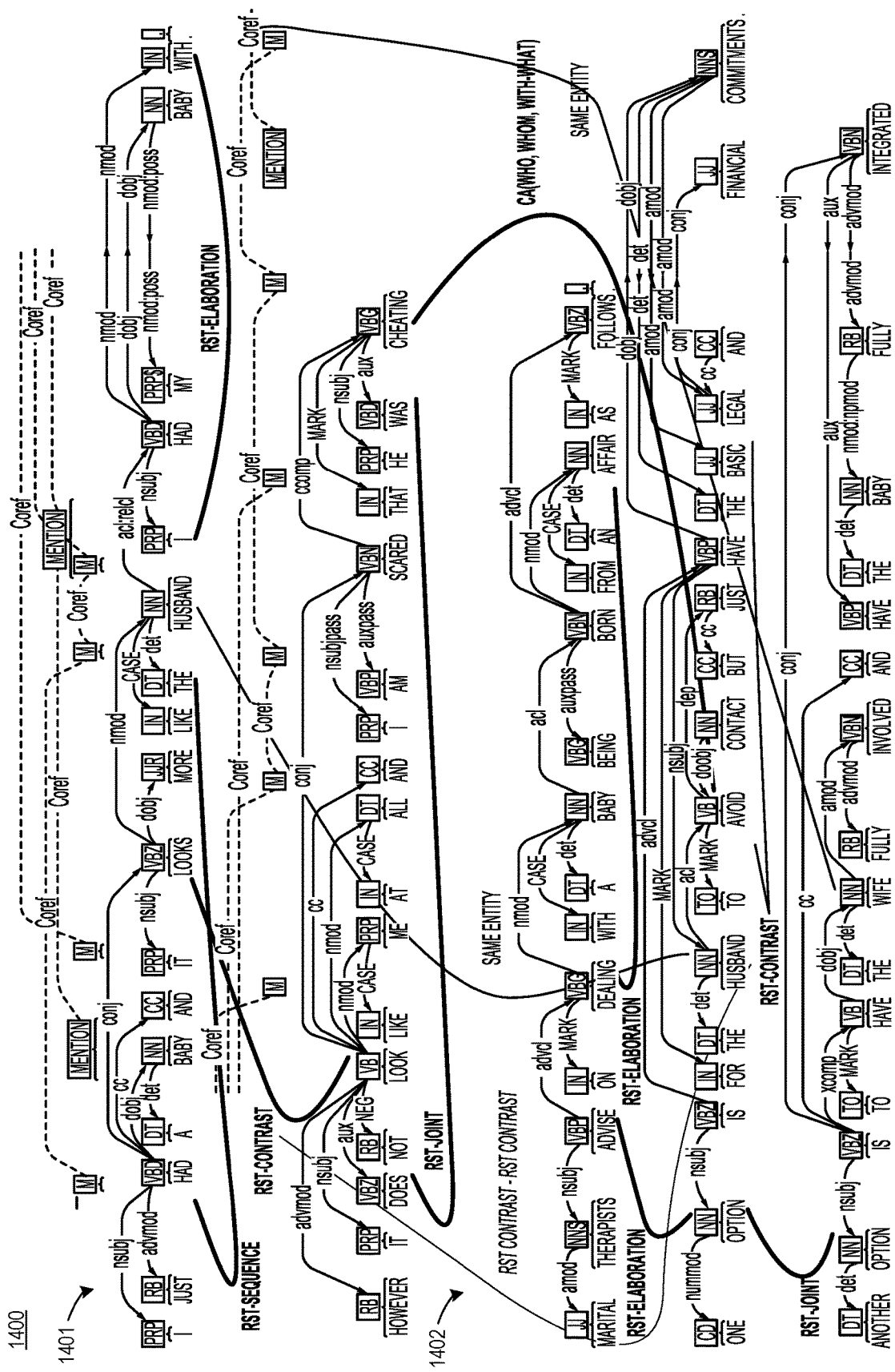
FIG. 14 illustrates parse thickets in accordance with an aspect.

FIG. 14 illustrates parse thickets in accordance with an aspect. FIG. 14 depicts parse thicket 1400 including a parse tree for a request 1401, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.
Generalization for Communicative Actions A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={action$_1$, action$_2$ . . . action$_n$} is a finite set of vertices corresponding to communicative actions, and A is a finite set of labeled arcs (ordered pairs of vertices), classified as follows:

Each arc action$_i$, action$_j\in A_{sequence}$ corresponds to a temporal precedence of two actions $v_i$, ag$_i$, s$_i$, c$_i$ and $v_j$, ag$_j$, s$_j$, c$_j$ that refer to the same subject, e.g., s$_j$=s$_i$ or different subjects. Each arc action$_i$, action$_j\in A_{cause}$ corresponds to an attack relationship between action$_i$ and action$_j$ indicating that the cause of action$_i$ in conflict with the subject or cause of action$_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for A$_{sequence}$ arcs, at most one incoming and only one outgoing arc are admissible, and (3) for A$_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\hat{\ }rst2(N2,S2,W2,R2)=(rst1\hat{\ }rst2)$$
$$(N1\hat{\ }N2,S1\hat{\ }S2,W1\hat{\ }W2,R1\hat{\ }R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1)^sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst–background^rst–enablement=(S increases the ability of R to comprehend an element in N)^(R comprehending S increases the ability of R to perform the action in N)=increase–VB the–DT ability–NN of–IN R–NN to–IN.

Because the relations rst–background^rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
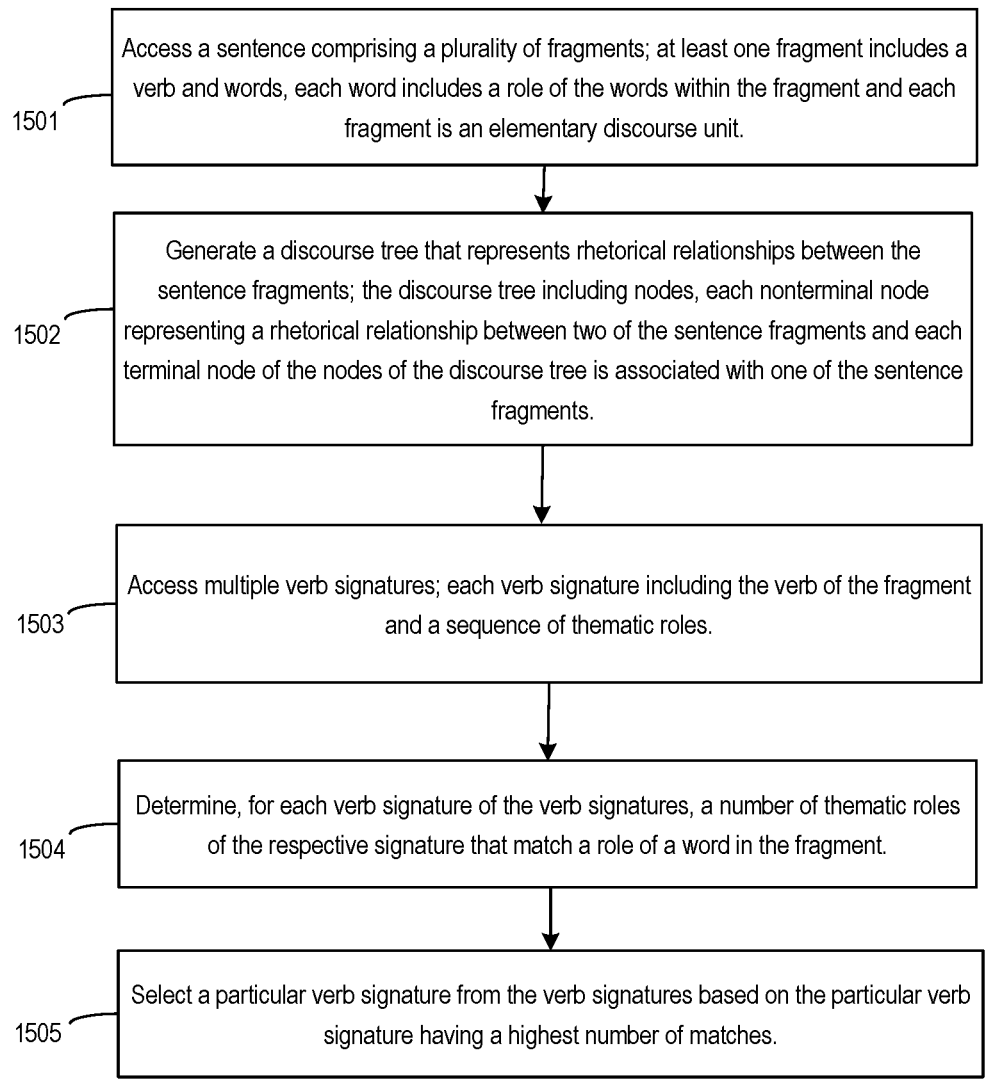
FIG. 15 illustrates an exemplary process for building a communicative discourse tree in accordance with an aspect.

FIG. 15 illustrates an exemplary process for building a communicative discourse tree in accordance with an aspect. Rhetoric classification application 102 can implement process 1500. As discussed, communicative discourse trees enable improved search engine results.

At block 1501, process 1500 involves accessing a sentence including fragments. At least one fragment includes a verb and words and each word includes a role of the words within the fragment, and each fragment is an elementary discourse unit. For example, rhetoric classification application 102 accesses a sentence such as "Rebels, the self-proclaimed Donetsk People's Republic, deny that they controlled the territory from which the missile was allegedly fired" as described with respect to FIG. 13.

Continuing the example, rhetoric classification application 102 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, rhetoric classification application 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, rhetoric classification application 102 accesses a list of verbs, e.g., from VerbNet. Each verb matches or is related to the verb of the fragment. For example, the for the first fragment, the verb is "deny." Accordingly, rhetoric classification application 102 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," rhetoric classification application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Rhetoric classification application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, rhetorical classification application 102 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Concluding a Question Answering Session

As discussed, aspects of the present disclosure construct a comprehensive answer for presentation an interactive session between user and autonomous agent. In some cases, a short and concise answer such as account balance or person name suffices. This type of answer can be referred to as a factoid answer. In other cases, a longer answer that addresses subsequent user utterances is appropriate. This answer, a conclusive answer, is a comprehensive answer that gives a user a chance to get a deep understanding of an entity or topic. An example of a process for determining whether a factoid or conclusive answer is appropriate is discussed further with respect to FIG. 16.

Figure 16:
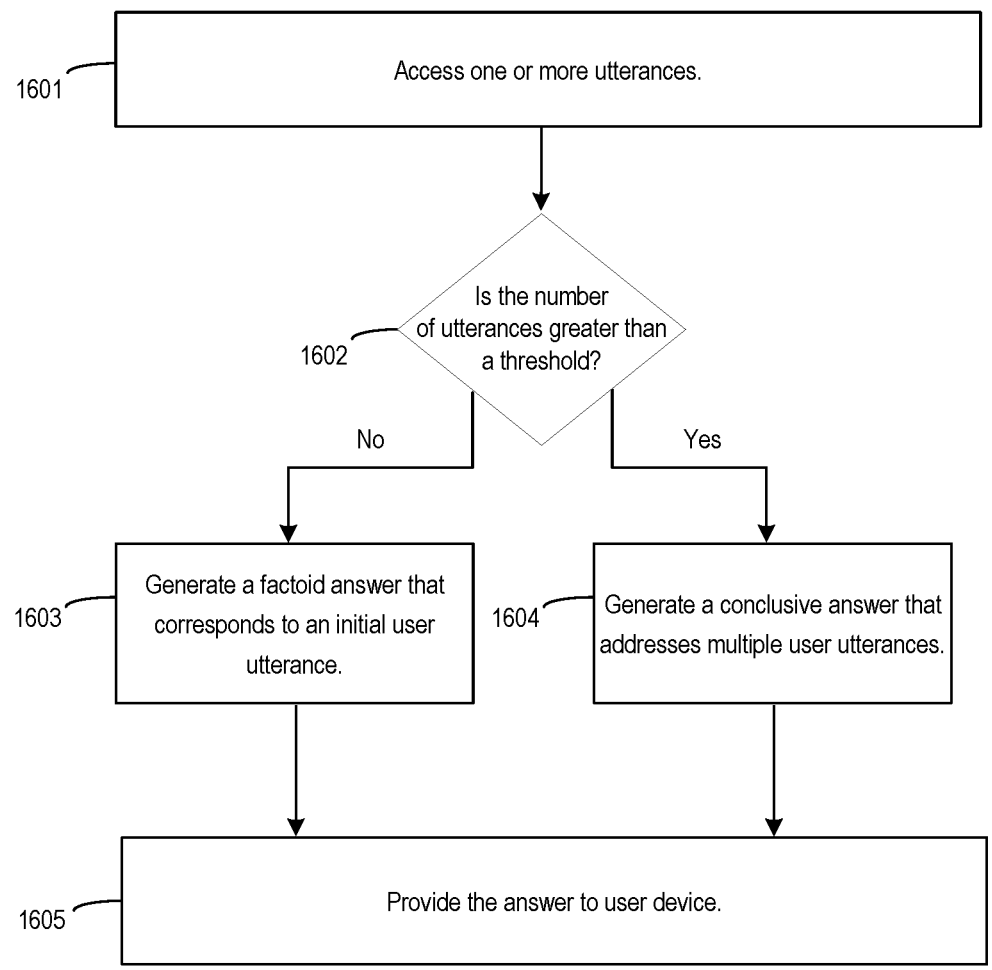
FIG. 16 illustrates an exemplary process for determining an appropriate type of answer to be provided by an autonomous agent, in accordance with an aspect.

FIG. 16 illustrates an exemplary process 1600 for determining an appropriate type of answer to be provided by an autonomous agent, in accordance with an aspect. Process 1600 can be performed by conclusive answer application 102. Process 1600 can be executed after one or more utterances have been received by conclusive answer application 102.

At block 1601, process 1600 involves accessing one or more utterances. After an initial user utterance, for example, a question, a number of clarification steps usually follow. For example, user device 170 transmits one or more utterances to computing device 101. Computing device 101 receives the utterance and proceeds to block 1602.

At block 1602, process 1600 involves determining whether a number of utterances is greater than a threshold. Conclusive answer application 102 can decide which kind of answer is most suitable for a given session. Using a threshold number of utterances is one way to determine whether a conclusive answer is appropriate. In an example, the threshold is four utterances. In this example, if four or more utterances are present, then a conclusive answer is generated. Based on a threshold number of occurrences being met, then conclusive answer application 102 can determine that a conclusive answer should be provided.

Other methods can be used. For example, conclusive answer application 102 can determine that a particular entity is present in multiple user utterances, indicating that the user is focused on a particular issue. In an aspect, conclusive answer application 102 can detect that a user accepted information related to an entity. For example, if conclusive answer application 102 responds to a user question about an entity and the accepts the response, then the conclusive answer application 102 can determine that a conclusive answer is appropriate. In another aspect, conclusive answer application 102 can detect a mental state from an utterance and determine that a conclusive answer is appropriate based on the mental state being detected. Mental states can be detected using trained machine learning models, using the techniques described herein.

If conclusive answer application 102 determines that a factoid answer is appropriate, then process 1600 proceeds to block 1603. If conclusive answer application 102 determines that a conclusive answer is appropriate, then process 1600 proceeds to block 1604.

At block 1603, process 1600 involves generating a factoid answer that corresponds to an initial user utterance. A factoid answer can be constructed based on a structure of how entity and its attributes are introduced. Conclusive answer application 102 can determine a value of the parameter or attribute that corresponds to the entity mentioned by the user. For a simple user utterance that requests information about one entity (e.g., the cost of a non-sufficient funds fee), a factoid answer is appropriate. Continuing the example, conclusive answer application 102 determines that the cost (the attribute) of a non-sufficient funds fee is $29 (the value) in this particular case.

Figure 17:
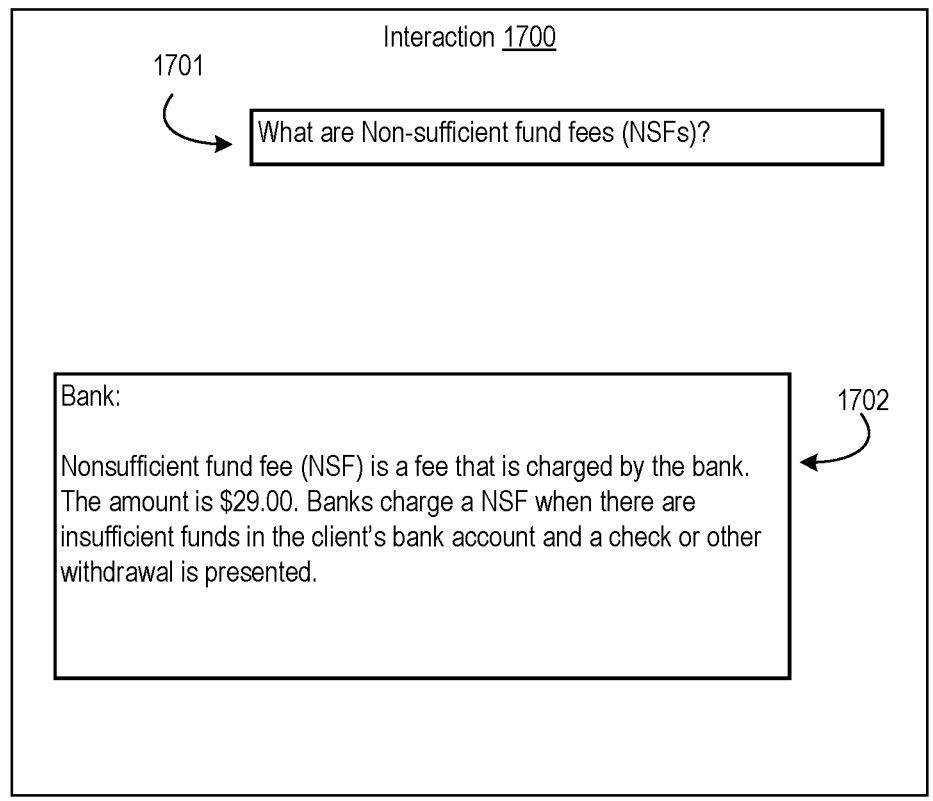
FIG. 17 illustrates an example of a conversation flow with a factoid answer, in accordance with an aspect.

FIG. 17 illustrates an example of a conversation flow with a factoid answer, in accordance with an aspect. FIG. 17 depicts interaction 1700, which includes question 1701 and agent answer 1702. As can be seen, the user's question is a relatively factual one and can be addressed by a simple factual answer.

Returning to FIG. 16, at block 1604, process 1600 involves generating a conclusive answer that addresses multiple user utterances. The goal of the conclusive answer is that sufficient information is provided that a user is satisfied with a session with an autonomous agent. If further questions based on this answer arise, the user can start a new session keeping in mind a specific focus. The answer should be as easy to perceive and as intuitive as possible.

Therefore the addition of images, videos and audio files can be beneficial. The answer compilation method should be domain independent and well-presented. In some cases, a table of contents and references are generated. Multiple sources can be used to assure an unbiased, objective description. In the case that the conclusive answer is opinionated, however, multiple opinions from a broad spectrum of perspectives must be compiled in a coherent manner.

Figure 18:
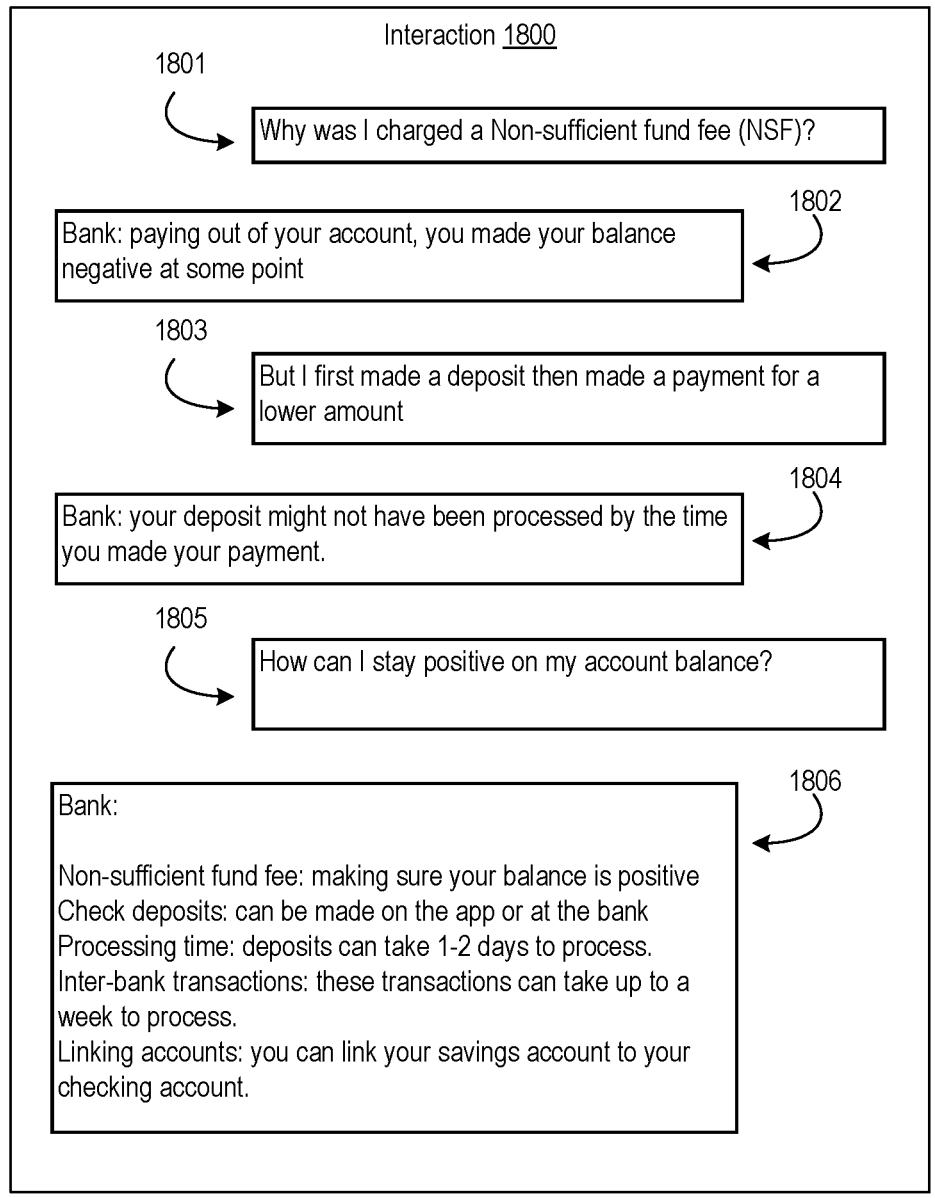
FIG. 18 illustrates an example of a conversation flow with a conclusive answer, in accordance with an aspect.

A structure of a conclusive answer can be based on questions, disagreements, and/or misunderstandings about an entity occurring in an utterance. For example, if a user is upset about a non-sufficient funds charge, then a conclusive answer may be appropriate because the user desires a more comprehensive answer that explains why the fee was charged. FIG. 18 illustrates one such case.

FIG. 18 illustrates an example of a conversation flow with a conclusive answer, in accordance with an aspect. FIG. 18 depicts interaction 1800, which includes user questions 1801, 1803, and 1805 and agent responses 1802, 1804, and 1806. As depicted by FIG. 18, the user has some issues with non-sufficient funds fees that go well beyond a simple factual question (as illustrated in the example provided by FIG. 17).

As can be seen, because the user is frustrated about the non-sufficient funds fee and is trying to understand why it happened and how to avoid it, a generic answer about an entity would probably frustrate the user because the user appears to know general information about non-sufficient funds fees. Therefore the conclusive answer should focus on a specific user issue/misunderstanding exposed in the previous utterances of a dialogue. Here, conclusive answer application provides a conclusive answer, agent response 1806. As can be seen, agent response 1806 addresses the user's multiple, but related issues, such as the issue raised by the user that a deposit was made (question 1803) and how to stay positive (question 1805).

At block 1605, process 1600 involves providing the conclusive answer to a user device. For example, conclusive answer application 102 provides the conclusive answer to user device 170. User device 170 can present the answer to a user via display 171.

Preparing Textual Content for Conclusive Answer Generation

In some cases, textual content is prepared for use by conclusive answer application 102. Preparation can help speed up access to text and/or remove extraneous or irrelevant content from the text. Conclusive answer application 102 can populate and use text corpus 105 with material gathered from other sources. Examples of sources include customer support logs, various forms of corresponding with customers or internal issue logs. Determining whether a text is suitable can be done by means of discourse-level analysis or in a string-based manner. Once chunks of text are extracted from various sources, the text can be indexed for faster searching.

Figure 19:
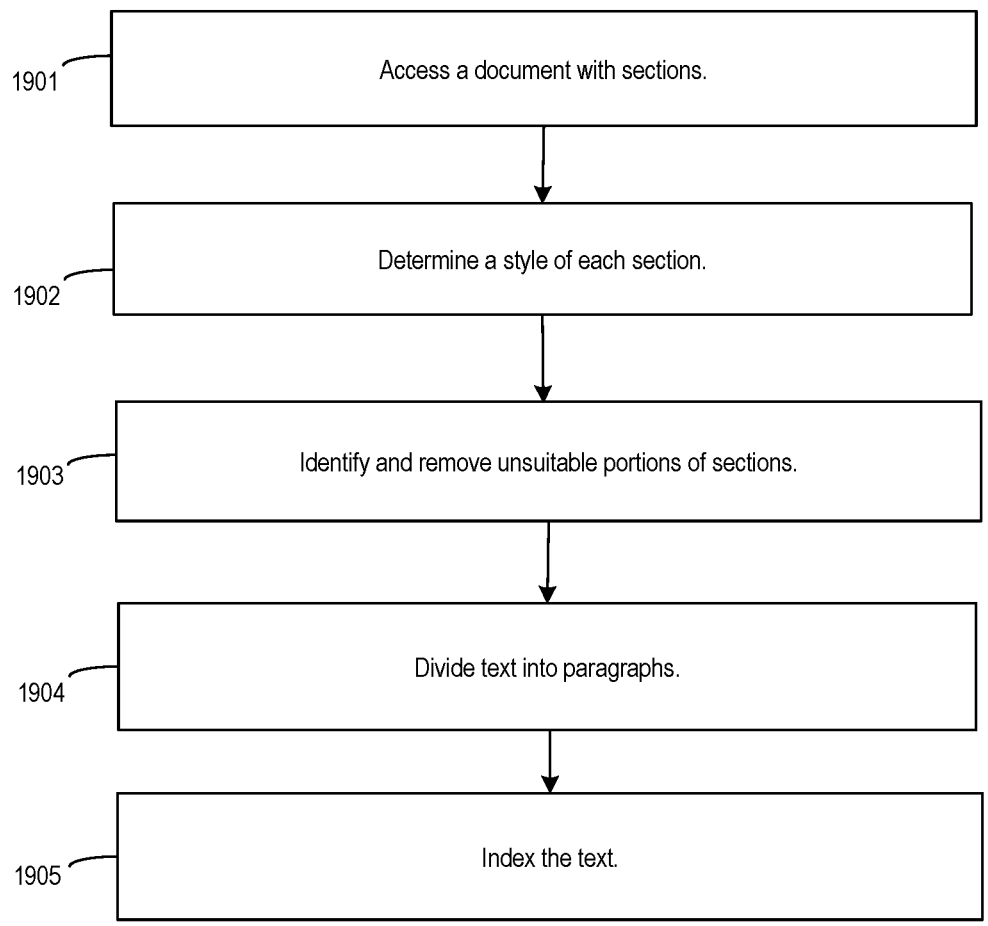
FIG. 19 illustrates an exemplary process for converting textual content for use in forming a conclusive answer, in accordance with an aspect.

FIG. 19 illustrates an exemplary process for converting textual content for use in forming a conclusive answer, in accordance with an aspect. Process 1900 can be performed by conclusive answer application 102.

At block 1901, process 1900 involves accessing a document with sections. Various document sources can be used, including the written documents and web pages explaining entities, their attributes and specifying business rules. Conclusive answer application 102 can covert the text into a unified form. In an example, the text can adhere (1) contain paragraph-size text (e.g., two to six sentences, 60-150 words) and (2) be self-contained. For example, conclusive answer application 102 can remove any references to previous or subsequent paragraphs.

At block 1902, process 1900 involves determining a style of each section. Style can be determined by using communicative discourse trees. For example, a communicative discourse tree can be created for a candidate section of text (e.g., by using process 1500 described in FIG. 15). The first communicative discourse tree can be provided to a machine learning model that is trained to detect whether the communicative discourse tree is similar in style to a reference (or desired style). Based on a threshold similarity level being reached, the candidate text is integrated into the text corpus 105.

At block 1903, process 1900 involves identifying and removing unsuitable portions of sections. Text can be extracted from a proper area of a webpage or a proper section of a document, and cleaned. For example, for web-based content, conclusive answer application 102 determines whether an article includes desired content (e.g. by matching keywords from the target content and the document). If the document does include the desired content, then conclusive answer application 102 finds a contiguous block of HTML in the webpage starting with the first word in the article and ending with the last.

Additionally, conclusive answer application can remove everything other than the desired text. For example, HTML tags, advertisements, and other irrelevant content can be removed. When the first word or last word of desired content is nested within one or more pairs of HTML tags, conclusive answer application can append the relevant opening and ending to the beginning and ending of the extracted block. If the content is not nested, then one or more pairs of tags can be left open, disrupting the article text's formatting. Such cases can be ignored.

At block 1904, process 1900 involves dividing text into paragraphs. Conclusive answer application 102 can divide sentences when a newline character is detected and/or maintain a minimum and/or maximum paragraph length (number of sentences).

At block 1905, process 1900 involves indexing the text. Standard indexing techniques can be used.

Building a Structure of a Factoid Answer

The logical structure of an answer reflects the structure of preceding dialogue. For example, if the user has asked questions and/or received answers from the autonomous agent after the initial utterance, then these questions or answers is reflected in the structure of the conclusive answer.

Determining the structure of an answer involves determining one or more entities present in the user utterances. An entity is a noun that refers to a person, place, or thing. An entity can have an attribute. For example, if an entity is "non-sufficient funds fee," then the attribute might be "$29" indicating that the fee is $29. Once a syntactic parse tree is constructed for a user utterance, entities can be identified. For example, noun phrases are first identified. If a noun phrase includes no more than three words, then it can be considered to form a named entity.

For a factoid answer, a default structure can be provided. This structure can be mined from the general web sources such as Wikipedia and domain-specific sources such as Investopedia.com. For example, the TOC for the topic Adjusted Gross Margin would use the section structure from the respective Investopedia.com page such as the main definitions, treatment in depth, associated topics and others. In this case it is possible to build TOC in a hierarchical manner. Table 1 below illustrates an example of a dialog flow in which a user asks about a particular entity.

TABLE 1

An example of a format for a factoid answer.

| Section | Contents |
| --- | --- |
| Section 1 | What is Entity E (the topic of the initial user utterance) |
| Section 2 | E has its attribute A: the first user clarification request |
| Section 3 | E and its attribute A1 and is it similar to A. |
| Section 4 | E and how it is similar to another entity E1. |

When determining the content of the answer, conclusive answer application 102 uses the determined structure as a guide. For each section, conclusive answer application 102 obtains content that corresponds to the entities and attributes determined in the user utterances.

Building a Structure of Conclusive Answer

A conclusive answer includes a section structure that reflects the logical flow of the user utterances as received so far. Conclusive answer application 102 can generate table of contents (TOC) that matches the structure.

For example, if a user has a specific concern about an entity, such as 'Why banks can increase APR without advance notice', then conclusive answer application 102 builds a structure to address this concern. Relevant documents can be identified by their respective section titles, which are selected to correspond to the contents of the user utterances. As compared to a factoid answer, the selected documents are identified to be relevant not just to the main entity but to the why certain entities are related and/or have certain attributes.

TABLE 2

An example of a format for a conclusive answer.

| Section | Contents |
| --- | --- |
| Section 1 | What is Entity E (the topic of the initial user utterance) |
| Section 2 | Why E has its attribute A: the first user clarification request |
| Section 3 | E and its attribute A1 and is it similar to A: the second user clarification request |
| Section 4 | E and how it is similar to another entity E1: the user expressed her concern about E2 |

For example, to form the document structure for the example considered in FIG. 18, the following phrases from the user questions can be as queries to establish the section structure of the conclusive answer: (1) Non-sufficient fund fee (NSF); (2) Why was I charged; (3) Make a deposit; and (4) make a payment for a lower amount. These phrases (extended with synonyms) should match some section structures of certain documents about NSF and banking customer support logs: they will form a skeleton of the resultant answer.

Conclusive answer application 102 can determine attributes that correspond to a particular entity is to form a structure of a document is an auto-complete feature for web search. Auto-complete results from a search engine can be the queries to the text corpus 105 and/or serve as section titles for the table-of-contents. For example, if an entity in the preceding dialogue is "Edison invented" then the final concluding document can include 'Edison invented the light bulb', and "Edison invented the phonograph."

Content Compilation for Answers

Once the structure of the conclusive answer has been determined, for example, by using process 1900, conclusive answer application 102 can determine relevant content. Content can be determined on a section basis. For example, referring back to Table 1 and Table 2 above, content can be determined for the first section, then the second section, and so on. Accordingly, conclusive answer application 102 can execute multiple times, once for each section.

Figure 20:
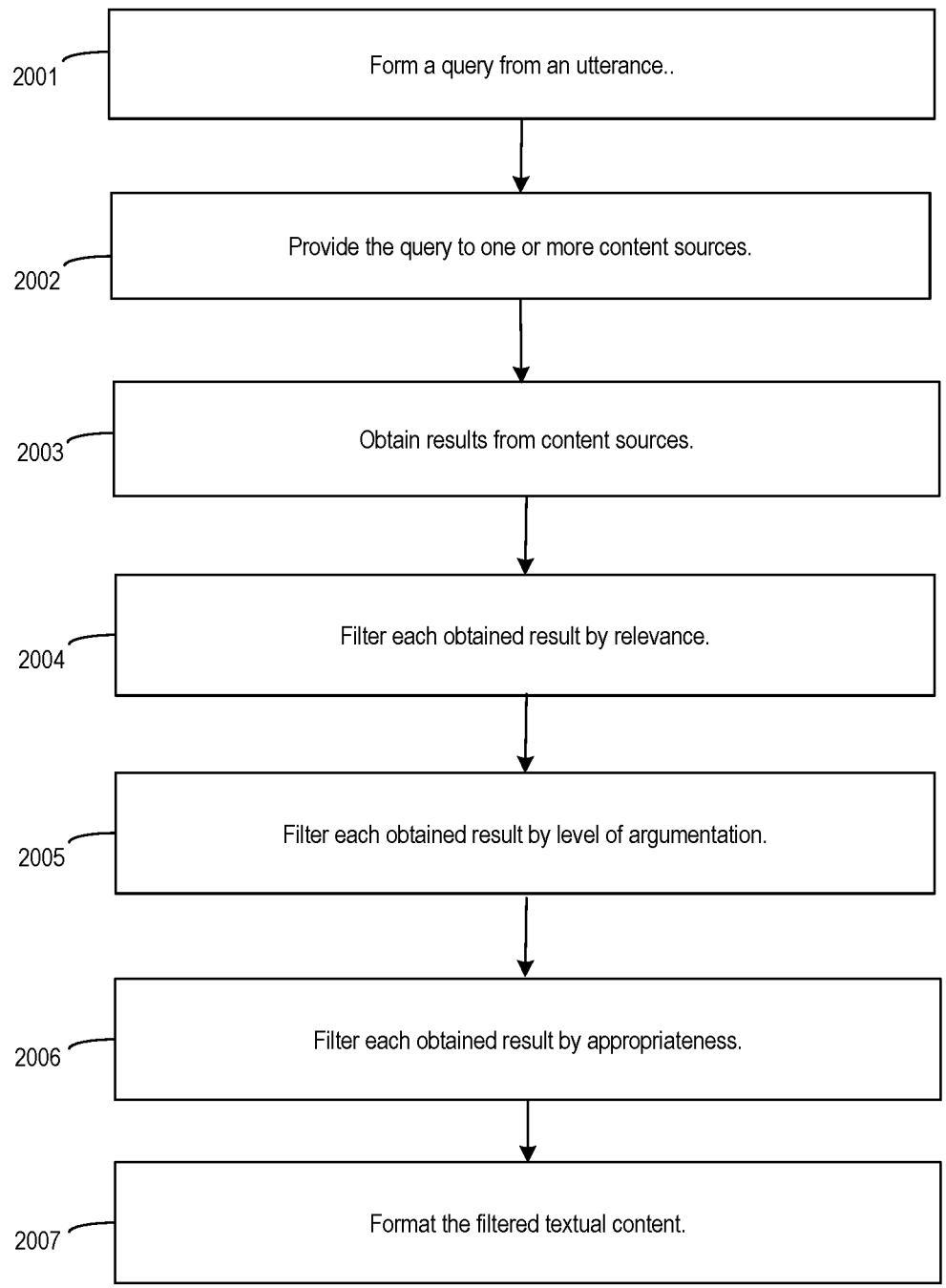
FIG. 20 illustrates an exemplary process for building a conclusive answer, in accordance with an aspect.

FIG. 20 illustrates an exemplary process 2000 for building a conclusive answer, in accordance with an aspect. Process 2000 can be performed once, for a single seed sentence, or multiple times, once for each seed sentence, according the appropriate structure of the conclusive answer, for example, as determined by process 1600. A single phrase or multiple phrases of the seed can form one or more paragraphs about the respective topics.

At block 2001, process 2000 involves forming a query from an utterance. The utterance includes text fragments.

Each fragment can correspond to an elementary discourse unit. To find relevant sentences on the web for a seed sentence, conclusive answer application 102 develops a query.

For example, conclusive answer application 102 can identify any entities within the fragments and then uses the entities as a basis to query content sources. Identification of one or more entities can be determined generating syntactic parse trees from the utterance. In an example, significant noun phrases have three or more keywords, e.g., two or more modifiers for a noun, or an entity, such as a proper noun. A main entity can be identified by traversing a syntactic parse tree for the utterance from the top (root) down and identifying the first noun phrase in the syntactic parse tree.

In an example, a user utterance is a seed. The utterance is "Give me a break, there is no reason why you can't retire in ten years if you had been a rational investor and not a crazy trader." Conclusive answer application 102 identifies the entity in this utterance by creating a syntactic parse tree and identifying a noun phrase that is closest to the root (or the top) of the parse tree. Here, conclusive answer application 102 identifies the main entity as "rational investor." The other candidates for the main entity are rejected since they are too broad (such as retire, a single-word concept), or occur with a negation not a crazy trader.

Conclusive answer application 102 identifies a main entity as retirement in the form of the verb retire. This main entity is constrained by the noun phrase that follows rational investor. To form the second query, rational investor and the next noun phrase not a crazy trader are combined. In some cases, a query with four to five keywords is used. Continuing the example, the following queries are formed for search engine API:

(Q1)+retire+rational+investor (Q2)+rational+investor not+crazy+trader

At block 2002, process 2000 involves providing the query to one or more content sources. The content sources can include text corpus 105 or other sources. Examples of content sources include such sources as Wikipedia, Bing, Yahoo API or Google, as well as respective news content.

Continuing the example, conclusive answer application 102 determines a page for the search "rational investor" by searching Wikipedia. The page redirects to "Homo economicus," which contains the following sections (1) the history of the term; (2) Model; (3) Criticisms; (4) Responses; (5) Perspectives; and (6) Homo sociologicus. In some cases, conclusive answer application 102 uses each section title. In some cases, if the queries do not result in enough relevant sentences, the whole sentence can be used as the query.

At block 2003, process 2000 involves obtaining results. Conclusive answer application 102 obtains the results from the search queries. In some cases, the results are divided into sentences and markers are inserted for any missing information, which can be substituted by text from original web pages or documents.

In some cases, only partial results are returned from the search. If only a fragment of sentence is present, then conclusive answer application 102 visits the original page, locates the sentence, and downloads the sentence.

Continuing the example, the following snippet is selected as a candidate to be included in a conclusive answer, since it contains all keywords from Q1. "How to Make Rational Investing Decisions Sound Mind Investing . . . Nov. 1, 2014—How to Make Rational Investing Decisions . . . pleasant and you'll probably have more money to spend in retirement and leave to your heirs." Conclusive answer application 102 downloads this webpage, extracts text from it and find a paragraph which corresponds to the above snippet. This is continued for all search results which contains all keywords from the query. Conclusive answer application 102 considers two text fragments from the search results:

(A1a) If you take the time to understand the psychology of rational investing, you'll make your life more pleasant and you'll probably have more money to spend in retirement and leave to your heirs.

(A1b) One needs many years of relevant data before deciding if a fund manager is truly skilled in rational investing or just lucky. Hence, by the time you have enough statistically relevant data to rely on, the manager is likely nearing retirement.

At block 2004, process 2000 involves filtering each obtained result by relevance. Conclusive answer application 102 determines a similarity between each search result of the search results and the seed sentence (e.g., as provided in block 2001). If a determined similarity is low, then conclusive answer application 102 compute a similarity for a preceding or consecutive sentence from the search results.

Relevance can be determined by using syntactic generalization. Conclusive answer application 102 can create a syntactic parse tree for each obtained result. Each of these syntactic parse trees can be compared to a syntactic parse tree generated from the utterance (e.g., at block 2001). The bag-of-words approach is extended towards extracting commonalities between the syntactic parse trees of the seed sentence and the sentence(s) obtained mined from another source (e.g., on the web). Syntactic generalization allows a domain-independent semantic measure of topical similarity between a pair of sentences, without it combination of sentences mined on the web would not form a meaningful text.

Common entities between seed and obtained sentence can be verified and an appropriateness metric obtained. The metric can include a syntactic generalization score (the cardinality of maximal common system of syntactic sub-trees). For two words of the same part of speech (POS), their generalization is the same word with the POS. If the lemmas for the two words are different but the POS is the same, then the POS remains in the result. If lemmas are the same but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation but indicate the above instantiation of predicates with arguments.

Consider the following two sentences "camera with digital zoom" and "camera with zoom for beginners." To express the meanings, the following logic predicates are used:

camera(name_of_feature, type_of_users) and
zoom(type_of_zoom).

Note that this is a simplified example, and as such, may have a reduced number of arguments as compared to more typical examples. Continuing the example, the above expressions can be represented as:

camera(zoom(digital), AnyUser),
camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), AnyUser).

At the syntactic level, the expressions are subjected to a generalization ('^') of two noun phrases as: {NN-camera, PRP-with, [digital], NN-zoom [for beginners]}. The expressions in square brackets are eliminated because they occur in one expression but not occur in the other. As a result, obtain{NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models (Mikolov et al., 2015), compute generalization of two different words, the following rule is used. If subject1=subject2, then subject1^subject2=<subject1, POS (subject1), 1>. Otherwise, if they have the same part-of-speech, subject1^subject2=<*,POS(subject1), word2vecDistance(subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example, "To buy digital camera today, on Monday."

"Digital camera was a good buy today, first Monday of the month."

Generalization is {<JJ-digital, NN-camera>,<NN-today, ADV,Monday>}, where the generalization for noun phrases is followed by the generalization for an adverbial phrase. Verb buy is excluded from both generalizations because it occurs in a different order in the above phrases. Buy-digital-camera is not a generalization phrase because buy occurs in different sequence with the other generalization nodes.

Therefore, a sentence similarity assessment can be expressed via a generalization operator.

$A^\wedge A1a=RST$-Condition($VP$( . . . ,$NP$ rational investing),*-retire)

$A^\wedge A1b=NP$ rational investing),*-retire.

In the first search result A1a retire and rational investing are connected in the similar way to the seed S: relational investing is connected by the rhetorical relation Condition to the phrase including retire. In A1b syntactic matching part is the same but these phrases occur in two different sentences and are related in a much more complex indirect way than in the seed. Hence A1a is a good fragment to include in the conclusive answer and A1b is not so good.

Returning to FIG. 20, at block 2005, process 2000 involves filtering each obtained result by a presence of argumentation. Conclusive answer application 102 can determine whether the obtained text is opinionated or argumentative. Communicative discourse trees can be used. For example, by forming a communicative discourse tree for obtained text and providing the obtained text to a trained machine learning model trained to detect opinionated text, conclusive answer application 102 can determine whether the text contains an opinion. The trained machine learning model uses on mental states and/or communicative actions identified in the communicative discourse tree.

For example, conclusive answer application 102 can determine a presence of argumentation in a sentence by forming a communicative discourse tree for the sentence and applying a trained machine learning model (e.g., rhetoric agreement classifier 120) to the communicative discourse tree. The communicative discourse tree includes a root node. Examples are discussed herein with respect to FIGS. 13 and 15. Conclusive answer application 102 applies the trained machine learning model to the communicative discourse tree. The rhetoric agreement classifier 120 uses standard machine learning techniques. For example, conclusive answer application 102 can train rhetoric agreement classifier 120 with positive and negative classes communicative discourse trees or tree pairs. The positive class includes request-response pairs from text that includes argumentation and the negative class includes pairs from text that does not include argumentation. Examples of text with argumentation include product and service reviews.

At block 2006, process 2000 involves filtering each obtained result by appropriateness (or cohesiveness). Determining appropriateness can be accomplished by applying grammar rules. For example, results that include verbs in the imperative form should be excluded because such results are more likely to reflect advertisements or sales pitches. Selected fragments to be included into a conclusive answer should include opinionated sentences and avoid auxiliary comments, elaborations on topics which are not central to the topic of the seed and other supplementary parts of a document. These roles of each sentence can be determined by CDT of each document paragraph.

At block 2007, process 2000 involves formatting the filtered textual content. In some cases, conclusive answer application 102 can reformat the filtered content to better fit together, and joined in paragraphs. Once text fragments for a section are obtained, conclusive answer application 102 finds an optimal order to form the section text. For example, if both above text fragments are accepted (not just the first one), the second should follow the first since it contains the conclusion . . . Hence . . . . And both these fragments are related to the same main entity. Still, the resultant text would not read well since there is a strong deviation of topics towards finding an account manager, which is not the main topic of this section. Given an unordered set of text fragments or paragraph, cohesiveness of the resultant text cannot be ensured. Instead, an optimal order for these fragments can be found, which minimizes the disturbance of content flow and coherence of the resultant text.

Process 2000 can be repeated for each utterance, according to the determined structure of the answer. For example, conclusive answer application 102 can iterate through each utterance. Conclusive answer application 102 can also combine sections in documents as appropriate and add reference sections for each section.

Modeling the Content Structure of Texts

Certain aspects can model a content structure of texts within a specific domain in terms of the attributes of an entity this texts expresses and the order in which these topics appear. Some research intended to characterize texts in terms of domain-independent rhetorical elements, such as schema items (McKeown, 1985) or rhetorical relations (Mann and Thompson, 1988; Marcu, 1997). Conversely, (Barzilay and Lee 2004) focus on content, domain-dependent dimension of the structure of text. They present an effective knowledge-lean method for learning content models from unannotated documents, utilizing a novel adaptation of algorithms for Hidden Markov Models. Certain aspects perform two complementary tasks: information ordering and extractive summarization. The experiments showed that incorporating content models in these applications gives a substantial improvement.

In general, the flow of text is determined by the topic change: how attributes of an entity evolve. (Barzilay and Lee 2004) designed a model that can specify, for example, that articles about mountains typically contain information about height, climate, assents, and climbers. Instead of manually determining the evolution of attributes (the topics for a given domain) a distributional view can be taken. It is possible to machine learn these patterns of attribute evolution directly from un-annotated texts via analysis of word distribution patterns. (Harris 1982) wrote that a number of word recurrence patterns is correlated with various types of discourse structure type.

Advantages of a distributional perspective include both drastic reduction in human effort and recognition of "topics" that might not occur to a human expert and yet, when explicitly modeled, aid in applications. Of course, the success of the distributional approach depends on the existence of recurrent patterns. In arbitrary document collections, such recurrent patterns might be too variable to be easily detected by statistical means. However, research has shown that texts from the same domain tend to exhibit high similarity (Wray, 2002). At the same time, from the cognitive science perspective, this similarity is not random and is instead systematic, since text structure facilitates a text comprehension by readers and their capability of recall (Bartlett, 1932).

We assume that text chunks convey information about a single attribute of an entity (a single topic). Specifying the length of text chunks can defines the granularity of the induced attribute/topic: we select the average paragraph length.

We will build a content model as a Hidden-Markov Model in which each state s corresponds to a distinct topic and generates sentences relevant to that topic according to a state-specific language model $p_s$. Note that standard-gram language models can therefore be considered to be degenerate (single-state) content models. State transition probabilities give the probability of changing from a given topic to another, thereby capturing constraints attribute evolution (topic shift).

In our implementation, we use bigram language models, so that the probability of an −word sentence $x=w_1 w_2 \ldots w_n$ being generated by a state s $$p_s(x) = \Pi_{i=1}^n p_s(w_i | w_{i-1}).$$

We will now describe state bigram probabilities $p_s(w_1 | w_{i-1})$. To initialize a set of attributes by partitioning all of the paragraphs (or text chunks) from the documents in a given domain-specific collection into clusters. First, we create clusters via complete-link clustering, measuring sentence similarity by the cosine metric using word bigrams as features. Then, given our knowledge that documents may sometimes discuss new and/or irrelevant content as well, we create an AUX cluster by merging together all clusters containing #paragraphs <t (selected threshold). We rely on the assumption that such clusters consist of "outlier" sentences.

Given a set=$c_1, c_2, \ldots, c_m$ of m clusters, where $c_m$ is the AUX cluster, we construct a content model with corresponding states $s_1, s_2, \ldots, s_m$. we refer to $s_m$ as the insertion state.

For each state $s_i$ i<m bigram probabilities (which induce the state's sentence-emission probabilities) are estimated using smoothed counts from the corresponding cluster $$p_{s_i}(w'|w) \stackrel{def}{=} \frac{f_{c_i}(ww') + \delta_1}{f_{c_i}(w) + \delta_1 |V|},$$

where f $c_1(y)$ is the frequency with which word sequence y occurs within the sentences in cluster $c_i$, and V is the vocabulary.

We want the insertion state $s_m$ to simulate digressions or unseen attributes. We ignore the content of AUX cluster and force the language model to be complementary to those of the other states by setting $$p_{s_m}(w'|w) \stackrel{def}{=} \frac{1 - \max_{i:i<m} p_{s_i}(w'|w)}{\sum_{u \in V} \left(1 - \max_{i:i<m} p_{s_i}(u|w)\right)}.$$

Our state-transition probability estimates arise from considering how the paragraphs from the same document are distributed across the clusters. For two clusters c and c' we define D(c, c') as the number of documents in which a paragraph from c immediately precedes one from c'. D(c) is the number of documents containing paragraphs from c. For any two states $s_i$ and $s_j$, i,j<m, we rely on the following smooth estimate of the probability of transitioning from $s_i$ to $s_j$:

$$p(s_j|s_i) = \frac{D(c_i, c_j) + \delta_2}{D(c_i) + \delta_2 m}.$$

Building Answer Document Based on Similarity and Compositional Semantics

Certain aspects can model a document in a vector representation using a paragraph vector model (Le and Mikolov 2014) that computes continuous distributed vector representations of varying-length texts. The source documents' section that are semantically close (or similar) to the desired document is identified in this vector space using cosine similarity. The structure of similar articles cab then be emulated, the important sections identified and assign relevant web-content or intranet content assigned to the sections.

The entire Wikipedia to obtain D-dimensional representations of words/entities as well as documents using the paragraph vector distributed memory model (Le and Mikolov, 2014). Similar articles are identified using cosine similarity between the vector representations of the missing entity and representations of the existing entities (entities that have corresponding articles). Content from the similar articles are used to train multi-class classifiers that can assign web-retrieved content on the red-linked entity to relevant sections of the article. The paragraph vector distributed memory model is used to identify similar documents to rely upon on one hand and also an inference of vector representations of new paragraphs retrieved from the web on the other hand.

We take a sequence of words from a similar document and approach the last word that can be reused. Then we attempt to predict the next word using PV-DM. The PV-DM model is based on the principle that several contexts sampled from the paragraph can be used to predict the next word. Given a sequence of T words ($w_1, w_2, \ldots, w_T$), the task is to maximize the average log probability. In the top equation, c is the size of the context (number of words before and after the current word to be used for training). The conditional probability of $w_{t+j}$ given $w_t$ is given by the softmax function (Bridle 1990) in bottom equation, where $v'_{w_{t+j}}$ and $v_w$ refers to the output and the input vector representations of the word w, respectively. W refers to the total number of words in the vocabulary.

$$F = \frac{1}{T}\sum_{t=1}^{t=T}\sum_{-c \leq j \leq c, j \neq 0} \log p(w_{t+j}|w_t)$$

$$p(w_{t+j}|w_t) = \frac{\exp\left(v'_{w_{t+j}}{}^T v_{w_t}\right)}{\sum_{w=1}^{W} \exp\left(v'_w{}^T v_{w_t}\right)}$$

Exemplary Computing Systems

Figure 21:
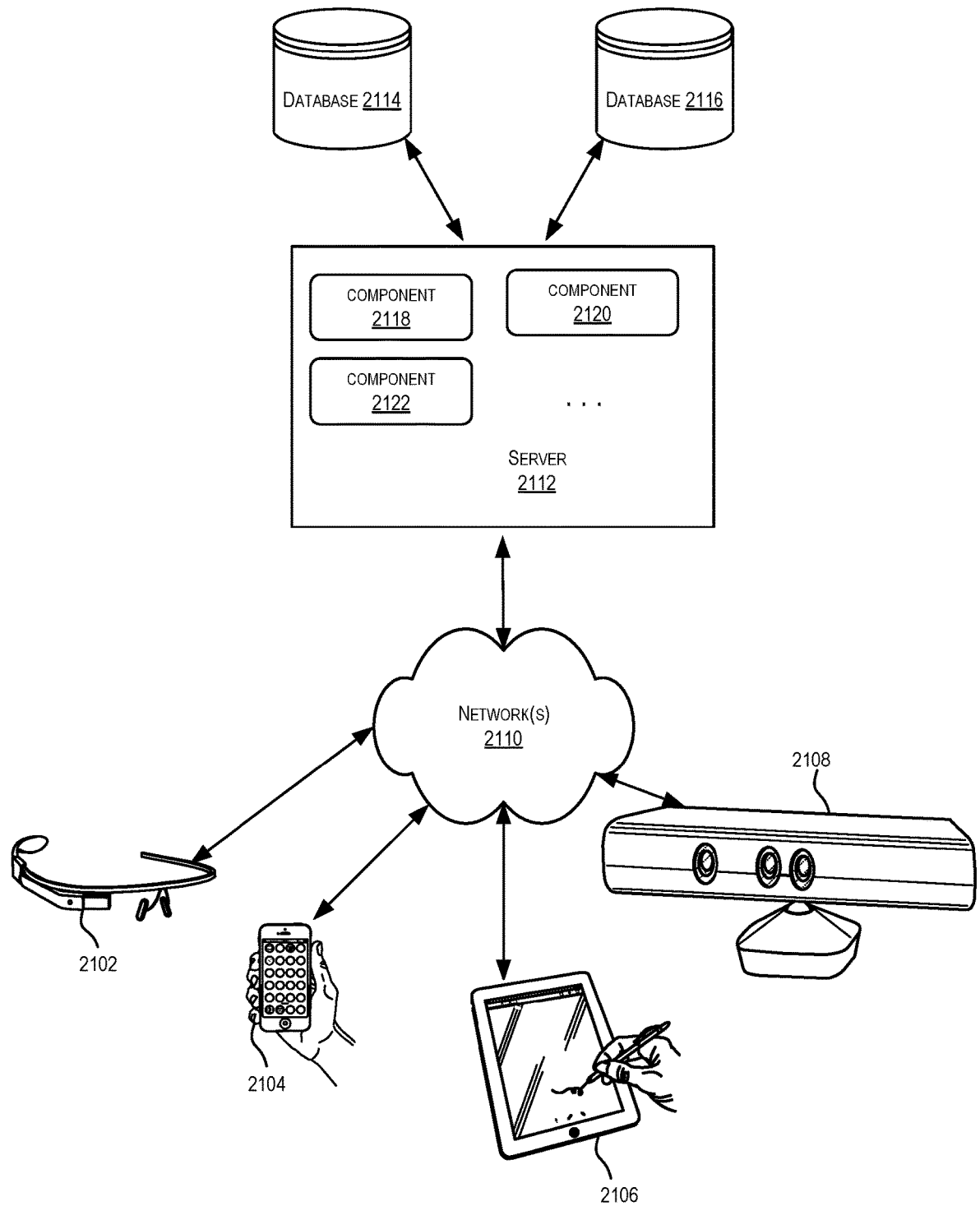
FIG. 21 depicts a simplified diagram of a distributed system for implementing one of the aspects

FIG. 21 depicts a simplified diagram of a distributed system 2100 for implementing one of the aspects. In the illustrated aspect, distributed system 2100 includes one or more client computing devices 2102, 2104, 2106, and 2108, which are configured to execute and operate a client application such as a web browser, proprietary client (e.g., Oracle Forms), or the like over one or more network(s) 2110. Server 2112 may be communicatively coupled with remote client computing devices 2102, 2104, 2106, and 2108 via network 2110.

In various aspects, server 2112 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2102, 2104, 2106, and/or 2108. Users operating client computing devices 2102, 2104, 2106, and/or 2108 may in turn utilize one or more client applications to interact with server 2112 to utilize the services provided by these components.

In the configuration depicted in the figure, the software components 2118, 2120 and 2122 of system 2100 are shown as being implemented on server 2112. In other aspects, one or more of the components of system 2100 and/or the services provided by these components may also be implemented by one or more of the client computing devices 2102, 2104, 2106, and/or 2108. Users operating the client computing devices may then utilize one or more client applications to use the services provided by these components. These components may be implemented in hardware, firmware, software, or combinations thereof. It should be appreciated that various different system configurations are possible, which may be different from distributed system 2100. The aspect shown in the figure is thus one example of a distributed system for implementing an aspect system and is not intended to be limiting.

Client computing devices 2102, 2104, 2106, and/or 2108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2102, 2104, 2106, and 2108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2110.

Although exemplary distributed system 2100 is shown with four client computing devices, any number of client computing devices may be supported. Other devices, such as devices with sensors, etc., may interact with server 2112.

Network(s) 2110 in distributed system 2100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2110 can be a local area network (LAN), such as one based on Ethernet, Token-Ring and/or the like. Network(s) 2110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.21 suite of protocols, Bluetooth®, and/or any other wireless protocol); and/or any combination of these and/or other networks.

Server 2112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2112 can include one or more virtual machines running virtual operating systems, or other computing architectures involving virtualization. One or more flexible pools of logical storage devices can be virtualized to maintain virtual storage devices for the server. Virtual networks can be controlled by server 2112 using software defined networking. In various aspects, server 2112 may be adapted to run one or more services or software applications described in the foregoing disclosure. For example, server 2112 may correspond to a server for performing processing described above according to an aspect of the present disclosure.

Server 2112 may run an operating system including any of those discussed above, as well as any commercially available server operating system. Server 2112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2112 may include one or more applications to analyze and consolidate data feeds and/or event updates received from users of client computing devices 2102, 2104, 2106, and 2108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2112 may also include one or more applications to display the data feeds and/or real-time events via one or more display devices of client computing devices 2102, 2104, 2106, and 2108.

Distributed system 2100 may also include one or more databases 2114 and 2116.

Databases 2114 and 2116 may reside in a variety of locations. By way of example, one or more of databases 2114 and 2116 may reside on a non-transitory storage medium local to (and/or resident in) server 2112. Alternatively, databases 2114 and 2116 may be remote from server 2112 and in communication with server 2112 via a network-based or dedicated connection. In one set of aspects, databases 2114 and 2116 may reside in a storage-area network (SAN). Similarly, any necessary files for performing the functions attributed to server 2112 may be stored locally on server 2112 and/or remotely, as appropriate. In one set of aspects, databases 2114 and 2116 may include relational databases, such as databases provided by Oracle, that are adapted to store, update, and retrieve data in response to SQL-formatted commands.

Figure 22:
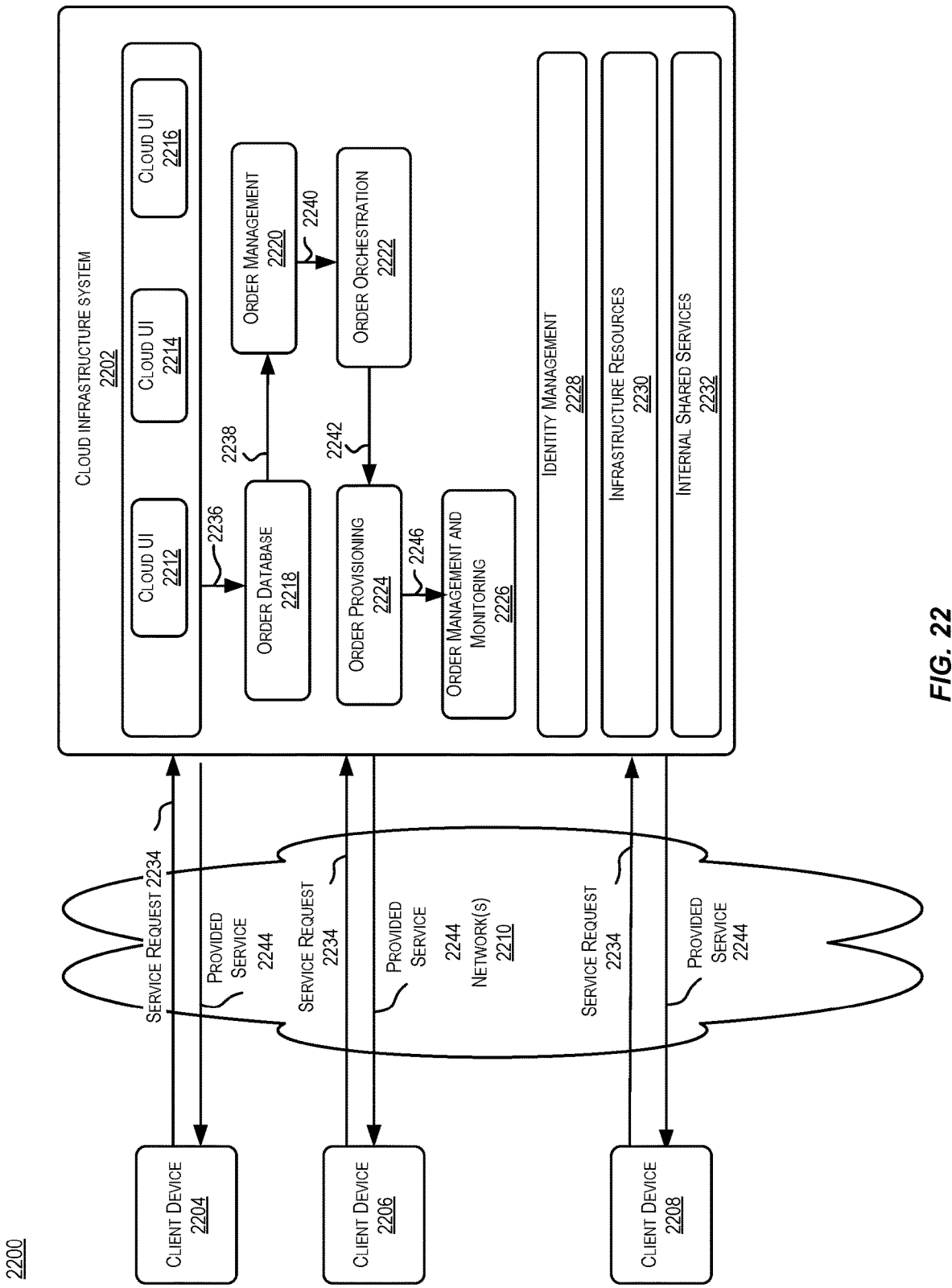
FIG. 22 is a simplified block diagram of components of a system environment by which services provided by the components of an aspect system may be offered as cloud services in accordance with an aspect.

FIG. 22 is a simplified block diagram of one or more components of a system environment 2200 by which services provided by one or more components of an aspect system may be offered as cloud services, in accordance with an aspect of the present disclosure. In the illustrated aspect, system environment 2200 includes one or more client computing devices 2204, 2206, and 2208 that may be used by users to interact with a cloud infrastructure system 2202 that provides cloud services. The client computing devices may be configured to operate a client application such as a web browser, a proprietary client application (e.g., Oracle Forms), or some other application, which may be used by a user of the client computing device to interact with cloud infrastructure system 2202 to use services provided by cloud infrastructure system 2202.

It should be appreciated that cloud infrastructure system 2202 depicted in the figure may have other components than those depicted. Further, the aspect shown in the figure is only one example of a cloud infrastructure system that may incorporate an aspect of the invention. In some other aspects, cloud infrastructure system 2202 may have more or fewer components than shown in the figure, may combine two or more components, or may have a different configuration or arrangement of components.

Client computing devices 2204, 2206, and 2208 may be devices similar to those described above for 2102, 2104, 2106, and 2108.

Although exemplary system environment 2200 is shown with three client computing devices, any number of client computing devices may be supported. Other devices such as devices with sensors, etc. may interact with cloud infrastructure system 2202.

Network(s) 2210 may facilitate communications and exchange of data between clients 2204, 2206, and 2208 and cloud infrastructure system 2202. Each network may be any type of network familiar to those skilled in the art that can support data communications using any of a variety of commercially-available protocols, including those described above for network(s) 2110.

Cloud infrastructure system 2202 may comprise one or more computers and/or servers that may include those described above for server 2122.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2202 may be adapted to automatically provision, manage and track a customer's subscription to services offered by cloud infrastructure system 2202. Cloud infrastructure system 2202 may provide the cloud services via different deployment models. For example, services may be provided under a public cloud model in which cloud infrastructure system 2202 is owned by an organization selling cloud services (e.g., owned by Oracle) and the services are made available to the general public or different industry enterprises. As another example, services may be provided under a private cloud model in which cloud infrastructure system 2202 is operated solely for a single organization and may provide services for one or more entities within the organization. The cloud services may also be provided under a community cloud model in which cloud infrastructure system 2202 and the services provided by cloud infrastructure system 2202 are shared by several organizations in a related community. The cloud services may also be provided under a hybrid cloud model, which is a combination of two or more different models.

In some aspects, the services provided by cloud infrastructure system 2202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2202. Cloud infrastructure system 2202 then performs processing to provide the services in the customer's subscription order.

In some aspects, the services provided by cloud infrastructure system 2202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2202 may also include infrastructure resources 2230 for providing the resources used to provide various services to customers of the cloud infrastructure system. In one aspect, infrastructure resources 2230 may include pre-integrated and optimized combinations of hardware, such as servers, storage, and networking resources to execute the services provided by the PaaS platform and the SaaS platform.

In some aspects, resources in cloud infrastructure system 2202 may be shared by multiple users and dynamically re-allocated per demand. Additionally, resources may be allocated to users in different time zones. For example, cloud infrastructure system 2202 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2232 may be provided that are shared by different components or modules of cloud infrastructure system 2202 and by the services provided by cloud infrastructure system 2202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2202 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2202, and the like.

In one aspect, as depicted in the figure, cloud management functionality may be provided by one or more modules, such as an order management module 2220, an order orchestration module 2222, an order provisioning module 2224, an order management and monitoring module 2226, and an identity management module 2228. These modules may include or be provided using one or more computers and/or servers, which may be general purpose computers, specialized server computers, server farms, server clusters, or any other appropriate arrangement and/or combination.

In exemplary operation 2234, a customer using a client device, such as client device 2204, 2206 or 2208, may interact with cloud infrastructure system 2202 by requesting one or more services provided by cloud infrastructure system 2202 and placing an order for a subscription for one or more services offered by cloud infrastructure system 2202. In certain aspects, the customer may access a cloud User Interface (UI), cloud UI 2222, cloud UI 2214 and/or cloud UI 2216 and place a subscription order via these UIs. The order information received by cloud infrastructure system 2202 in response to the customer placing an order may include information identifying the customer and one or more services offered by the cloud infrastructure system 2202 that the customer intends to subscribe to.

After an order has been placed by the customer, the order information is received via the cloud UIs, 2222, 2214 and/or 2216.

At operation 2236, the order is stored in order database 2218. Order database 2218 can be one of several databases operated by cloud infrastructure system 2202 and operated in conjunction with other system elements.

At operation 2238, the order information is forwarded to an order management module 2220. In some instances, order management module 2220 may be configured to perform billing and accounting functions related to the order, such as verifying the order, and upon verification, booking the order.

At operation 2240, information regarding the order is communicated to an order orchestration module 2222. Order orchestration module 2222 may utilize the order information to orchestrate the provisioning of services and resources for the order placed by the customer. In some instances, order orchestration module 2222 may orchestrate the provisioning of resources to support the subscribed services using the services of order provisioning module 2224.

In certain aspects, order orchestration module 2222 enables the management of business processes associated with each order and applies business logic to determine whether an order should proceed to provisioning. At operation 2242, upon receiving an order for a new subscription, order orchestration module 2222 sends a request to order provisioning module 2224 to allocate resources and configure those resources needed to fulfill the subscription order. Order provisioning module 2224 enables the allocation of resources for the services ordered by the customer. Order provisioning module 2224 provides a level of abstraction between the cloud services provided by cloud infrastructure system 2200 and the physical implementation layer that is used to provision the resources for providing the requested services. Order orchestration module 2222 may thus be isolated from implementation details, such as whether or not services and resources are actually provisioned on the fly or pre-provisioned and only allocated/assigned upon request.

At operation 2244, once the services and resources are provisioned, a notification of the provided service may be sent to customers on client devices 2204, 2206 and/or 2208 by order provisioning module 2224 of cloud infrastructure system 2202.

At operation 2246, the customer's subscription order may be managed and tracked by an order management and monitoring module 2226. In some instances, order management and monitoring module 2226 may be configured to collect usage statistics for the services in the subscription order, such as the amount of storage used, the amount data transferred, the number of users, and the amount of system up time and system down time.

In certain aspects, cloud infrastructure system 2200 may include an identity management module 2228. Identity management module 2228 may be configured to provide identity services, such as access management and authorization services in cloud infrastructure system 2200. In some aspects, identity management module 2228 may control information about customers who wish to utilize the services provided by cloud infrastructure system 2202. Such information can include information that authenticates the identities of such customers and information that describes which actions those customers are authorized to perform relative to various system resources (e.g., files, directories, applications, communication ports, memory segments, etc.) Identity management module 2228 may also include the management of descriptive information about each customer and about how and by whom that descriptive information can be accessed and modified.

Figure 23:
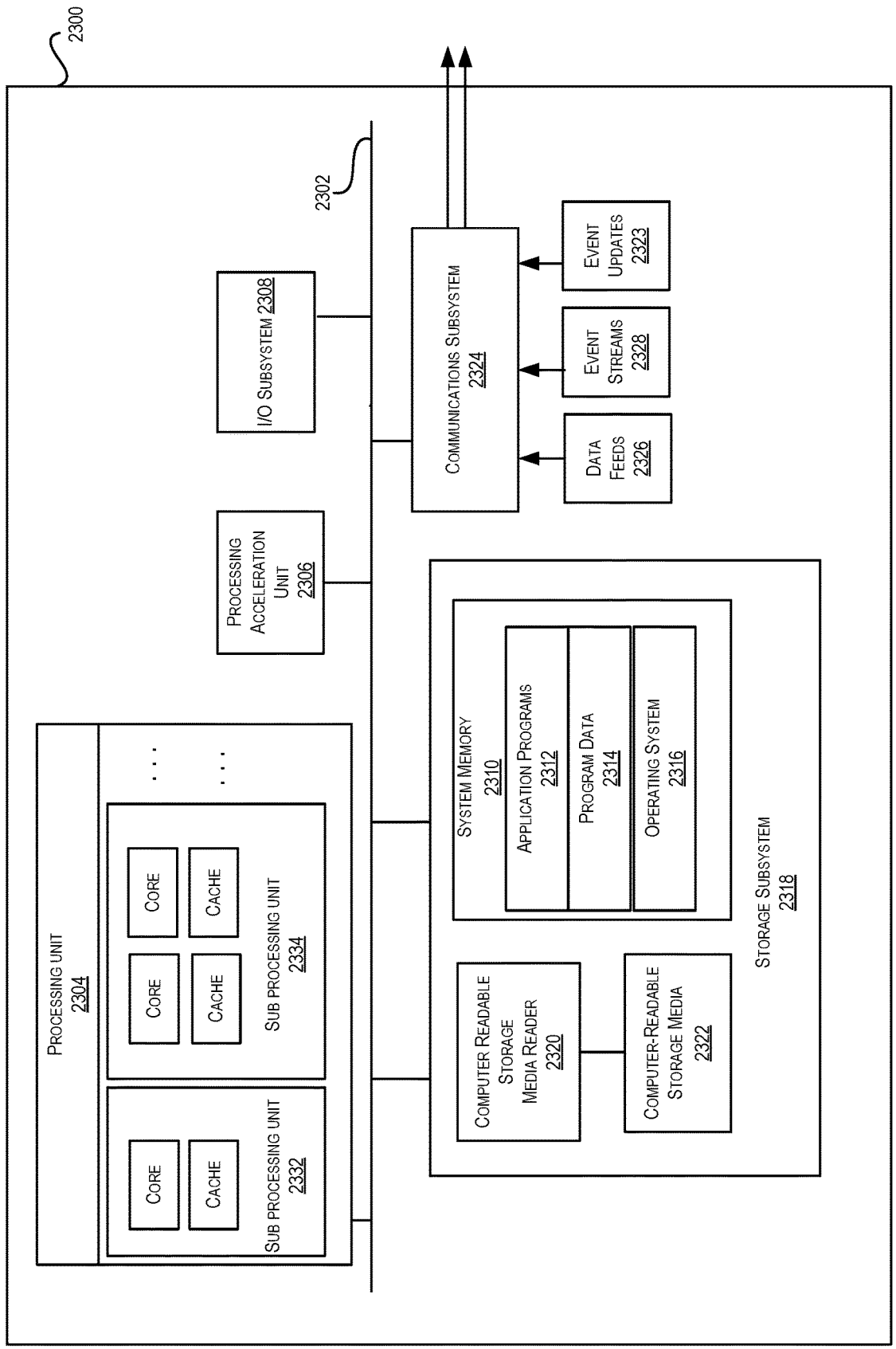
FIG. 23 illustrates an exemplary computer system, in which various aspects of the present invention may be implemented.

FIG. 23 illustrates an exemplary computer system 2300, in which various aspects of the present invention may be implemented. The system 2300 may be used to implement any of the computer systems described above. As shown in the figure, computer system 2300 includes a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. Storage subsystem 2318 includes tangible computer-readable storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative aspects of the bus subsystem may utilize multiple buses. Bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2386.1 standard.

Processing unit 2304, which can be implemented as one or more integrated circuits (e.g., a conventional microprocessor or microcontroller), controls the operation of computer system 2300. One or more processors may be included in processing unit 2304. These processors may include single core or multicore processors. In certain aspects, processing unit 2304 may be implemented as one or more independent processing units 2332 and/or 2334 with single or multicore processors included in each processing unit. In other aspects, processing unit 2304 may also be implemented as a quad-core processing unit formed by integrating two dual-core processors into a single chip.

In various aspects, processing unit 2304 can execute a variety of programs in response to program code and can maintain multiple concurrently executing programs or processes. At any given time, some or all of the program code to be executed can be resident in processor(s) 2304 and/or in storage subsystem 2318. Through suitable programming, processor(s) 2304 can provide various functionalities described above. Computer system 2300 may additionally include a processing acceleration unit 2306, which can include a digital signal processor (DSP), a special-purpose processor, and/or the like.

I/O subsystem 2308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2300 may comprise a storage subsystem 2318 that comprises software elements, shown as being currently located within a system memory 2310. System memory 2310 may store program instructions that are loadable and executable on processing unit 2304, as well as data generated during the execution of these programs.

Depending on the configuration and type of computer system 2300, system memory 2310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2304. In some implementations, system memory 2310 may include multiple different types of memory, such as static random access memory (SRAM) or dynamic random access memory (DRAM). In some implementations, a basic input/output system (BIOS), containing the basic routines that help to transfer information between elements within computer system 2300, such as during start-up, may typically be stored in the ROM. By way of example, and not limitation, system memory 2310 also illustrates application programs 2312, which may include client applications, Web browsers, mid-tier applications, relational database management systems (RDBMS), etc., program data 2314, and an operating system 2316. By way of example, operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2318 may also provide a tangible computer-readable storage medium for storing the basic programming and data constructs that provide the functionality of some aspects. Software (programs, code modules, instructions) that when executed by a processor provide the functionality described above may be stored in storage subsystem 2318. These software modules or instructions may be executed by processing unit 2304. Storage subsystem 2318 may also provide a repository for storing data used in accordance with the present invention.

Storage subsystem 2318 may also include a computer-readable storage media reader 2320 that can further be connected to computer-readable storage media 2322. Together and, optionally, in combination with system memory 2310, computer-readable storage media 2322 may comprehensively represent remote, local, fixed, and/or removable storage devices plus storage media for temporarily and/or more permanently containing, storing, transmitting, and retrieving computer-readable information.

Computer-readable storage media 2322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2300.

By way of example, computer-readable storage media 2322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to connect to one or more devices via the Internet. In some aspects, communications subsystem 2324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.21 family standards, or other mobile communication technologies, or any combination thereof), global positioning system (GPS) receiver components, and/or other components. In some aspects, communications subsystem 2324 can provide wired network connectivity (e.g., Ethernet) in addition to or instead of a wireless interface.

In some aspects, communications subsystem 2324 may also receive input communication in the form of structured and/or unstructured data feeds 2326, event streams 2328, event updates 2323, and the like on behalf of one or more users who may use computer system 2300.

By way of example, communications subsystem 2324 may be configured to receive unstructured data feeds 2326 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2324 may also be configured to receive data in the form of continuous data streams, which may include event streams 2328 of real-time events and/or event updates 2323, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2324 may also be configured to output the structured and/or unstructured data feeds 2326, event streams 2328, event updates 2323, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of computationally fortifying an answer using syntactic parse trees, the method comprising:
   accessing a seed sentence comprising a first plurality of text fragments;
   obtaining a search result by providing, to a search engine, at least one of the first plurality of text fragments, wherein the search result comprises a second plurality of text fragments;
   generating, from the search result, a communicative discourse tree, wherein generating the communicative discourse tree comprises:
   creating a discourse tree from the second plurality of text fragments, wherein the discourse tree comprises a plurality of nodes, each nonterminal node representing a rhetorical relationship between two fragments of the second plurality of text fragments and each terminal node of the nodes of the discourse tree is associated with one of the fragments of the second plurality of text fragments; and
   matching each fragment that has a verb to a verb signature;

determining whether the search result contains argumentation by providing the communicative discourse tree to a machine learning model trained to detect text comprising argumentation;

responsive to determining that the search result contains argumentation, constructing a paragraph from the search result; and providing the paragraph to a user device.

2. The method of claim 1, further comprising training the machine learning model by:

accessing a set of training data comprising a training pair, the training pair comprising a first communicative discourse tree that represents text comprising argumentation and a second communicative discourse tree that represents text without argumentation; and providing one of the training pairs to the machine learning model;

receiving, from the machine learning model, a determined presence of argumentation;

calculating a loss function by calculating a difference between the determined presence of argumentation and an expected presence of argumentation; and adjusting internal parameters of the machine learning model to minimize the loss function.

3. The method of claim 1, wherein obtaining a search result comprises:

identifying an entity within the first plurality of text fragments; and providing the entity to the search engine.

4. The method of claim 3, wherein identifying an entity further comprises:

constructing a first syntactic parse tree from the first plurality of text fragments; and identifying the entity within the first syntactic parse tree.

5. The method of claim 4, wherein identifying a noun phrase comprises extracting the noun phrase from a node of the first syntactic parse tree.

6. The method of claim 1, further comprising identifying a relevancy metric based on a common entity between a first syntactic parse tree and a second syntactic parse tree, and wherein providing the paragraph to the user device is based on a determination that the relevancy metric is greater than a threshold.

7. The method of claim 6, wherein computing the relevancy metric comprises applying an additional a machine learning model to the first syntactic parse tree and the second syntactic parse tree.

8. A system comprising:

a non-transitory computer-readable medium storing computer-executable program instructions; and a processing device communicatively coupled to the non-transitory computer-readable medium for executing the computer-executable program instructions, wherein executing the computer-executable program instructions configures the processing device to perform operations comprising:

accessing a seed sentence comprising a first plurality of text fragments;

obtaining a search result by providing, to a search engine, at least one of the first plurality of text fragments, wherein the search result comprises a second plurality of text fragments;

generating, from the search result, a communicative discourse tree, wherein generating the communicative discourse tree comprises:

creating a discourse tree from the second plurality of text fragments, wherein the discourse tree comprises a plurality of nodes, each nonterminal node representing a rhetorical relationship between two fragments of the second plurality of text fragments and each terminal node of the nodes of the discourse tree is associated with one of the fragments of the second plurality of text fragments; and matching each fragment that has a verb to a verb signature;

determining whether the search result contains argumentation by providing the communicative discourse tree to a machine learning model trained to detect text comprising argumentation;

responsive to determining that the search result contains argumentation, constructing a paragraph from the search result; and providing the paragraph to a user device.

9. The system of claim 8, wherein executing the computer-executable program instructions configures the processing device to perform operations comprising training the machine learning model by:

accessing a set of training data comprising a training pair, the training pair comprising a first communicative discourse tree that represents text comprising argumentation and a second communicative discourse tree that represents text without argumentation; and providing one of the training pairs to the machine learning model;

receiving, from the machine learning model, a determined presence of argumentation;

calculating a loss function by calculating a difference between the determined presence of argumentation and an expected presence of argumentation; and adjusting internal parameters of the machine learning model to minimize the loss function.

10. The system of claim 8, wherein obtaining a search result comprises:

identifying an entity within the first plurality of text fragments; and providing the entity to the search engine.

11. The system of claim 10, wherein identifying an entity further comprises:

constructing a first syntactic parse tree from the first plurality of text fragments; and identifying the entity within the syntactic parse tree.

12. The system of claim 11, wherein identifying a noun phrase comprises extracting the noun phrase from a node of the first syntactic parse tree.

13. The system of claim 8, wherein executing the computer-executable program instructions configures the processing device to perform operations comprising: identifying a relevancy metric based on a common entity between a first syntactic parse tree and a second syntactic parse tree and wherein providing the paragraph to the user device is based on a determination that the relevancy metric is greater than a threshold.

14. The system of claim 13, wherein computing the relevancy metric comprises applying an additional a machine learning model to the first syntactic parse tree and the second syntactic parse tree.

15. A non-transitory computer-readable storage medium storing computer-executable program instructions, wherein when executed by a processing device, the computer-executable program instructions cause the processing device to perform operations comprising:

accessing a seed sentence comprising a first plurality of text fragments;

obtaining a search result by providing, to a search engine, at least one of the first plurality of text fragments, wherein the search result comprises a second plurality of text fragments;

generating, from the search result, a communicative discourse tree, wherein generating the communicative discourse tree comprises:

creating a discourse tree from the second plurality of text fragments, wherein the discourse tree comprises a plurality of nodes, each nonterminal node representing a rhetorical relationship between two fragments of the second plurality of text fragments and each terminal node of the nodes of the discourse tree is associated with one of the fragments of the second plurality of text fragments; and matching each fragment that has a verb to a verb signature;

determining whether the search result contains argumentation by providing the communicative discourse tree to a machine learning model trained to detect text comprising argumentation;

responsive to determining that the search result contains argumentation, constructing a paragraph from the search result; and providing the paragraph to a user device.

16. The storage medium of claim 15, wherein when executed by a processing device, the computer-executable program instructions cause the processing device to perform operations comprising training the machine learning model by:

accessing a set of training data comprising a training pair, the training pair comprising a first communicative discourse tree that represents text comprising argumentation and a second communicative discourse tree that represents text without argumentation; and providing one of the training pairs to the machine learning model;

receiving, from the machine learning model, a determined presence of argumentation;

calculating a loss function by calculating a difference between the determined presence of argumentation and an expected presence of argumentation; and adjusting internal parameters of the machine learning model to minimize the loss function.

17. The storage medium of claim 15, wherein obtaining a search result comprises:

identifying an entity within the first plurality of text fragments; and providing the entity to the search engine.

18. The storage medium of claim 17, wherein identifying an entity further comprises:

constructing a syntactic parse tree from the first plurality of text fragments; and identifying the entity within the first syntactic parse tree.

19. The storage medium of claim 18, wherein identifying a noun phrase comprises extracting the noun phrase from a node of the first syntactic parse tree.

20. The storage medium of claim 15, wherein when executed by a processing device, the computer-executable program instructions cause the processing device to perform operations comprising: identifying a relevancy metric based on a common entity between a first syntactic parse tree and a second syntactic parse tree and wherein providing the paragraph to the user device is based on a determination that the relevancy metric is greater than a threshold.

* * * * *

UNITED STATES PATENT AND TRADEMARK OFFICE
CERTIFICATE OF CORRECTION

PATENT NO. : 11,720,749 B2
APPLICATION NO. : 17/974335
DATED : August 8, 2023
INVENTOR(S) : Galitsky It is certified that error appears in the above-identified patent and that said Letters Patent is hereby corrected as shown below:

On the Title Page

On page 3, Column 2, under Item (56) Other Publications, Line 57, delete "Ressources" and insert -- Resources --, therefor.

On page 4, Column 1, under Item (56) Other Publications, Line 42, delete "Discours"," and insert -- Discourse", --, therefor.

On page 4, Column 1, under Item (56) Other Publications, Line 43, delete "Travauxde" and insert -- Travaux de --, therefor.

On page 5, Column 2, under Item (56) Other Publications, Line 4, delete "galitskyb" and insert -- galitsky --, therefor.

On page 7, Column 2, under Item (56) Other Publications, Line 23, delete "forText" and insert -- for Text --, therefor.

On page 9, Column 2, under Item (56) Other Publications, Line 37, delete "Aquicision," and insert -- Acquisition, --, therefor.

In the Drawings

On sheet 1 of 23, in FIG. 1, under Reference Numeral 120, Line 3, delete "Clasifier" and insert -- Classifier --, therefor.

On sheet 1 of 23, in FIG. 1, under Reference Numeral 183, Line 3, delete "(Baldu," and insert -- (Baidu, --, therefor.

On sheet 5 of 23, in FIG. 5, under Reference Numeral 502, Line 1, delete "Copr" and insert -- Corp --, therefor.

Signed and Sealed this
Ninth Day of July, 2024

Katherine Kelly Vidal
*Director of the United States Patent and Trademark Office*

CERTIFICATE OF CORRECTION (continued)

In the Specification

In Column 4, Line 46, After "entities" insert -- . --, therefor.

In Column 6, Line 1, delete "(Baldu," and insert -- (Baidu, --, therefor.

In Column 10, Line 16, delete "intra-and" and insert -- intra- and --, therefor.

In Column 13, Line 58, delete "with [0104]" and insert -- with" --, therefor.

In Column 13, Lines 58-59, delete ""By the time" elaborated by "it came to sending off the title"" and insert the same on, Column 13, Line 59, as a new paragraph.

In Column 14, Line 64, delete "time."." and insert -- time". --, therefor.

In Column 17, Line 30, delete "MI-117" and insert -- MH17 --, therefor.

In Column 17, Line 40, delete "responsible(rebels," and insert -- responsible (rebels, --, therefor.

In Column 17, Line 66, delete "2008." and insert -- 2008 --, therefor.

In Column 20, Line 56, delete "a an" and insert -- an --, therefor.

In Column 21, Line 51, delete "$action_i$;" and insert -- $action_j$ --, therefor.

In Column 22, Line 44, delete "($rst1 \hat{rst}2$)" and insert -- (rst1 ^ rst2) --, therefor.

In Column 28, Line 62, delete "according the" and insert -- according to the --, therefor.

In Column 29, Line 66, delete "Decisions Sound" and insert -- Decisions | Sound --, therefor.

In Column 30, Line 67, after "beginner)" insert -- . --, therefor.

In Column 33, Line 60, delete "($w_1|w_{i-1}$)." and insert -- ($w_i$ | $w_{i-1}$). --, therefor.

In Column 34, Line 6, delete "we" and insert -- We --, therefor.

In Column 34, Line 17, delete "Vis" and insert -- V is --, therefor.

In Column 37, Lines 32-46, delete "Databases 2114 and 2116 may reside in a variety of locations. By way of example, one or more of databases 2114 and 2116 may reside on a non-transitory storage medium local to (and/or resident in) server 2112. Alternatively, databases 2114 and 2116 may be remote from server 2112 and in communication with server 2112 via a network-based or dedicated connection. In one set of aspects, databases 2114 and 2116 may reside in a storage-area network (SAN). Similarly, any necessary files for performing the functions attributed to server 2112 may be stored locally on server 2112 and/or remotely, as appropriate. In one set of aspects, databases 2114 and 2116 may include relational databases, such as databases provided by Oracle, that are adapted to store, update, and retrieve data in response to SQL-formatted commands." and insert the same on Column 37, Line 31, as a continuation of the same paragraph.